(12) United States Patent
Uchida

(10) Patent No.: US 10,497,186 B2
(45) Date of Patent: Dec. 3, 2019

(54) VEHICLE-TO-VEHICLE COMMUNICATION APPARATUS

(71) Applicant: YAMAHA HATSUDOKI KABUSHIKI KAISHA, Iwata-shi, Shizuoka (JP)

(72) Inventor: Yoshiaki Uchida, Iwata (JP)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 0 days.

(21) Appl. No.: 16/235,693

(22) Filed: Dec. 28, 2018

(65) Prior Publication Data

US 2019/0139329 A1    May 9, 2019

Related U.S. Application Data

(63) Continuation-in-part of application No. PCT/JP2017/023976, filed on Jun. 29, 2017.

(30) Foreign Application Priority Data

Jun. 30, 2016  (JP) ................................. 2016-130311

(51) Int. Cl.
   *G08G 1/01*       (2006.01)
   *G07C 5/00*       (2006.01)
   (Continued)

(52) U.S. Cl.
   CPC ............ *G07C 5/008* (2013.01); *G08G 1/015* (2013.01); *G08G 1/161* (2013.01); *G08G 1/166* (2013.01);
   (Continued)

(58) Field of Classification Search
   CPC . G06G 7/78; G06G 7/70; G07C 5/008; G08G 1/09; G08G 1/16; G08G 1/161; G08G 1/166; G08G 1/167
   (Continued)

(56) References Cited

U.S. PATENT DOCUMENTS

| 2012/0083998 A1 | 4/2012 | Kizaki | |
| 2017/0169710 A1* | 6/2017 | Beaurepaire | .......... B60W 30/16 |
| 2019/0052359 A1* | 2/2019 | Brady | ................. H04B 10/116 |

FOREIGN PATENT DOCUMENTS

| JP | 2003-044994 A | 2/2003 |
| JP | 5800381 B2 | 10/2015 |
| WO | WO-2016/031011 A1 | 3/2016 |

* cited by examiner

*Primary Examiner* — Toan N Pham
(74) *Attorney, Agent, or Firm* — Rabin & Berdo, P.C.

(57) ABSTRACT

A vehicle-to-vehicle communication apparatus includes a host vehicle information storage unit, a receiver, a provisional information generator, and an output controller. Based on vehicle information received by the receiver, the provisional information generator regards narrow vehicles determined as satisfying predetermined conditions as a single provisional vehicle. One condition is that client vehicles and a host vehicle running on the lane of the same running direction include more than one narrow vehicle. Another condition is that no wide vehicle is in a region formed by line segments connecting the narrow vehicles with one another. The provisional information generator generates provisional information of the provisional vehicle from sets of vehicle information of the narrow vehicles which are regarded as the provisional vehicle. The output controller outputs the provisional information.

15 Claims, 13 Drawing Sheets

(51) Int. Cl.
*H04W 4/46* (2018.01)
*G08G 1/16* (2006.01)
*G08G 1/015* (2006.01)
*G08G 1/00* (2006.01)

(52) U.S. Cl.
CPC ............... *G08G 1/167* (2013.01); *G08G 1/22* (2013.01); *H04W 4/46* (2018.02)

(58) Field of Classification Search
USPC .................................. 340/933; 701/300, 301
See application file for complete search history.

VEHICLE-TO-VEHICLE COMMUNICATION APPARATUS

CROSS-REFERENCE TO RELATED APPLICATIONS

This application is a continuation-in-part of, and claims the benefit of the earlier filing date of International Application No. PCT/JP2017/023976, filed on Jun. 29, 2017, and of Japanese Patent Application No. 2016-130311, filed on Jun. 30, 2016. The entire contents of each of the identified applications are incorporated herein by reference.

BACKGROUND

Technical Field

The present teaching relates to a vehicle-to-vehicle communication apparatus.

Background Art

A vehicle-to-vehicle communication apparatus configured to perform vehicle-to-vehicle communication between a host vehicle and a client vehicle has been known. The vehicle-to-vehicle communication is wireless communication which is performed by a vehicle-to-vehicle communication apparatus mounted on a vehicle and utilizes short-range wireless communication, etc. For example, Patent Literature 1 (identified further on) proposes to use such a vehicle-to-vehicle communication apparatus in a motorcycle. It is noted that, in this specification, passenger vehicles do not include leaning vehicles such as motorcycles and motor tricycles. In this specification, furthermore, a leaning vehicle is a vehicle which includes a vehicle body frame structured to lean rightward of the vehicle when turning right and lean leftward of the vehicle when turning left.

A leaning vehicle on which a vehicle-to-vehicle communication apparatus is mounted sends and receives vehicle information between the host vehicle and a client vehicle by means of vehicle-to-vehicle communication. The vehicle information includes information of the type, location, vehicle speed, and angle in the traveling direction of the vehicle, for example. The types of the vehicle include two-wheeled vehicles, a standard four-wheeled vehicles, and large four-wheeled vehicles.

CITATION LIST

Patent Literatures

[Patent Literature 1] Japanese Patent No. 5800381

By using such a vehicle-to-vehicle communication apparatus, cooperative driving of a plurality of vehicles is carried out. For example, a motorcycle of Patent Literature 1 performs cooperative driving by providing, to the driver, drive assist information regarding the running of the host vehicle relative to a client vehicle, which is based on vehicle information sent and received by the vehicle-to-vehicle communication apparatus. Smooth cooperative driving of vehicles by utilizing the vehicle-to-vehicle communication apparatus has been desired.

SUMMARY

An object of the present teaching is to provide a vehicle-to-vehicle communication apparatus which allows a plurality of vehicles to perform smooth cooperative driving.

The inventors of the subject application reinvestigate the characteristic of vehicles. The vehicles include leaning vehicles, for example. A leaning vehicle is narrow in vehicle width. On this account, two leaning vehicles can stop side by side in the left-right direction in a single lane. Furthermore, because of the narrow vehicle width, a leaning vehicle is able to selectively run at a right part, left part, or center of a single lane, for example. In other words, the leaning vehicle is able to select a position of a single lane in the left-right direction, when running on the lane. As such, leaning vehicles have a high degree of freedom in running position, and situations in which a plurality of vehicles run in a concentrated manner tend to occur. The inventors noticed that there were running situations in which smooth cooperative driving of vehicles including a leaning vehicle was difficult. An example of such running situations is a situation in which, at a junction, a vehicle such as a passenger vehicle is trying to enter a lane where leaning vehicles run in a concentrated manner. Another example of the above-described running situations is a situation in which, on a road with a plurality of lanes of the same running direction, a vehicle such as a passenger vehicle running on one lane is trying to enter a neighboring lane where leaning vehicles run in a concentrated manner. In either case, the vehicle such as a passenger vehicle may not easily cut into a stream of leaning vehicles running in a concentrated manner. In the cases above, the vehicle such as a passenger vehicle preferably enter a location in front of or behind leaning vehicles running in a concentrated manner. Because a large number of vehicles perform the cooperative driving in the cases above, smooth cooperative driving of leaning vehicles and another vehicle such as a passenger vehicle is required.

As described above, leaning vehicles are able to run in a concentrated manner. To put it differently, the number of vehicles performing cooperative driving tends to be large in cases of leaning vehicles. For this reason, leaning vehicles may be required to perform smooth cooperative driving with other vehicles. Furthermore, the number of leaning vehicles running in a concentrated manner may be changed during the running. To put it differently, the number of vehicles performing cooperative driving may be changed. For this reason, it may be difficult for leaning vehicles to perform smooth cooperative driving with other vehicles. It was found that this problem occurred not only in leaning vehicles but also in narrow vehicles which were narrow in vehicle width. The inventors of the subject application found that cooperative driving of vehicles could be smoothly done when a plurality of narrow vehicles running in a concentrated manner were regarded as a single provisional vehicle.

According to one aspect of the present teaching, a vehicle-to-vehicle communication apparatus mounted on a host vehicle includes: a host vehicle information storage unit configured to store vehicle information of the host vehicle including vehicle width information related to vehicle width of the host vehicle and location information related to a location of the host vehicle; a receiver capable of performing vehicle-to-vehicle communication and configured to receive vehicle information from a transmitter of at least one client vehicle capable of performing vehicle-to-vehicle communication, the vehicle information of the at least one client vehicle including vehicle width information related to vehicle width of the at least one client vehicle and location information related to location information of the at least one client vehicle; a provisional information generator configured to, in response to a determination that (A) the at least one client vehicle and the host vehicle, while running on a lane of a same running direction, include narrow vehicles, each narrow vehicle being narrower in vehicle width than a wide vehicle having a wide vehicle width, and (B) a region formed by connecting the narrow vehicles with one another does not include the wide vehicle, the determination being based on sets of vehicle information including (a) the vehicle information of the at least one client vehicle received from the at least one client vehicle and the vehicle information of the host vehicle, or (b) the vehicle information of the at least one client vehicle and vehicle information received from at least one other client vehicle, (I) regard the narrow vehicles as a single provisional vehicle, and (II) generate provisional information of the provisional vehicle from the sets of the vehicle information of the narrow vehicles regarded as the provisional vehicle; and an output controller configured to output the provisional information.

According to this arrangement, the vehicle-to-vehicle communication apparatus is mounted on the host vehicle. The vehicle-to-vehicle communication apparatus includes the host vehicle information storage unit, the receiver, the provisional information generator, and the output controller. The host vehicle information storage unit stores vehicle information of the host vehicle including vehicle width information related to vehicle width of the host vehicle and location information related to a location of the host vehicle. The receiver receives vehicle information of a client vehicle including vehicle width information related to vehicle width of the client vehicle and location information related to the location of the client vehicle, from the transmitter of the client vehicle. The vehicle width information of each of the host vehicle and the client vehicles may be a type of a vehicle such as two-wheeled vehicles, a vehicle width, a level of a vehicle width, or two or more of these sets of information. The transmitter of the client vehicle is configured to be able to perform vehicle-to-vehicle communication. The receiver is configured to be able to perform vehicle-to-vehicle communication. The client vehicles are vehicles other than the host vehicle. The vehicle-to-vehicle communication apparatus of the present teaching is mounted on the host vehicle. The vehicle-to-vehicle communication apparatus of the present teaching or another vehicle-to-vehicle communication apparatus may be mounted on each of the client vehicles. The location information of each of the host vehicle and the client vehicles may be information of the absolute location of each of the host vehicle and the client vehicles determined by longitudes and latitudes, or information of a relative location of the vehicle determined by the distance and direction from another vehicle, or may include both of these sets of information.

Based on sets of vehicle information, the provisional information generator regards a plurality of narrow vehicles determined as satisfying the following two conditions (A) and (B) as a single provisional vehicle. The narrow vehicle is a vehicle which is narrow in vehicle width as compared to a wide vehicle. A wide vehicle is a vehicle with a wide vehicle width. For example, the vehicle width of the narrow vehicle is less than a half of the width of a lane. The vehicle width of the wide vehicle is equal to or more than a half of the width of the lane. On this account, two narrow vehicles can stop side by side in the lane width direction in a single lane. Meanwhile, two wide vehicles cannot stop side by side in the lane width direction in the single lane. The sets of vehicle information are (a) the vehicle information of at least one client vehicle received from the at least one client vehicle and the vehicle information of the host vehicle. Alternatively, the sets of vehicle information are (b) the vehicle information of at least two client vehicles received from the at least two client vehicles. In the case (b), the sets of vehicle information may not include the vehicle information of the host vehicle. The first condition (A) is that the at least one client vehicle and the host vehicle running on the lane of the same running direction as the host vehicle include more than one narrow vehicle. The running direction of the lane indicates the direction in which a vehicle travels on the lane. The running direction of a lane is equivalent to a forward direction of the lane. The host vehicle and the client vehicles may run on the same lane or on different lanes. When the host vehicle is a narrow vehicle, the narrow vehicles include the host vehicle. When the host vehicle is not a narrow vehicle, the narrow vehicles do not include the host vehicle. When the host vehicle is a narrow vehicle, the narrow vehicles may not include the host vehicle. In other words, when the host vehicle is a narrow vehicle, the host vehicle may not be included in the single provisional vehicle. The narrow vehicles may run on the same lane as the host vehicle or run on a different lane. In other words, narrow vehicles which do not run on a lane of the same running direction as the host vehicle are not included in the one provisional vehicle. The second condition (B) is that no wide vehicle is in a region formed by connecting the narrow vehicles with one another. A region formed by connecting narrow vehicles with one another may be a region formed by connecting parts such as the centers of the narrow vehicles with one another, or a region formed by connecting the entire narrow vehicles with one another. The region may be a region formed by line segments or may be a region formed by planes. For example, a region formed by connecting narrow vehicles with one another is a region formed by line segments connecting the centers of the narrow vehicles with one another. When a wide vehicle is in a region formed by line segments connecting the narrow vehicles with one another, the narrow vehicles cannot run in a concentrated manner, and hence cooperative driving is difficult. The narrow vehicles regarded as the single provisional vehicle run in a concentrated manner. When there are a plurality of groups of narrow vehicles which are determined as satisfying the above-described two conditions (A) and (B), the provisional information generator may regard these groups as provisional vehicles, respectively. To put it differently, the provisional information generator is able to set a plurality of provisional vehicles.

The provisional information generator generates provisional information of the provisional vehicle from the sets of vehicle information of the narrow vehicles which are regarded as the provisional vehicle. Generation of provisional information from the sets of vehicle information of narrow vehicles may indicate calculation of provisional information from the sets of vehicle information of the narrow vehicles by a predetermined calculation formula. For example, an average of the sets of location information of the narrow vehicles is used as the provisional information. Generation of provisional information from the sets of vehicle information of narrow vehicles may indicate that at least one of the sets of vehicle information of the narrow vehicles is used as the provisional information. For example, the vehicle width of each of the narrow vehicles is used as the provisional information. Generation of provisional information from the sets of vehicle information of the narrow vehicles may indicate that new information which is different from the sets of vehicle information is generated. For example, assumption that the narrow vehicles form the provisional vehicle is used as the provisional information. Generation of provisional information from sets of vehicle information of narrow vehicle may be a combination of the above. The output controller outputs the provisional information. To be more specific, the output controller outputs provisional information to a transmitter, a display, a notification unit, a controller, etc. The transmitter, display, notification unit, controller, etc., to which the output controller outputs provisional information, may be integrated with the vehicle-to-vehicle communication apparatus or may be independent therefrom. In other words, the vehicle-to-vehicle communication apparatus, the transmitter, the display, the notification unit, the controller, etc. may be combined into a single apparatus provided at a single location or a plurality of apparatuses provided at different locations. With the arrangement above, based on the provisional information of the provisional vehicle, the narrow vehicles running in a concentrated manner are able to perform cooperative driving with another vehicle. To put it differently, because the narrow vehicles running in a concentrated manner are regarded as a single provisional vehicle, the narrow vehicles are able to perform cooperative driving with another vehicle. For example, when a vehicle which is trying to merge at a junction has the vehicle-to-vehicle communication apparatus of the present teaching, the vehicle-to-vehicle communication apparatus regards narrow vehicles running in a concentrated manner at around the junction as a single provisional vehicle. By using obtained provisional information, the merging vehicle is able to smoothly enter a location in front of or behind the narrow vehicles running in a concentrated manner. As such, the vehicle-to-vehicle communication apparatus of the present teaching allows the vehicles to perform smooth cooperative driving.

According to another aspect of the present teaching, the vehicle-to-vehicle communication apparatus is preferably arranged such that, in response to a determination, based on the sets of vehicle information, that (C) narrow vehicle regions, set respectively for the narrow vehicles included in the at least one client vehicle and the host vehicle running on the lane of the same running direction, have overlapped parts, the provisional information generator regards the narrow vehicles in the narrow vehicle regions as the single provisional vehicle.

According to this arrangement, based on sets of vehicle information, the provisional information generator assumes a plurality of narrow vehicles determined as satisfying the following condition (C) as a single provisional vehicle. The provisional information generator sets a narrow vehicle region based on a plurality of the sets of vehicle information. The sets of vehicle information are the sets of vehicle information of (a) or (b) described above. The narrow vehicle region is set for each of narrow vehicles included in at least one client vehicle and the host vehicle running on the lane of the same running direction as the host vehicle. The vehicle information includes at least location information. The narrow vehicle region includes a narrow vehicle. The narrow vehicle regions are set based on the sets of location information of narrow vehicles. Each narrow vehicle regions is, for example, shaped as a circle centered on the narrow vehicle, an ellipse, a rectangle, etc. The third condition (C) is that narrow vehicle regions of a plurality of narrow vehicles overlap one another. The provisional information generator regards narrow vehicles in the narrow vehicle regions having overlapping parts as a single provisional vehicle. In other words, a narrow vehicle which is in a narrow vehicle region not overlapping any other narrow vehicle regions is not included in a single provisional vehicle. On this account, a narrow vehicle running at a location remote from other narrow vehicles is not included in the single provisional vehicle. To put it differently, the narrow vehicles running in a concentrated manner are regarded as a single provisional vehicle. As such, the vehicle-to-vehicle communication apparatus of the present teaching allows the vehicles to perform smooth cooperative driving.

According to another aspect of the present teaching, the vehicle-to-vehicle communication apparatus is preferably arranged such that the vehicle information of the at least one client vehicle and the vehicle information of the host vehicle includes vehicle length information related to vehicle length, and when the host vehicle or the at least one client vehicle include the wide vehicle, the provisional information generator sets a length in a lane front-rear direction of each of the narrow vehicle regions in accordance with a vehicle length of the wide vehicle included in either the vehicle information of the host vehicle or the vehicle information of the at least one client vehicle received by the host vehicle.

According to this arrangement, the vehicle information includes vehicle length information related to vehicle length. When the host vehicle or at least one client vehicle includes a wide vehicle, it is possible to set the length in the lane front-rear direction of the narrow vehicle region in accordance with the vehicle length of the wide vehicle included in the vehicle information of the host vehicle or the vehicle information of the client vehicle received by the host vehicle. Furthermore, for example, the length in the lane front-rear direction of the narrow vehicle region is assumed as the vehicle length of the wide vehicle included in the vehicle information. The wide vehicle is, for example, a standard four-wheeled vehicle or a small four-wheeled vehicle such as a passenger vehicle, or a large four-wheeled vehicle such as a truck. When the vehicle information includes vehicle lengths of a plurality of wide vehicles, the length in the lane front-rear direction of the narrow vehicle region may be the longest vehicle length of the wide vehicle, the shortest vehicle length of the wide vehicle, or an average vehicle length. For example, the distance in the lane front-rear direction between two narrow vehicles having two overlapped narrow vehicle regions is arranged to be shorter than the vehicle length of the wide vehicle. In this case, the wide vehicle cannot enter between the narrow vehicles regarded as one provisional vehicle. On this account, the wide vehicle is able to smoothly perform cooperative driving with the narrow vehicles included in the single provisional vehicle. As such, the vehicle-to-vehicle communication apparatus of the present teaching allows the vehicles to perform smooth cooperative driving.

According to another aspect of the present teaching, the vehicle-to-vehicle communication apparatus is preferably arranged such that the vehicle information includes vehicle length information related to vehicle length, and the provisional information generator sets a length in a lane front-rear direction of each of the narrow vehicle regions in accordance with a vehicle length of each of the narrow vehicles.

According to this arrangement, the vehicle information includes vehicle length information related to vehicle length. The length in the lane front-rear direction of the narrow vehicle region is set in accordance with the vehicle length of the wide vehicle. For example, when the narrow vehicle is a large motorcycle and the vehicle length of the narrow vehicle is long, the length in the lane front-rear direction of the narrow vehicle region is arranged to be long. Meanwhile, for example, when the narrow vehicle is a small motorcycle and the vehicle length of the narrow vehicle is short, the length in the lane front-rear direction of the narrow vehicle region is arranged to be short. As such, the degree of closeness of narrow vehicles which are regarded as a single provisional vehicle varies in accordance with the vehicle length of each narrow vehicle. In other words, the degree of concentration of narrow vehicles which are regarded as a single provisional vehicle is adjustable in accordance with the vehicle length of each narrow vehicle. As such, the vehicle-to-vehicle communication apparatus of the present teaching allows the vehicles to perform smooth cooperative driving.

According to another aspect of the present teaching, the vehicle-to-vehicle communication apparatus is preferably arranged such that the provisional information generator sets the length in the lane front-rear direction of each of the narrow vehicle regions in accordance with vehicle speed of the narrow vehicles.

According to this arrangement, the length in the lane front-rear direction of the narrow vehicle region is changed in accordance with the vehicle speed of the narrow vehicle. To be more specific, when the vehicle speed of a narrow vehicle increases, the length in the lane front-rear direction of the narrow vehicle region is increased. Meanwhile, when the vehicle speed of a narrow vehicle decreases, the length in the lane front-rear direction of the narrow vehicle region is decreased. An inter-vehicle distance typically increases as a vehicle speed increases. On this account, by changing the length in the lane front-rear direction of the narrow vehicle region in accordance with the vehicle speed of the narrow vehicle, it is possible to prevent two narrow vehicles, which are more distanced from each other than a required inter-vehicle distance, from being regarded as a single provisional vehicle when the vehicle speed is low. Because the length in the lane front-rear direction of the narrow vehicle region is changed in accordance with the running situation of the narrow vehicle, cooperative driving of vehicles is smoothly done.

According to another aspect of the present teaching, the vehicle-to-vehicle communication apparatus is preferably arranged such that the provisional information includes at least one of: identification information for identifying the provisional vehicle, a type of the narrow vehicles included in the provisional vehicle, a number of the narrow vehicles included in the provisional vehicle, locations of the narrow vehicles included in the provisional vehicle, vehicle speed of the narrow vehicles included in the provisional vehicle, angles in a traveling direction of the narrow vehicles included in the provisional vehicle, a total length in a lane front-rear direction of all of the narrow vehicles included in the provisional vehicle, a total length in a lane width direction of all of the narrow vehicles included in the provisional vehicle, or instruction information which is a common instruction to the narrow vehicles included in the provisional vehicle.

According to this arrangement, provisional information includes at least one of the following sets of information. One set of provisional information is identification information for identifying a provisional vehicle. The identification information is information by which a distinction between a provisional vehicle and other vehicles is possible. One set of provisional information is a type of narrow vehicles included in a provisional vehicle. One set of provisional information is the number of narrow vehicles included in a provisional vehicle. One set of provisional information is the locations of narrow vehicles included in a provisional vehicle. The locations of the narrow vehicles included in the provisional information may be at least one of the location of the narrow vehicle which is the frontmost one in the provisional vehicle or the location of the narrow vehicle which is the rearmost one in the provisional vehicle. One set of provisional information is the vehicle speed of narrow vehicles included in a provisional vehicle. One set of provisional information is angles in the traveling direction of narrow vehicles included in a provisional vehicle. One set of provisional information is the length of all narrow vehicles included in a provisional vehicle in the lane front-rear direction. One set of provisional information is the length of all narrow vehicles included in a provisional vehicle in the lane width direction. One set of provisional information is instruction information which is a common instruction to narrow vehicles included in a provisional vehicle. The vehicle-to-vehicle communication apparatus of the present teaching is able to utilize such provisional information output from the output controller in the host vehicle on which the vehicle-to-vehicle communication apparatus of the present teaching is mounted. As such, the vehicle-to-vehicle communication apparatus of the present teaching allows the vehicles to perform smooth cooperative driving.

According to another aspect of the present teaching, the vehicle-to-vehicle communication apparatus preferably includes a host transmitter which is capable of performing vehicle-to-vehicle communication and configured to transmit, to the at least one client vehicle, the provisional information output from the output controller and the vehicle information of the host vehicle.

According to this arrangement, the vehicle-to-vehicle communication apparatus of the present teaching further includes the transmitter which is configured to transmit, to the client vehicle, the provisional information output from the output controller and the vehicle information of the host vehicle. The transmitter is configured to be able to perform vehicle-to-vehicle communication. The client vehicle having received the provisional information and the vehicle information is able to use the provisional information and the vehicle information for cooperative driving. As such, the vehicle-to-vehicle communication apparatus of the present teaching allows the vehicles to perform smooth cooperative driving.

According to another aspect of the present teaching, the vehicle-to-vehicle communication apparatus is preferably arranged such that the provisional information generator selects a narrow vehicle from the narrow vehicles included in the provisional vehicle to be a representative vehicle, and transmits the provisional information from the host transmitter to the representative vehicle, the provisional information including information related to the representative vehicle.

According to this arrangement, the provisional information generator is able to select one representative vehicle from narrow vehicles which are regarded as a single provisional vehicle. Information regarding a representative vehicle is included in provisional information. A representative vehicle may be a host vehicle or a client vehicle. The representative vehicle may be selected based on a predetermined condition. The predetermined condition is, for example, that the representative vehicle is the narrow vehicle running at the leading end of the provisional vehicle. The predetermined condition is, for example, that the representative vehicle is the narrow vehicle running at the trailing end of the provisional vehicle. The predetermined condition is, for example, that the representative vehicle is the narrow vehicle running at the center of the provisional vehicle. The representative vehicle transmits provisional information. Meanwhile, narrow vehicles in the provisional vehicle, which are not the representative vehicle, may not transmit the provisional information. When vehicles other than the representative vehicle do not transmit the provisional information, an amount of information transmitted from the provisional vehicle is reduced. As such the vehicle-to-vehicle communication apparatus of the present teaching allows the vehicles to perform smooth cooperative driving.

According to another aspect of the present teaching, the vehicle-to-vehicle communication apparatus is preferably arranged such that the provisional information generator changes the representative vehicle to a different one of the narrow vehicles included in the provisional vehicle from the selected narrow vehicle.

According to this arrangement, the provisional information generator is able to change the representative vehicle to another one of narrow vehicles which are included in a single provisional vehicle. To be more specific, the provisional information generator changes the representative vehicle in accordance with the running situation of the narrow vehicles included in the one provisional vehicle. The running situation of the narrow vehicles included in the provisional vehicle includes road situations at a junction and a branch point. For example, at a junction, a branch point, etc., the representative vehicle is changed to a narrow vehicle which is close to the junction, the branch point, etc. With this arrangement, a client vehicle which is approaching a junction, a branch point, etc. is able to swiftly receive provisional information from the representative vehicle. When the host vehicle is not included in the provisional vehicle, the running situation of the narrow vehicles included in the provisional vehicle includes the positional relation between the host vehicle and the provisional vehicle. When the host vehicle is included in the provisional vehicle, the running situation of the narrow vehicles included in the provisional vehicle includes the positional relation between the host vehicle and the client vehicles among the narrow vehicles which are included in the provisional vehicle and are different from the host vehicle. Because the representative vehicle is changeable, it is possible to allow the vehicles to perform smooth cooperative driving.

According to another aspect of the present teaching, the vehicle-to-vehicle communication apparatus is preferably arranged such that when the host vehicle is included in the provisional vehicle, the output controller changes output transmission power of the host transmitter based on the information related to the representative vehicle.

According to this arrangement, when the host vehicle is included in the provisional vehicle, in accordance with information related to the representative vehicle, the output controller changes the transmission power of the transmitter of the host vehicle. The phrase "in accordance with information related to the representative vehicle" indicates "in accordance with whether the host vehicle is the representative vehicle". To put it differently, the output controller changes a region in which vehicle-to-vehicle communication is possible, by changing the transmission power of the transmitter.

To be more specific, the output controller increases the transmission power when the host vehicle is the representative vehicle, as compared to cases where the host vehicle is not the representative vehicle. When the host vehicle is the representative vehicle and the provisional information is transmitted to a client vehicle included in the provisional vehicle, the output controller decreases the transmission power of the transmitter of the host vehicle. This decreased transmission power is termed first power. When the host vehicle is the representative vehicle and the provisional information is transmitted to a client vehicle not included in the provisional vehicle, the output controller causes the transmission power of the transmitter of the host vehicle to be higher than the first power. As such, because the transmission power of the transmitter of the host vehicle is changed when the host vehicle is the representative vehicle, vehicle-to-vehicle communication between the host vehicle which is the representative vehicle and a client vehicle can be certainly done. As such, the vehicle-to-vehicle communication apparatus of the present teaching allows the vehicles to perform smooth cooperative driving.

When the host vehicle is not the representative vehicle, the output controller decreases the transmission power of the transmitter or arranges the transmission power of the transmitter to be zero for a predetermined time. This makes it possible to reduce an amount of information transmitted from the provisional vehicle. As such, the vehicle-to-vehicle communication apparatus of the present teaching allows the vehicles to perform smooth cooperative driving.

According to another aspect of the present teaching, the vehicle-to-vehicle communication apparatus is preferably arranged such that the output controller changes time intervals of transmission of the provisional information from the host transmitter to the at least one client vehicle.

According to this arrangement, when the host vehicle is the representative vehicle, in accordance with the provisional information, the output controller changes the transmission power of the transmitter of the host vehicle. For example, when the host vehicle is the representative vehicle running at the leading end of the provisional vehicle, the output controller arranges the transmission power in the forward direction from the host vehicle to be higher than the transmission power in the rearward direction from the host vehicle. Meanwhile, when the host vehicle is the representative vehicle running at the trailing end of the provisional vehicle, the output controller arranges the transmission power in the rearward direction from the host vehicle to be higher than the transmission power in the forward direction from the host vehicle. As such, because the transmission power of the transmitter of the host vehicle is changed in accordance with the provisional information when the host vehicle is the representative vehicle, vehicle-to-vehicle communication between the host vehicle which is the representative vehicle and a client vehicle can be certainly done. As such the vehicle-to-vehicle communication apparatus of the present teaching allows the vehicles to perform smooth cooperative driving.

According to another aspect of the present teaching, the vehicle-to-vehicle communication apparatus is preferably arranged such that when the host vehicle is included in the provisional vehicle, the output controller controls time intervals of transmission of the vehicle information from the host transmitter to the at least one client vehicle to be longer than time intervals when the host vehicle is not included in the provisional vehicle.

According to this arrangement, the output controller is able to change time intervals of transmission of provisional information from the transmitter of the host vehicle to a client vehicle. Time intervals of transmission of vehicle information from the transmitter of the host vehicle may be different from time intervals of transmission of provisional information from the transmitter of the host vehicle. To be more specific, in accordance with the running situation of narrow vehicles included in a provisional vehicle, the output controller preferably changes time intervals of transmission of provisional information to a client vehicle from the transmitter of the host vehicle. For example, time intervals may be shortened when the provisional vehicle is running around a junction. With this arrangement, a client vehicle trying to enter the lane on which the provisional vehicle runs is able to frequently receive the provisional information of the provisional vehicle. The client vehicle is able to merge by utilizing the latest provisional information of the provisional vehicle. As such, the vehicle-to-vehicle communication apparatus of the present teaching allows the vehicles to perform smooth cooperative driving.

According to another aspect of the present teaching, the vehicle-to-vehicle communication apparatus is preferably arranged such that, when the host vehicle is included in the provisional vehicle, the output controller changes time intervals of transmission of the vehicle information from the transmitter of the host vehicle to the client vehicle to be longer than time intervals when the host vehicle is not included in the provisional vehicle.

According to this arrangement, when the host vehicle is included in the provisional vehicle, the output controller controls time intervals of transmission of vehicle information from the transmitter of the host vehicle to the client vehicle to be longer than the time intervals when the host vehicle is not included in the provisional vehicle. To put it differently, time intervals of transmission of vehicle information from the transmitter of the host vehicle to a client vehicle are changed in accordance with whether the host vehicle is included in the provisional vehicle. This makes it possible to reduce an amount of information transmitted in the provisional vehicle. As such the vehicle-to-vehicle communication apparatus of the present teaching allows the vehicles to perform smooth cooperative driving.

According to another aspect of the present teaching, the vehicle-to-vehicle communication apparatus is preferably arranged such that time intervals of generation of the provisional information by the provisional information generator are changeable.

According to this arrangement, time intervals of generation of provisional information by the provisional information generator are changeable. To be more specific, time intervals of generation of provisional information by the provisional information generator are changed in accordance with the running situation of narrow vehicles included in a provisional vehicle. Assume that the host vehicle is included in the provisional vehicle. For example, time intervals may be shortened when the acceleration of the host vehicle is rapidly changed or the host vehicle enters another lane. When the acceleration of the host vehicle is rapidly changed or the host vehicle enters another lane, the inter-vehicle distance may be changed. In such cases, the narrow vehicles included in the provisional vehicle are likely to be changed. The provisional information generator is therefore able to regard a plurality of narrow vehicles as a single provisional vehicle, swiftly in response to the change of the inter-vehicle distance. In other words, the provisional information generator is able to change the narrow vehicles included in the provisional vehicle swiftly in response to a change of the inter-vehicle distance. As such, the vehicle-to-vehicle communication apparatus of the present teaching allows the vehicles to perform smooth cooperative driving.

According to another aspect of the present teaching, the vehicle-to-vehicle communication apparatus is preferably arranged such that the provisional vehicle includes narrow vehicles running on a plurality of lanes.

According to this arrangement, the provisional vehicle includes narrow vehicles running on a plurality of lanes. A narrow vehicle running on a first lane and a narrow vehicle running on a second lane neighboring the first lane may run side by side in the lane width direction. For this reason, narrow vehicles running on a plurality of lanes may run in a concentrated manner. Even in such a case, the provisional information generator is able to regard the narrow vehicles running on a plurality of lanes as a single provisional vehicle. As such, the vehicle-to-vehicle communication apparatus of the present teaching allows narrow vehicles running on a plurality of lanes to perform smooth cooperative driving.

According to another aspect of the present teaching, the vehicle-to-vehicle communication apparatus preferably include sensing unit which is configured to sense an object which is at least in front of, behind, rightward of, or leftward of the host vehicle.

According to this arrangement, the vehicle-to-vehicle communication apparatus of the present teaching further includes a sensing unit which is configured to sense an object which is at least in front of, behind, rightward of, or leftward of the host vehicle. The sensing unit is, for example, a front sensing unit which is configured to sense an object in front of the host vehicle. The sensing unit is, for example, a rear sensing unit which is configured to sense an object behind the host vehicle. The sensing unit is, for example, a side sensing unit which is configured to sense an object rightward of, or leftward of the host vehicle. The sensing unit is at least one of the front sensing unit, the rear sensing unit, or the side sensing unit. The sensing unit includes, for example, at least one of a camera, a millimeter wave radar, a micrometer wave radar, a laser radar, an ultrasonic sensor, an acoustic sensor, an infrared sensor, a radio wave/electric field sensor, a magnetic sensor, and a range image sensor. Such radars and sensors are configured to radiate millimeter waves or the like forward, rearward, or sideward from the vehicle and receive reflected waves reflected on an object and returning. The camera may be a monocular camera or a set of dual cameras. The host vehicle on which the vehicle-to-vehicle communication apparatus of the present teaching is mounted is able to sense a client vehicle which is at least in front of, behind, rightward of, or leftward of the host vehicle. The sensing unit measures the distance between the host vehicle on which the vehicle-to-vehicle communication apparatus of the present teaching is mounted and a client vehicle. Based on the measured distance, the location information of the host vehicle and the client vehicle or the vehicle length of the host vehicle can be corrected. The location information of the host vehicle and the client vehicle or the vehicle length of the host vehicle, which has been corrected, is output to the provisional information generator. This improves the accuracy of the location information of the host vehicle and the client vehicle. As such, the vehicle-to-vehicle communication apparatus of the present teaching allows the vehicles to perform smooth cooperative driving.

According to another aspect of the present teaching, the vehicle-to-vehicle communication apparatus is arranged such that the output controller may display, on a display unit, the positional relation between the host vehicle and the client vehicle based on the location information of the host vehicle and the location information of the client vehicle.

This allows the driver watching the display unit to recognize the positional relation between the host vehicle and the client vehicles, etc. As such, the vehicle-to-vehicle communication apparatus of the present teaching allows the vehicles to perform smooth cooperative driving.

According to another aspect of the present teaching, the vehicle-to-vehicle communication apparatus is arranged such that the output controller may cause the display to indicate whether each of the host vehicle and the client vehicle is the narrow vehicle or the wide vehicle by color, based on the vehicle width information of the host vehicle and the vehicle width information of the client vehicle.

This allows the driver watching the display unit to recognize whether the client vehicle is the narrow vehicle or the wide vehicle. As such, the vehicle-to-vehicle communication apparatus of the present teaching allows the vehicles to perform smooth cooperative driving.

The vehicle-to-vehicle communication of the present teaching is wireless communication which is performed by a vehicle-to-vehicle communication apparatus mounted on a vehicle and utilizes short-range wireless communication, etc.

The vehicle width information in the present teaching may be a type of a vehicle such as two-wheeled vehicles, a vehicle width, a level of a vehicle width, or two or more of these sets of information.

The location information of a vehicle in the present teaching may be information of the absolute location of the vehicle determined by longitudes and latitudes or information of a relative location of the vehicle determined by the distance and direction from another vehicle, or may include both of these sets of information.

The narrow vehicle in the present teaching is a vehicle which is narrow in vehicle width as compared to a wide vehicle. The wide vehicle of the present teaching is a vehicle with a wide vehicle width. For example, the vehicle width of the narrow vehicle is less than a half of the width of a lane. The vehicle width of the wide vehicle is equal to or more than a half of the width of the lane. On this account, two narrow vehicles can stop side by side in the lane width direction in a single lane. Meanwhile, two wide vehicles cannot stop side by side in the lane width direction in the single lane. The narrow vehicle is, for example, a leaning vehicle. The wide vehicle is, for example, a passenger vehicle. When vehicles can stop side by side in the lane width direction, one vehicle is separated from the other vehicle in the lane width direction, and the one vehicle and the other vehicle in the stopped state at least partially overlap each other when viewed in the lane width direction.

In a lane of the present teaching, lane marks (e.g., white lines) may or may not be provided at the edges. The running direction of a lane in the present teaching indicates the direction in which a vehicle travels on the lane. The running direction of a lane is equivalent to a forward direction of the lane. A lane of the same running direction as a host vehicle encompasses a lane on which the host vehicle runs, another lane which is parallel to the lane on which the host vehicle runs and of the same running direction, and a further lane which merges into the lane on which the host vehicle runs.

In the present teaching, "at least one client vehicle running on a lane of the same running direction as a host vehicle" is at least one vehicle, when based on the information (a) above. In the present teaching, "at least one client vehicle running on a lane of the same running direction as a host vehicle" is at least two vehicles, when based on the information (b) above.

In the present teaching, "a plurality of narrow vehicle regions having an overlapped part" indicates that at least two of narrow vehicle regions overlap each other.

A host vehicle of the present teaching is a vehicle on which the vehicle-to-vehicle communication apparatus of the present teaching is mounted. The client vehicle of the present teaching are vehicles other than the host vehicle.

In the present specification, an end portion of a member indicates a portion constituted by an end and its surroundings of the member.

In this specification, when the radial direction of a member B is used in an explanation of a member A, the radial direction of the member B is the radial direction of the member B, which passes the member A. The phrase "when the radial direction of a member B is used in an explanation of a member A" indicates, for example, cases where the member A is along the radial direction of the member B or the member A is pressed in the radial direction of the member B.

In this specification, unless otherwise specified, an inclination angle between linear lines A and B indicates a smaller one of angles between the linear lines A and B. This applies not only to the linear lines but also the directions.

In this specification, a direction along an A direction is not limited to the direction in parallel to the A direction. The direction along the A direction includes a direction which intersects with the A direction at an angle which falls within the range from −45 degrees to 45 degrees. In the present teaching, a linear line along the A direction is not limited to a linear line in parallel to the A direction. The linear line along the A direction includes a linear line which intersects with the A direction at an angle which falls within the range from −45 degrees to 45 degrees. The direction A does not indicate any specific direction. The direction A may be the horizontal direction or the front-rear direction.

In this specification, an expression "members A and B are lined up in an X direction" indicates the following state. When the members A and B are viewed in any direction orthogonal to the X direction, the members A and B are both provided on a linear line which is along the X direction. In this specification, an expression "members A and B are lined up in an X direction when viewed in a Y direction" indicates the following state. When the members A and B are viewed in the Y direction, the members A and B are both provided on a linear line which is along the X direction. When the members A and B are viewed in a direction different from the Y direction, the members A and B may not be lined up in the X direction.

In these two definitions, the members A and B may be in contact with each other. The members A and B may not be in contact with each other. A member C may be provided between the members A and B.

In this specification, an expression "a member A is provided forward of a member B" indicates the following state. The member A is provided in front of a plane which passes the front-most end of the member B and is orthogonal to the front-rear direction. In this connection, the members A and B may or may not be lined up in the front-rear direction. This applies to expressions "a member A is provided rearward of a member B", "a member A is provided above or below a member B", and "a member A is provided rightward of or leftward of a member B".

In this specification, an expression "a member A is provided in front of a member B" indicates the following state. The member A is provided forward of the member B and the members A and B are lined up in the front-rear direction. This applies to expressions "a member A is provided behind a member B", "a member A is provided directly above or below a member B", and "a member A is provided to the right of or to the left of a member B".

In this specification, an expression "a member A is provided in front of a member B when viewed in an X direction which is different from the front-rear direction" indicates the following state. The member A is provided forward of the member B and the members A and B are lined up in the front-rear direction when viewed in the X direction. When the members A and B are viewed in a Y direction different from the X direction, the members A and B may not be lined up in the X direction. This applies to expressions "a member A is provided behind a member B when viewed in the X direction", "a member A is provided directly above or below a member B when viewed in the X direction", and "a member A is provided to the right of or to the left of a member B when viewed in the X direction".

In the present teaching, terms "including", "comprising", "having", and derivatives thereof are used to encompass not only listed items and equivalents thereof but also additional items.

In the present teaching, the terms "mounted", "connected", "coupled", and "supported" are used in broad sense. To be more specific, the terms encompass not only directly mounting, connection, coupling, and supporting but also indirect mounting, connection, coupling, and supporting. Furthermore, the terms "connected" and "coupled" do not merely indicate physical or mechanical connection and coupling. These terms encompass direct or indirect electric connection and coupling.

Unless otherwise defined, all terms (technical and scientific terms) used in this specification indicate meanings typically understood by a person with ordinary skill in the art in the technical field to which the present teaching belongs.

Terms defined in typical dictionaries indicate meanings used in related technologies and in the context of the present disclosure. The terms are not interpreted ideally or excessively formally.

In this specification, the term "preferable" is non-exclusive. The term "preferable" means "preferable but not limited to". In this specification, an arrangement which is "preferable" exerts at least the above-described effect of the arrangement of one of the aspects of the present teaching. In this specification, the term "may" is non-exclusive. The term "may" indicate "may but not must". In this specification, an arrangement which is explained by using the term "may" exerts at least the above-described effect of the arrangement of one of the aspects of the present teaching.

In the present teaching, the arrangements of the above-described different aspects of the present teaching may be variously combined. Before an embodiment of the present teaching is detailed, it is informed that the present teaching is not limited to the configurations and layout of elements described below and/or shown in drawings. The present teaching may be implemented as an embodiment other than the below-described embodiment. The present teaching may be implemented as an embodiment other than the below-described embodiment. Furthermore, the present teaching may be implemented by suitably combining below-described modifications.

Advantageous Effects

As described above, the present teaching provides a vehicle-to-vehicle communication apparatus which allows a plurality of vehicles to perform smooth cooperative driving.

DETAILED DESCRIPTION

Description of the Embodiments

Figure 13:
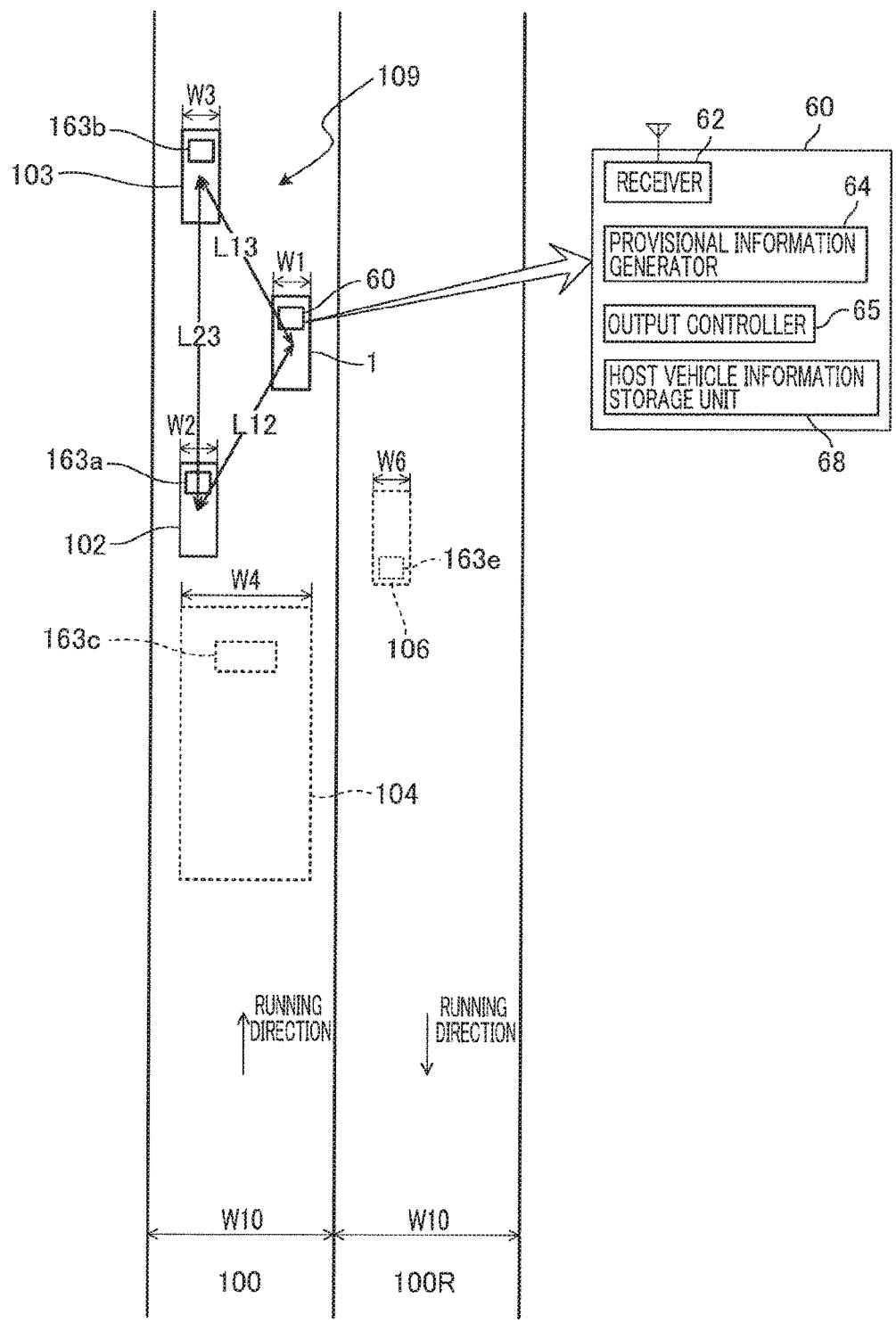
FIG. 13 is a schematic diagram of the vehicle-to-vehicle communication apparatus of the embodiment of the present teaching.

The following describes an embodiment of the present teaching with reference to FIG. 13.

A vehicle-to-vehicle communication apparatus 60 is mounted on a host vehicle 1. The vehicle-to-vehicle communication apparatus 60 includes a host vehicle information storage unit 68, a receiver 62, a provisional information generator 64, and an output controller 65.

The host vehicle information storage unit 68 is configured to store vehicle information of the host vehicle 1, which includes vehicle width information related to the vehicle width W1 of the host vehicle 1 and location information related to the location of the host vehicle 1.

The receiver 62 is able to receive sets of vehicle information of client vehicles 102, 103, 104, and 106 sent from transmitters 163*a*, 163*b*, 163*c*, and 163*e* of the client vehicles 102, 103, 104, and 106 which are capable of performing vehicle-to-vehicle communication. The vehicle information of the client vehicle 102 includes vehicle width information related to the vehicle width W2 of the client vehicle 102 and location information related to the location of the client vehicle 102. The vehicle information of the client vehicle 103 includes vehicle width information related to the vehicle width W3 of the client vehicle 103 and location information related to the location of the client vehicle 103. The vehicle information of the client vehicle 106 includes vehicle width information related to the vehicle width W6 of the client vehicle 106 and location information related to the location of the client vehicle 106. The vehicle width information of each of the host vehicle 1 and the client vehicles 102, 103, 104, and 106 may be a type of a vehicle such as two-wheeled vehicles, a vehicle width, a level of a vehicle width, or two or more of these sets of information.

The location information of each of the host vehicle 1 and the client vehicles 102, 103, 104, and 106 may be information of the absolute location of each of the host vehicle 1 and the client vehicles 102, 103, 104, and 106 determined by longitudes and latitudes, or information of a relative location of the vehicle determined by the distance and direction from another vehicle, or may include both of these sets of information. The client vehicles 102, 103, 104, and 106 are vehicles other than the host vehicle 1. The vehicle-to-vehicle communication apparatus of the present embodiment or another vehicle-to-vehicle communication apparatus may be mounted on each of the client vehicles 102, 103, 104, and 106.

The host vehicle 1 and the client vehicles 102, 103, and 104 run on the lane 100. The client vehicle 106 runs on a right lane 100R. The right lane 100R is adjacent to the lane 100. The lane width of each of the lane 100 and the right lane 100R is W10. The running direction of the lane 100 is different from the running direction of the right lane 100R. The running direction of the lane 100 indicates the direction in which a vehicle travels on the lane 100.

The vehicles include narrow vehicles and wide vehicles. A narrow vehicle is narrower in vehicle width than a wide vehicle. A wide vehicle is a vehicle with a wide vehicle width. The vehicle width of the narrow vehicle is less than a half of the width of a lane. On this account, two narrow vehicles can stop side by side in the lane width direction in a single lane. The vehicle width of the wide vehicle is equal to or more than a half of the width of the lane. In FIG. 13, the host vehicle 1 and the client vehicles 102, 103, and 106 are narrow vehicles, whereas the client vehicle 104 is a wide vehicle. The host vehicle 1 may be a wide vehicle. Each of the vehicle widths W1, W2, and W3 of the narrow vehicles 1, 102, and 103 is less than a half of the lane width W10 of the lane 100. The vehicle width W6 of the narrow vehicle 106 is less than a half of the lane width W10 of the right lane 100R. The vehicle width W4 of the wide vehicle 104 is equal to or more than a half of the lane width W10 of the lane 100.

Based on sets of vehicle information, the provisional information generator 64 regards a plurality of narrow vehicles determined as satisfying the following two conditions (A) and (B) as a single provisional vehicle 109. The sets of vehicle information are (a) sets of vehicle information of the client vehicles 102, 103, and 104 supplied from the client vehicles 102, 103, and 104 and a set of vehicle information of the host vehicle 1 owned by the host vehicle 1. Alternatively, the sets of vehicle information are (b) sets of vehicle information of the client vehicles 102, 103, and 104 supplied from the client vehicles 102, 103, and 104. In this case, the sets of vehicle information may not include the vehicle information of the host vehicle 1.

The first condition (A) is that the client vehicles 102, 103, and 104 and the host vehicle 1 running on the lane 100 of the same running direction as the host vehicle 1 include more than one narrow vehicle. The client vehicles 102, 103, and 104 and the host vehicle 1 include a plurality of narrow vehicles 1, 102, and 103. Because the host vehicle 1 is a narrow vehicle, the narrow vehicles include the host vehicle 1. When the host vehicle 1 is not a narrow vehicle, the narrow vehicles do not include the host vehicle 1. When the host vehicle 1 is a narrow vehicle, the narrow vehicles may not include the host vehicle 1. In other words, when the host vehicle 1 is a narrow vehicle, the host vehicle may not be included in the single provisional vehicle. The narrow vehicles may run on the same lane as the host vehicle 1 or run on a different lane. The narrow vehicle 106 runs on the right lane 100R which is different from the lane 100 on which the host vehicle runs. Because the running direction of the right lane 100R is different from that of the host vehicle 1, the narrow vehicle 106 is not included in the single provisional vehicle 109.

The second condition (B) is that no wide vehicle is in a region formed by line segments L12, L13, and L23 connecting the narrow vehicles 1, 102, and 103 with one another. The wide vehicle 104 is not in the region formed by line segments L12, L13, and L23 connecting the narrow vehicles 1, 102, and 103 with one another. A region formed by connecting narrow vehicles with one another is a region formed by line segments connecting the centers of the narrow vehicles with one another. A region formed by connecting narrow vehicles with one another is a region formed by connecting parts such as the centers of the narrow vehicles with one another, or a region formed by connecting the entire narrow vehicles with one another. The region is a region formed by line segments, but may be a region formed by planes. When a wide vehicle is in a region formed by line segments L12, L13, and L23 connecting the narrow vehicles 1, 102, and 103 with one another, the narrow vehicles 1, 102, and 103 cannot run in a concentrated manner, and hence cooperative driving is difficult. The narrow vehicles 1, 102, and 103 regarded as the single provisional vehicle 109 run in a concentrated manner.

The provisional information generator 64 generates provisional information of the provisional vehicle 109 from the sets of vehicle information of the narrow vehicles 1, 102, and 103 which are regarded as the provisional vehicle 109. Generation of provisional information from sets of vehicle information of the narrow vehicles 1, 102, and 103 may indicate calculation of provisional information from the sets of vehicle information of the narrow vehicles 1, 102, and 103 by a predetermined calculation formula. For example, an average of sets of location information of the narrow vehicles 1, 102, and 103 is used as the provisional information. Generation of provisional information from sets of vehicle information of the narrow vehicles 1, 102, and 103 may indicate that at least one of the sets of vehicle information of the narrow vehicles 1, 102, and 103 is used as the provisional information. For example, the vehicle width of each of the narrow vehicles 1, 102, and 103 is used as the provisional information. Generation of provisional information from sets of vehicle information of the narrow vehicles 1, 102, and 103 may indicate that new information which is different from the sets of vehicle information is generated. For example, assumption that the narrow vehicles 1, 102, and 103 form the provisional vehicle 109 is used as the provisional information. Generation of provisional information from sets of vehicle information of the narrow vehicles 1, 102, and 103 may be a combination of the above.

The output controller 65 is configured to output provisional information. To be more specific, the output controller 65 outputs provisional information to a transmitter, a display, a notification unit, a controller, etc., which are not illustrated. The transmitter, display, notification unit, controller, etc., to which the output controller 65 outputs provisional information, may be integrated with the vehicle-to-vehicle communication apparatus 60 or may be independent therefrom.

The vehicle-to-vehicle communication apparatus 60 of the present embodiment has the above-described characteristics.

With the arrangement above, based on the provisional information of the provisional vehicle 109, the narrow vehicles 1, 102, and 103 running in a concentrated manner are able to perform cooperative driving with another vehicle (e.g., the wide vehicle 104). To put it differently, because the narrow vehicles 1, 102, and 103 running in a concentrated manner are regarded as a single provisional vehicle 109, the narrow vehicles 1, 102, and 103 are able to perform cooperative driving with another vehicle. For example, when a vehicle which is trying to merge at a junction has the vehicle-to-vehicle communication apparatus 60 of the present teaching, the vehicle-to-vehicle communication apparatus 60 regards narrow vehicles running in a concentrated manner around the junction as a single provisional vehicle. By using obtained provisional information, the merging vehicle is able to smoothly enter a location in front of or behind the narrow vehicles running in a concentrated manner. As such, the vehicle-to-vehicle communication apparatus 60 of the present teaching allows the vehicles to perform smooth cooperative driving.

The following will specifically describe the vehicle-to-vehicle communication apparatus 60 of the present embodiment. The narrow vehicle is, for example, a leaning vehicle such as a motorcycle. The narrow vehicle does not include a passenger vehicle. The wide vehicle is, for example, a standard four-wheeled vehicle such as a passenger vehicle, or a large four-wheeled vehicle such as a truck. The wide vehicle does not include a leaning vehicle. A single lane is a region where passenger vehicles cannot stop side by side in the lane width direction. In a single lane, lane marks (e.g., white lines) may or may not be provided at the edges. The specific embodiment described below encompasses the entirety of the embodiment shown in FIG. 13.

<Structure of Motorcycle 1>

Figure 1:
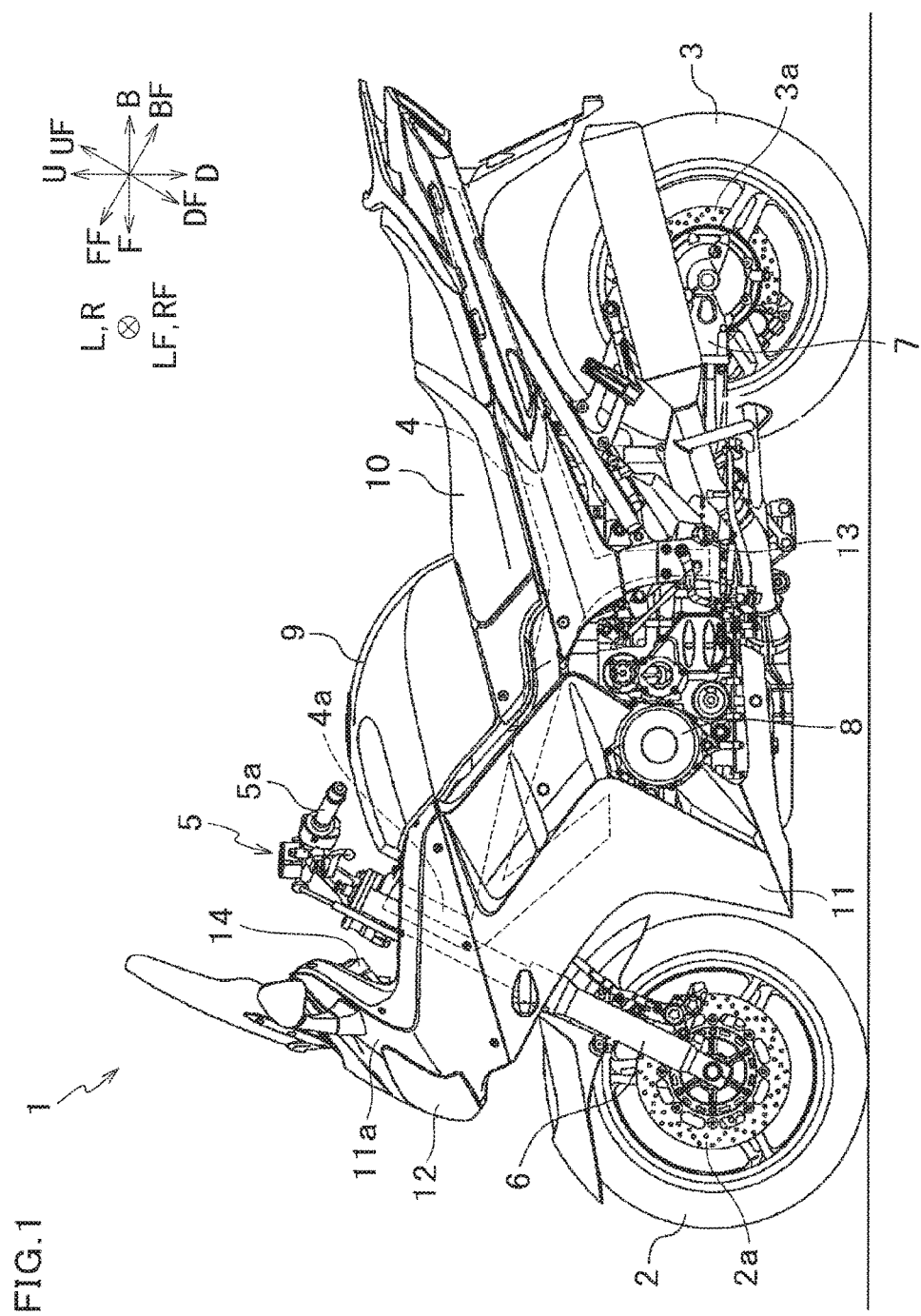
FIG. 1 is a left side view of a motorcycle on which a vehicle-to-vehicle communication apparatus of an embodiment of the present teaching is mounted.
Figure 2:
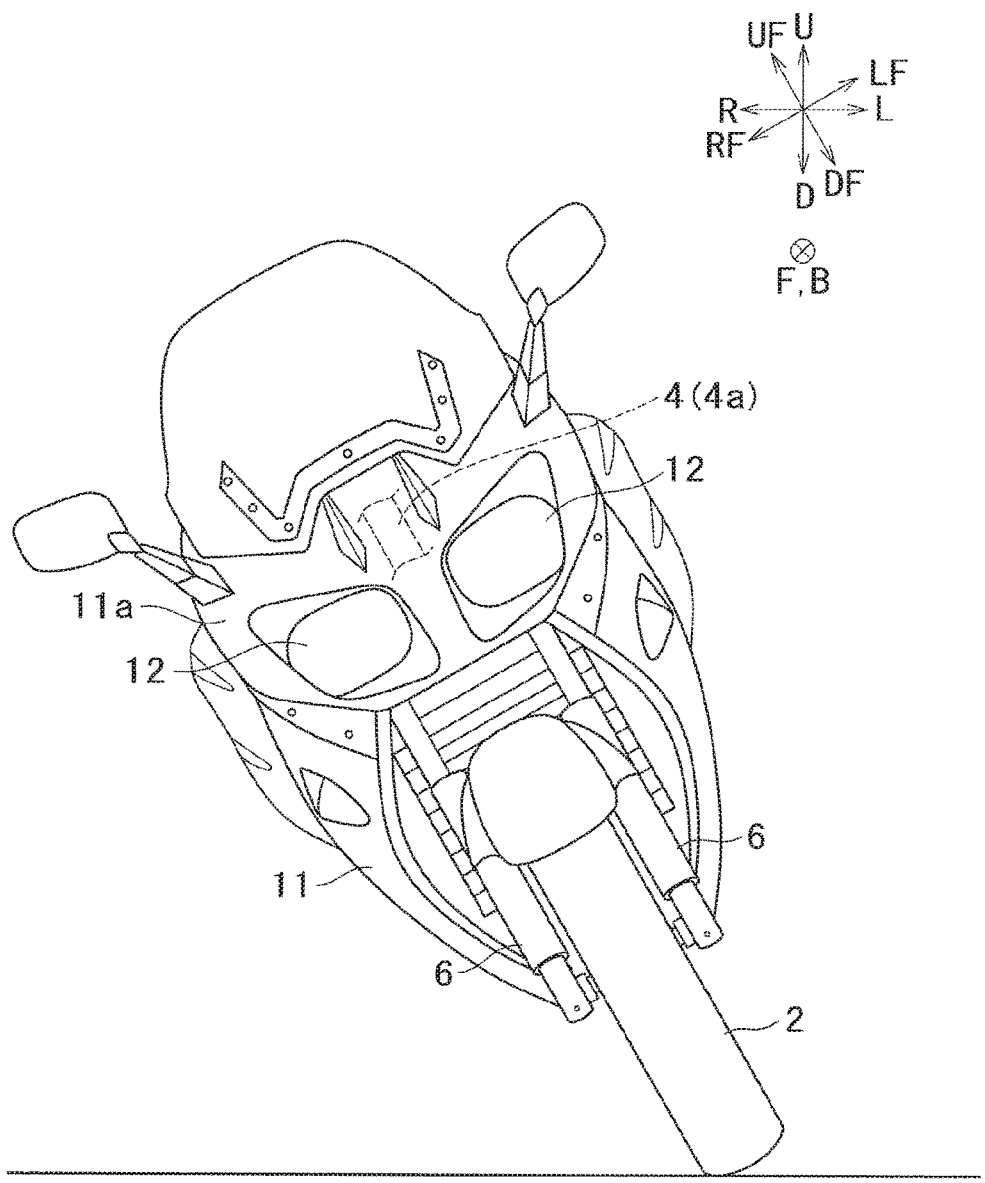
FIG. 2 is a front view showing a state in which the motorcycle of FIG. 1 is turning.

An explanation is given with the assumption that the host vehicle 1 on which the vehicle-to-vehicle communication apparatus 60 is mounted is a motorcycle. Hereinafter, a front-rear direction of the vehicle 1 is a front-rear direction of the motorcycle 1 for a driver seated on a below-described seat 10 of the motorcycle 1. A left-right direction of the vehicle 1 is a left-right direction of the motorcycle 1 for the driver seated on the seat 10. The arrows F, B, L, R, U, and D in the figures indicate forward, rearward, leftward, rightward, upward, and downward of the vehicle 1, respectively. FIG. 1 shows the motorcycle 1 which is in an upright state. FIG. 2 shows the motorcycle 1 which is turning. The road surface is horizontal both in FIG. 1 and FIG. 2.

As shown in FIG. 1, the motorcycle 1 includes a front wheel 2, a rear wheel 3, and a vehicle body frame 4. A head pipe 4a is provided at a front portion of the vehicle body frame 4. A steering shaft (not illustrated) is rotatably inserted into the head pipe 4a. An upper end portion of the steering shaft is connected to a handle unit 5. Upper end portions of paired left and right front forks 6 are secured to the handle unit 5. A lower end portion of each front fork 6 supports the front wheel 2. When the handle unit 5 is steered in the left-right direction, a plane, which passes the center in the width direction of the front wheel 2, leans relative to the front-rear direction (FB direction) of the vehicle 1. Each front fork 6 includes a front suspension (not illustrated) which is configured to absorb shock in the up-down direction.

A rear portion of the vehicle body frame 4 swingably supports a front end portion of each of swingarms 7. Rear end portions of the swingarms 7 support the rear wheel 3. The swingarms 7 are connected to the vehicle body frame 4 via paired left and right rear suspensions (not illustrated) which are configured to absorb shock in the up-down direction. A front brake 2a is provided at the front wheel 2. A rear brake 3a is provided at the rear wheel 3.

The vehicle body frame 4 supports a fuel tank 9 and a seat 10. The vehicle body frame 4 supports an engine unit 8. The engine unit 8 includes an engine main body and a transmission which are not illustrated. Driving force output from the engine main body is transmitted to the rear wheel 3 via the transmission. The vehicle body frame 4 supports a battery (not illustrated). The battery supplies electric power to electronic devices such as a controller 50 (see FIG. 3) and sensors which will be described later.

The vehicle body frame 4 is at least partially covered with a vehicle body cover 11. The vehicle body cover 11 includes a front cowling 11a which is provided at a front portion of the motorcycle 1. A headlight 12 is provided in the front cowling 11a.

Footrests 13 are provided at a lower left portion and a lower right portion of the motorcycle 1, respectively. An unillustrated brake pedal is provided in front of the right footrest 13. As the driver operates the brake pedal, the rotation of the rear wheel 3 is braked.

The handle unit 5 is provided with a left grip 5a (see FIG. 1 and FIG. 2) and a right grip 5b (see FIG. 2). The right grip 5b is an accelerator grip. The right grip 5b is operated to adjust output of the engine main body 8a. To be more specific, the right grip 5b is operated to adjust the opening degree of a throttle valve 18 of the engine unit 8. A brake lever (not illustrated) is provided in front of the right grip 5b. The brake lever is operated for braking the rotation of the front wheel 2.

As shown in FIG. 1, a display 14 is provided in front of the handle unit 5 and behind the front cowling 11a. The display 14 is configured to display, for example, vehicle speed, engine rotation speed, warnings, and the like. The handle unit 5 is provided with switches. Power supply from the battery to an electric device can be started or stopped by a switch operation. Furthermore, the engine unit 8 can be activated or stopped by a switch operation. Furthermore, a screen on the display 14 is switchable by a switch operation. Furthermore, a selection item displayed on the display 14 is selectable by a switch operation.

Arrows UF, DF, FF, BF, LF, and RF in FIG. 1 and FIG. 2 indicate upward, downward, forward, rearward, leftward, and rightward of the vehicle body frame 4, respectively. In this specification, an up-down direction (UFDF direction) of the vehicle body frame 4 is parallel to the axial direction of the head pipe 4a of the vehicle body frame 4. A left-right direction (LFRF direction) of the vehicle body frame 4 is orthogonal to a plane which passes the center in the width direction of the vehicle body frame 4. A front-rear direction (FFBF direction) of the vehicle body frame 4 is orthogonal to both the up-down direction (UFDF direction) of the vehicle body frame 4 and the left-right direction (LFRF direction) of the vehicle body frame 4.

As shown in FIG. 2, the vehicle body frame 4 of the motorcycle 1 is structured to lean rightward of the motorcycle 1 when turning right and lean leftward of the motorcycle 1 when turning left. When the vehicle body frame 4 leans, the vehicle left-right direction (LR direction) of the motorcycle 1 does not coincide with the left-right direction (LFRF direction) of the vehicle body frame 4 in front view. When the vehicle body frame 4 leans in the left-right direction, the up-down direction (UD direction) of the motorcycle 1 does not coincide with the up-down direction (UFDF direction) of the vehicle body frame 4 in front view. When viewed in the upward or downward direction, the front-rear direction (FB direction) of the motorcycle 1 coincides with the front-rear direction (FFBF direction) of the vehicle body frame 4. When the handle unit 5 is rotated, a plane, which passes the center in the width direction of the front wheel 2, leans relative to the front-rear direction (FB direction) of the motorcycle 1 and the front-rear direction (FFBF direction) of the vehicle body frame 4, when viewed in the upward or downward direction. The traveling direction of the motorcycle 1 may not coincide with the front-rear direction of the motorcycle 1.

Figure 3:
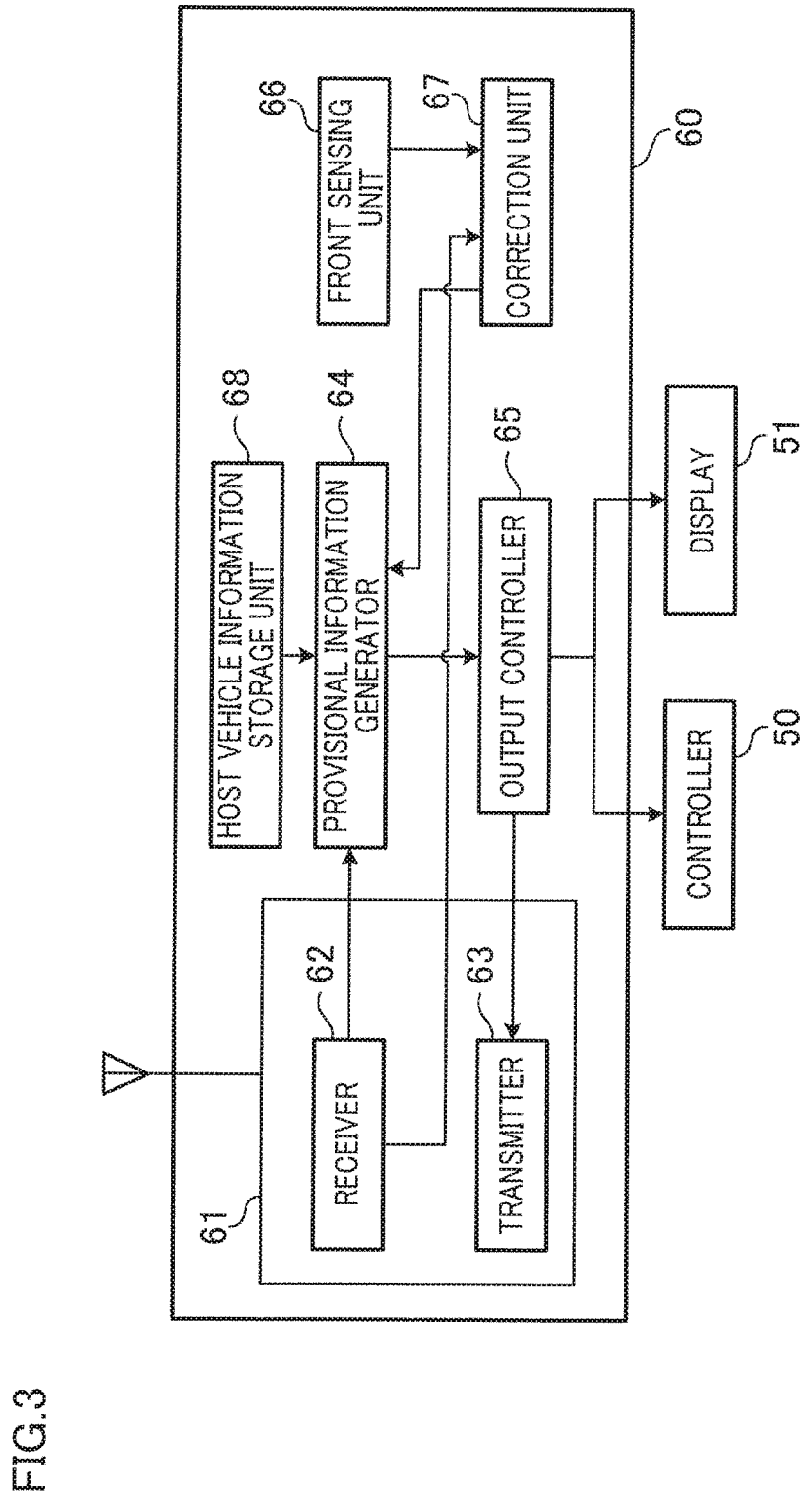
FIG. 3 is a control block diagram of the vehicle-to-vehicle communication apparatus of the embodiment of the present teaching.

As shown in FIG. 3, the motorcycle 1 includes the controller 50 which is configured to control the components of the motorcycle 1. The controller 50 is connected to sensors and the vehicle-to-vehicle communication apparatus 60 of the motorcycle 1. The controller 50 is constituted by a CPU (Central Processing Unit), a ROM (Read Only Memory), a RAM (Random Access Memory), etc. The CPU is configured to perform information processing based on a program and data stored in the ROM and the RAM.

The motorcycle 1 may include a GNSS communication apparatus which is configured to be able to transmit and receive GNSS electric waves. The motorcycle 1 may include a millimeter wave radar and a navigation system. The motorcycle 1 obtains signals regarding the vehicle information of the motorcycle from the sensors, the millimeter wave radar, the navigation system, etc., and stores the obtained vehicle information of that motorcycle. The stored vehicle information of the motorcycle is output to the vehicle-to-vehicle communication apparatus 60. The vehicle information includes information of the type, location, vehicle speed, angle in the traveling direction, and vehicle length. The vehicle information includes information stored in advance such as the type and vehicle length of the vehicle, and information such as the location, vehicle speed, and angle in the traveling direction, which is stored each time the information is obtained. The angle in the traveling direction of a vehicle which is not a leaning vehicle is an angle formed between the front-rear direction of the lane and the direction in which the vehicle runs. The angle in the traveling direction of a leaning vehicle is an angle formed between the front-rear direction of the lane and the front-rear direction (FFBF direction) of the vehicle body frame.

<Structure of Vehicle-To-Vehicle Communication Apparatus 60>

The following will describe the vehicle-to-vehicle communication apparatus 60 of the present embodiment. The vehicle-to-vehicle communication apparatus 60 is mounted on the motorcycle 1. As shown in FIG. 3, the vehicle-to-vehicle communication apparatus 60 includes a wireless communication apparatus 61, the provisional information generator 64, the output controller 65, a front sensing unit 66, a correction unit 67, and the host vehicle information storage unit 68. The vehicle-to-vehicle communication apparatus 60 is formed of a CPU, a ROM, a RAM, etc. The CPU is configured to perform information processing based on a program and data stored in the ROM and the RAM. The wireless communication apparatus 61, the provisional information generator 64, the output controller 65, the front sensing unit 66, the correction unit 67, and the host vehicle information storage unit 68 may be integrally provided or independently provided. When members are independently provided, the members are not connected to each other by a structure but are electrically connected in a wireless manner or connected only by a wire.

[Host Vehicle Information Storage Unit 68]

The host vehicle information storage unit 68 is configured to store vehicle information of the motorcycle 1, which includes vehicle width information related to the vehicle width of the motorcycle 1 and location information related to the location of the motorcycle 1. The motorcycle 1 is a host vehicle. The host vehicle is a vehicle on which the vehicle-to-vehicle communication apparatus of the present teaching is mounted. In the present embodiment, the host vehicle is a motorcycle 1 on which the vehicle-to-vehicle communication apparatus 60 of the present embodiment is mounted.

[Wireless Communication Apparatus 61]

The wireless communication apparatus 61 includes a receiver 62 and a transmitter 63. The wireless communication apparatus 61 performs vehicle-to-vehicle communication with a client vehicle. The vehicle-to-vehicle communication is wireless communication which is performed between vehicles and utilizes short-range wireless communication, etc. Frequencies used for the vehicle-to-vehicle communication are, for example, frequencies in an ITS (Intelligent Transport Systems) band which is a 700 MHz frequency band. As long as vehicle-to-vehicle communication is possible by wireless, frequencies and a communication method of the vehicle-to-vehicle communication are not particularly limited in the wireless communication apparatus 61.

The receiver 62 is configured to receive a signal transmitted from a transmitter of a client vehicle which is capable of performing vehicle-to-vehicle communication. The receiver 62 obtains vehicle information of the client vehicle including vehicle width information related to vehicle width of the client vehicle and location information related to the location of the client vehicle, based on the received signal. In other words, the receiver 62 receives vehicle information of the client vehicle including the vehicle width information and location information of the client vehicle. The client vehicle are vehicles other than the host vehicle. In the present embodiment, the client vehicle is a vehicle other than the motorcycle 1. The location information of a vehicle may be information of the absolute location of the vehicle determined by longitudes and latitudes or information of a relative location of the vehicle determined by the distance and direction from another vehicle, or may include both of these sets of information. Other sets of vehicle information are information of the type, location, vehicle speed, and angle in the traveling direction of the vehicle, for example. The types of the vehicle include two-wheeled vehicles, standard four-wheeled vehicles, and large four-wheeled vehicles. The vehicle width information may include information of the type of a vehicle. The receiver 62 is configured to receive a signal transmitted from a client vehicle which runs in a region in which the motorcycle 1 is able to perform vehicle-to-vehicle communication. The maximum region in which the vehicle-to-vehicle communication is possible is, for example, a circle which is centered on the motorcycle 1 and 300 meters in radius.

The transmitter 63 is configured to transmit vehicle information of the motorcycle 1. The transmitter 63 may transmit provisional information output from the later-described output controller 65. To be more specific, the transmitter 63 transmits a signal regarding the vehicle information of the motorcycle 1. The transmitter 63 may transmit a signal regarding the provisional information output from the output controller 65. The transmitter 63 is configured to be able to perform vehicle-to-vehicle communication with a client vehicle.

[Front Sensing Unit 66 and Correction Unit 67]

The front sensing unit 66 is configured to sense an object in front of the motorcycle 1. The front sensing unit 66 includes, for example, at least one of a camera, a millimeter wave radar, a micrometer wave radar, a laser radar, an ultrasonic sensor, an acoustic sensor, an infrared sensor, a radio wave/electric field sensor, a magnetic sensor, and a range image sensor. Such radars and sensors are configured to radiate millimeter waves or the like forward from the motorcycle 1 and receive reflected waves reflected on an object and returning. The camera may be a monocular camera or a set of dual cameras. The motorcycle 1 on which the vehicle-to-vehicle communication apparatus 60 of the present embodiment is mounted senses a client vehicle running in front of the motorcycle 1. The front sensing unit 66 measures the distance between the motorcycle 1 and the client vehicle. The front sensing unit 66 outputs the measured distance to the correction unit 67. The correction unit 67 calculates the distance between the motorcycle 1 and the client vehicle based on the location information of the motorcycle 1 owned by the motorcycle 1 and the location information of the client vehicle received by the receiver 62. When the calculated distance between the motorcycle 1 and the client vehicle is different from the distance between the motorcycle 1 and the client vehicle measured by the front sensing unit 66, the correction unit 67 corrects the location information of the motorcycle 1 owned by the motorcycle 1 and the location information of the client vehicle received by the receiver 62. The location information of the motorcycle 1 and the location information of the client vehicle, which have been corrected by the correction unit 67, are output to the provisional information generator 64.

[Process (I) in Provisional Information Generator 64]

The provisional information generator 64 executes a process (I). In the process (I), based on sets of vehicle information, the provisional information generator 64 regards a plurality of narrow vehicles determined as satisfying the following three conditions (A), (B), and (C) as a single provisional vehicle. The first condition (A) is that at least one client vehicle and the motorcycle 1 running on the lane of the same running direction as the motorcycle 1 include more than one narrow vehicle. The second condition (B) is that no wide vehicle is in a region formed by connecting the narrow vehicles with one another. For determination regarding the third condition (C), the provisional information generator 64 sets a narrow vehicle region for each narrow vehicle. The third condition (C) is that narrow vehicle regions of a plurality of narrow vehicles overlap one another. In regard to the third condition (C), the provisional information generator 64 regards narrow vehicles in the narrow vehicle regions having overlapping parts as a single provisional vehicle.

Figure 4:
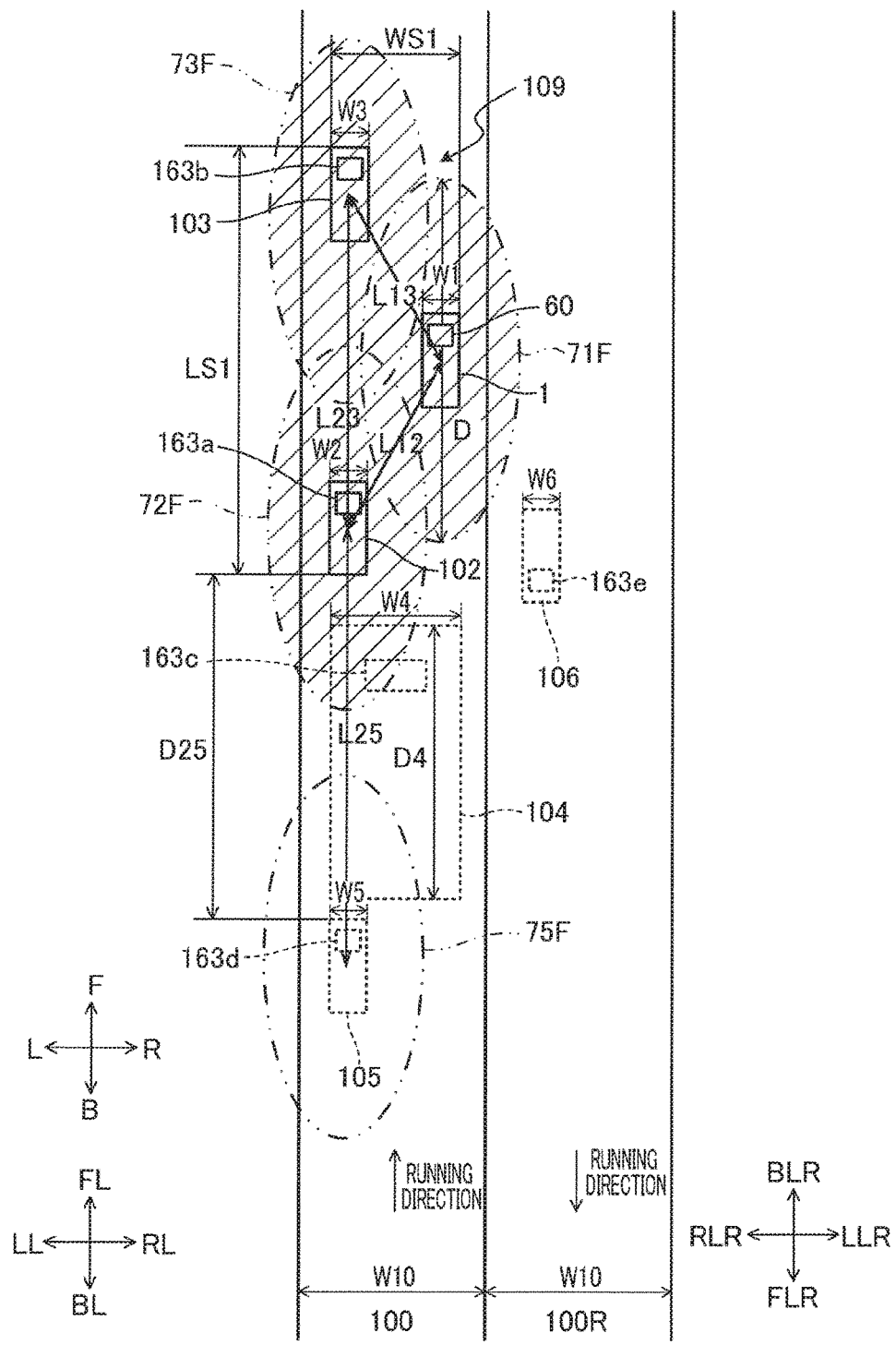
FIG. 4 is a schematic plan view showing a running situation of the vehicle on which the vehicle-to-vehicle communication apparatus of FIG. 3 is mounted.

The process (I) executed by the provisional information generator 64 will be described with reference to FIG. 4. FIG. 4 shows an example of a running situation of vehicles. As shown in FIG. 4, the lane on which the motorcycle 1 runs is referred to as a lane 100. The lane width of the lane 100 does not allow two passenger vehicles stop side by side in the lane width direction. In the lane 100, lane marks (e.g., white lines) may or may not be provided at the edges. Arrows FL, BL, LL, and RL in FIG. 4 indicate forward, rearward, leftward, and rightward of the lane 100, respectively. Hereinafter, a front-rear direction of the lane 100 will be referred to as a lane front-rear direction (FLBL direction). Furthermore, a left-right direction of the lane 100 will be referred to as a lane width direction (LLRL direction). When the lane 100 is viewed in the upward or downward direction, the front-rear direction (FB direction) of the motorcycle 1 coincides with the front-rear direction (FLBL direction) of the lane 100. When the handle unit 5 is rotated, a plane, which passes the center in the width direction of the front wheel 2, leans relative to the front-rear direction (FB direction) of the motorcycle 1 and the front-rear direction (FFBF direction) of the vehicle body frame 4, when viewed in the upward or downward direction. The traveling direction of the motorcycle 1 may not coincide with the front-rear direction of the motorcycle 1. The traveling direction of the motorcycle 1 may not coincide with the front-rear direction of the lane 100. The traveling direction of the lane 100 is a forward direction (FL direction) of the lane 100. The running direction of the lane indicates the direction in which a predetermined vehicle travels on the lane. The lane width of the lane 100 is W10.

The right lane 100R is to the right of the lane 100 (in the RL direction). In the right lane 100R, lane marks (e.g., white lines) may or may not be provided at the edges. Arrows FLR, BLR, LLR, and RLR in FIG. 4 indicate forward, rearward, leftward, and rightward of the right lane 100R, respectively. In FIG. 4, the forward direction (FLR direction) of the right lane 100R is the rearward direction (BL direction) of the lane 100. The rearward direction (BLR direction) of the right lane 100R is the forward direction (FL direction) of the lane 100. The leftward direction (LLR direction) of the right lane 100R is the rightward direction (RL direction) of the lane 100. The rightward direction (RLR direction) of the right lane 100R is the leftward direction (LL direction) of the lane 100. The running direction of the right lane 100R is the forward direction (BFL direction) of the right lane 100R. The lane width of the right lane 100R is W10.

Motorcycles 1, 102, 103, and 105 and a passenger vehicle 104 run on the lane 100. The motorcycle 103 runs in front of the motorcycle 1 (F direction) in the front-rear direction (FB direction) of the motorcycle 1. The motorcycles 102 and 105 run behind the motorcycle 1 (B direction) in the front-rear direction (FB direction) of the motorcycle 1. In the lane 100, the traveling direction of the motorcycles 1, 102, 103, and 105 and the passenger vehicle 104 is the forward direction (FL direction) of the lane 100. A motorcycle 106 runs on the right lane 100R. The running direction of the right lane 100R on which the motorcycle 106 runs is the forward direction (FLR direction) of the right lane 100R. The running direction of the lane 100 on which the motorcycle 1 runs is the forward direction (FL direction) of the lane 100. An angle formed between the forward direction (FLR direction) of the right lane 100R and the forward direction (FL direction) of the lane 100 is 180 degrees. To put it differently, the rearward direction (FLR direction) of the right lane 100R is opposite to the forward direction (FL direction) of the lane 100. On this account, the running direction of the lane 100 on which the motorcycle 1 runs is not identical with the running direction of the right lane 100R on which the motorcycle 106 runs.

The vehicle-to-vehicle communication apparatus 60 of the present embodiment is mounted on the motorcycle 1. The motorcycle 1 is a host vehicle. The motorcycles 102, 103, 105, and 106 and the passenger vehicle 104 are client vehicles. A transmitter 163a is mounted on the motorcycle 102. The transmitter 163a is configured to transmit vehicle information of the motorcycle 102. The vehicle information of the motorcycle 102 transmitted from the transmitter 163a is received by the receiver 62. A transmitter 163b is mounted on the motorcycle 103. The transmitter 163b is configured to transmit vehicle information of the motorcycle 103. The vehicle information of the motorcycle 103 transmitted from the transmitter 163b is received by the receiver 62. A transmitter 163c is mounted on the passenger vehicle 104. The transmitter 163c is configured to transmit vehicle information of the passenger vehicle 104. The vehicle information of the passenger vehicle 104 transmitted from the transmitter 163c is received by the receiver 62. A transmitter 163*d* is mounted on the motorcycle 105. The transmitter 163*d* is configured to transmit vehicle information of the motorcycle 105. The vehicle information of the motorcycle 105 transmitted from the transmitter 163*d* is received by the receiver 62. A transmitter 163*e* is mounted on the motorcycle 106. The transmitter 163*e* is configured to transmit vehicle information of the motorcycle 106. The vehicle information of the motorcycle 106 transmitted from the transmitter 163*e* is received by the receiver 62. The transmitters 163*a*, 163*b*, 163*c*, 163*d*, and 163*e* are configured to be able to perform vehicle-to-vehicle communication. The vehicle-to-vehicle communication apparatus 60 of the present embodiment or another vehicle-to-vehicle communication apparatus may be mounted on each of the motorcycles 102, 103, 105, and 106 and the passenger vehicle 104.

On the lane 100, the motorcycle 1 and the motorcycle 103 are separated from each other in the lane width direction. On the lane 100, the motorcycle 1 and the motorcycle 102 are separated from each other in the lane width direction. On the lane 100, the motorcycle 1 and the motorcycle 103 do not overlap each other when viewed in the lane width direction. On the lane 100, the motorcycle 1 and the motorcycle 102 do not overlap each other when viewed in the lane width direction. The lane width of the lane 100 is W10. The passenger vehicle 104 is a vehicle with a wide width. The vehicle width W4 of the passenger vehicle 104 is equal to or more than a half of the lane width W10. The passenger vehicle 104 is a wide vehicle. The vehicle width W1 of the motorcycle 1 is less than a half of the lane width W10. The vehicle width W2 of the motorcycle 102 is less than a half of the lane width W10. The vehicle width W3 of the motorcycle 103 is less than a half of the lane width W10. The vehicle width W5 of the motorcycle 105 is less than a half of the lane width W10. The motorcycles 1, 102, 103, and 105 are vehicles narrower in vehicle width than the wide vehicle. The motorcycles 1, 102, 103, and 105 are narrow vehicles. Two narrow vehicles can stop side by side in the lane width direction in a single lane 100. Meanwhile, two wide vehicles cannot stop side by side in the lane width direction in the single lane 100. The vehicle width W6 of the motorcycle 106 is less than a half of the lane width W10 of the right lane 100R. The motorcycle 106 is a narrow vehicle.

As described above, in the process (I), based on sets of vehicle information, the provisional information generator 64 regards a plurality of narrow vehicles determined as satisfying the three conditions (A), (B), and (C) as a single provisional vehicle. Based on the running situation shown in FIG. 4, an example of the process (I) executed by the provisional information generator 64 will be described. Sets of vehicle information are vehicle information received from at least one client vehicle by the receiver 62 and the vehicle information of the motorcycle 1. Alternatively, sets of vehicle information are sets of vehicle information received from at least two client vehicles by the receiver 62. In this case, the sets of vehicle information may not include the vehicle information owned by the motorcycle 1. As described above, the receiver 62 is configured to receive a signal transmitted from a client vehicle which runs in a region in which the motorcycle 1 is able to perform vehicle-to-vehicle communication. The region in which the motorcycle 1 is able to perform the vehicle-to-vehicle communication is large and is therefore not shown in FIG. 4.

The first condition (A) is that at least one client vehicle and the motorcycle 1 running on the lane 100 of the same running direction as the motorcycle 1 include more than one narrow vehicle. In the example shown in FIG. 4, the motorcycles 1, 102, 103, and 105 are narrow vehicles running in the lane 100 of the same running direction as the motorcycle 1. Meanwhile, the passenger vehicle 104 runs on the same lane 100 as the motorcycle 1, but is a wide vehicle. In the example shown in FIG. 4, the motorcycle 106 is a client vehicle which runs in the right lane 100R having the running direction different from that of the lane 100 on which the motorcycle 1 runs. The narrow vehicles determined as satisfying the first condition (A) are therefore the motorcycles 1, 102, 103, and 105. The provisional information generator 64 determines whether a client vehicle runs in a lane of the same running direction as the motorcycle 1, based on the vehicle information of the host vehicle and the vehicle information of the client vehicle.

The second condition (B) is that no wide vehicle is in a region formed by connecting the narrow vehicles with one another. The provisional information generator 64 preferably performs determination on the condition (B) based on narrow vehicles which satisfy the condition (A). As shown in FIG. 4, a region formed by connecting at least parts of vehicles with one another is a region formed by line segments connecting the centers of the vehicles with one another. A line segment connecting the center of the motorcycle 1 with the center of the motorcycle 102 will be referred to as a line segment L12. A line segment connecting the center of the motorcycle 1 with the center of the motorcycle 103 will be referred to as a line segment L13. A line segment connecting the center of the motorcycle 102 with the center of the motorcycle 103 will be referred to as a line segment L23. The passenger vehicle 104 is not on the region formed by the line segments L12, L13, and L23. The passenger vehicle 104 is in a region formed by a line segment (not shown) connecting the motorcycle 105 with the motorcycle 1, a line segment L25 connecting the motorcycle 105 with the motorcycle 102, and a line segment (not shown) connecting the motorcycle 105 with the motorcycle 103. The motorcycle 105 therefore does not satisfy the second condition (B). The narrow vehicles determined as satisfying the second condition (B) are therefore the motorcycles 1, 102, and 103.

For determination regarding the third condition (C), the provisional information generator 64 sets a narrow vehicle region for each narrow vehicle. The third condition (C) is that narrow vehicle regions of a plurality of narrow vehicles overlap one another. In regard to the third condition (C), the provisional information generator 64 regards narrow vehicles in the narrow vehicle regions having overlapping parts as a single provisional vehicle. The narrow vehicle region is set for each of narrow vehicles running in the lane of the same running direction as the host vehicle. When the host vehicle is a narrow vehicle, the host vehicle is included in the narrow vehicles running in the lane of the same running direction as the host vehicle. The narrow vehicle region is set based on sets of vehicle information of narrow vehicles included in at least one client vehicle running on the lane 100 of the same running direction as the motorcycle 1 and the motorcycle 1. To put it differently, the provisional information generator 64 sets narrow vehicle regions for narrow vehicles which satisfy at least the first condition (A). The provisional information generator 64 may set narrow vehicle regions only for narrow vehicles which satisfy both the first condition (A) and the second condition (B). The provisional information generator 64 may set a narrow vehicle region for a narrow vehicle other than the above.

As described above, in the example shown in FIG. 4, the motorcycles 102, 103, and 105 and the passenger vehicle 104 run on the lane 100 on which the motorcycle 1 runs. The running direction of the lane 100 on which the motorcycle 1 runs is not identical with the running direction of the right lane 100R on which the motorcycle 106 runs. Narrow vehicles running on the lane of the same running direction as the motorcycle 1 are the motorcycles 102, 103, and 105. Narrow vehicle regions are respectively set for the motorcycles 1, 102, 103, and 105 which are narrow vehicles. The narrow vehicle regions are set based on the sets of vehicle information received from the client vehicles 102, 103, and 105 by the receiver 62 and the vehicle information of the motorcycle 1. The narrow vehicle region of the motorcycle 1 is a narrow vehicle region 71F. The narrow vehicle region of the motorcycle 102 is a narrow vehicle region 72F. The narrow vehicle region of the motorcycle 103 is a narrow vehicle region 73F. The narrow vehicle region of the motorcycle 105 is a narrow vehicle region 75F. The motorcycle 1 is in the narrow vehicle region 71F. The narrow vehicle region 71F is set based on the location information of the motorcycle 1 and is centered on the motorcycle 1. The motorcycle 102 is in the narrow vehicle region 72F. The narrow vehicle region 72F is set based on the location information of the motorcycle 102 and is centered on the motorcycle 102. The motorcycle 103 is in the narrow vehicle region 73F. The narrow vehicle region 73F is set based on the location information of the motorcycle 103 and is centered on the motorcycle 103. The motorcycle 105 is in the narrow vehicle region 75F. The narrow vehicle region 75F is set based on the location information of the motorcycle 105 and is centered on the motorcycle 105.

When the host vehicle and at least one client vehicle include a wide vehicle, the provisional information generator 64 sets the length in the lane front-rear direction of each of the narrow vehicle regions 71F, 72F, 73F, and 75F based on the vehicle length of the wide vehicle. Each of the narrow vehicle regions 71F, 72F, 73F, and 75F is elliptical in shape and centered on each of the motorcycles 1, 102, 103, and 105. The narrow vehicle regions 71F, 72F, 73F, and 75F are identical in shape. For example, the length D in the lane front-rear direction of each of the narrow vehicle regions 71F, 72F, 73F, and 75F is assumed as the vehicle length included in the vehicle information of the wide vehicle received by the motorcycle 1. In the example of FIG. 4, only the passenger vehicle 104 is the wide vehicle whose vehicle information is received by the motorcycle 1. The provisional information generator 64 therefore use the length D in the lane front-rear direction of each of the narrow vehicle regions 71F, 72F, 73F, and 75F as the vehicle length D4 of the passenger vehicle 104. The length in the lane width direction of the narrow vehicle region may be optionally set. The length in the lane width direction of each of the narrow vehicle regions 71F, 72F, 73F, and 75F is, for example, three times as long as the vehicle width of each of the motorcycles 1, 102, 103, and 105. In FIG. 4, the length D in the lane front-rear direction of each of the narrow vehicle regions 72F, 73F, and 75F is not shown.

The inter-vehicle distance D25 between the motorcycle 105 and the motorcycle 102 running in front of the motorcycle 105 is longer than the vehicle length D4 of the passenger vehicle 104. Furthermore, the narrow vehicle region 75F of the motorcycle 105 does not overlap the narrow vehicle region 72F of the motorcycle 102 running in front of the motorcycle 105. Meanwhile, the narrow vehicle regions 71F, 72F, and 73F of the motorcycles 1, 102, and 103 have overlapped parts. Meanwhile, the narrow vehicle region 75F of the motorcycle 105 has no overlapped part. In FIG. 4, the narrow vehicle regions 71F, 72F, and 73F having overlapped parts are indicated by hatching. The narrow vehicles in the narrow vehicle regions 71F, 72F, and 73F having overlapped parts are the motorcycles 1, 102, and 103. As described above, the length in the lane front-rear direction of each of the narrow vehicle regions 71F, 72F, 73F, and 75F is set in accordance with the vehicle length of the wide vehicle.

Because of the above, the narrow vehicles determined as satisfying the third condition (C) are the motorcycles 1, 102, and 103. The provisional information generator 64 regards the motorcycles 1, 102, and 103 determined as satisfying the three conditions (A) to (C) as a single provisional vehicle 109. To put it differently, narrow vehicles regarded as a single provisional vehicle 109 by the provisional information generator 64 are the motorcycles 1, 102, and 103. The motorcycle 105 is not included in the provisional vehicle 109. In FIG. 4, the motorcycles 105 and 106 and the passenger vehicle 104 which are different from the narrow vehicles regarded as the single provisional vehicle 109 are indicated by dotted lines.

The provisional information generator 64 generates provisional information of a provisional vehicle at predetermined time intervals. Assume that the running situation of vehicles is changed from the running situation shown in FIG. 4 to the running situation shown in FIG. 5 after the elapse of the predetermined time interval. An example of the process (I) executed by the provisional information generator 64 in the running situation shown in FIG. 5 will be described.

Figure 5:
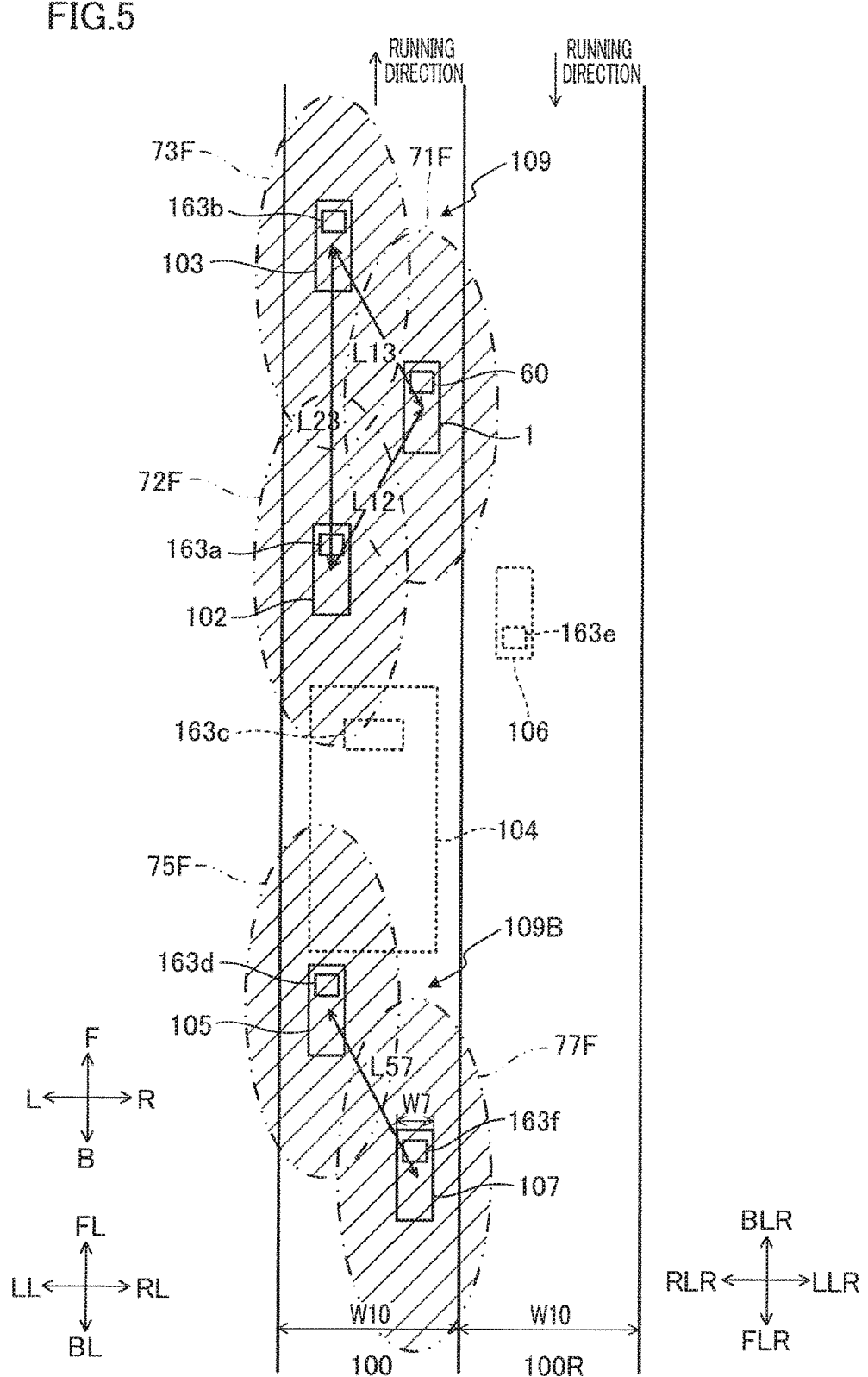
FIG. 5 is a schematic plan view showing a running situation of the vehicle on which the vehicle-to-vehicle communication apparatus of FIG. 3 is mounted.

As shown in FIG. 5, a motorcycle 107 runs on the lane 100, in addition to the motorcycles 1, 102, 103, and 105 and the passenger vehicle 104. A transmitter 163$f$ is mounted on the motorcycle 107. The transmitter 163$f$ is configured to transmit vehicle information of the motorcycle 107. The vehicle information of the motorcycle 107 transmitted from the transmitter 163$f$ is received by the receiver 62. The vehicle-to-vehicle communication apparatus 60 of the present embodiment or another vehicle-to-vehicle communication apparatus may be mounted on the motorcycle 107. The narrow vehicles 1, 102, and 103 included in the provisional vehicle 109 shown in FIG. 5 are identical with the narrow vehicles 1, 102, and 103 included in the provisional vehicle 109 shown in FIG. 4, and are therefore not described again. The motorcycle 107 is a client vehicle. The motorcycle 107 runs behind the motorcycle 105 (B direction) in the front-rear direction (FB direction) of the motorcycle 105. The running direction of the lane 100 on which the motorcycle 105 and the motorcycle 107 run is the lane forward direction (FL direction). In the running situation shown in FIG. 5, the provisional information generator 64 regards a plurality of narrow vehicles determined as satisfying the above-described three conditions (A) to (C) as a single provisional vehicle.

Narrow vehicles which are determined as satisfying the first condition (A) will be described. The vehicle width W7 of the motorcycle 107 is less than a half of the lane width W10. The motorcycle 107 is a narrow vehicle narrower in vehicle width than the wide vehicle. The motorcycle 105 and the motorcycle 107 run on the same lane 100 as the motorcycle 1. To put it differently, the motorcycle 105 and the motorcycle 107 are narrow vehicles running on the lane 100 of the same running direction as the motorcycle 1. The motorcycles 105 and 107 are therefore narrow vehicles determined as satisfying the first condition (A).

Narrow vehicles which are determined as satisfying the second condition (B) will be described. A line segment connecting the motorcycle 105 with the motorcycle 107 will be referred to as a line segment L57. The passenger vehicle 104 is not on the line segment L57. The motorcycles 105 and 107 are therefore narrow vehicles determined as satisfying the second condition (B).

Narrow vehicles which are determined as satisfying the third condition (C) will be described. The provisional information generator 64 sets a narrow vehicle region 77F for the motorcycle 107. The motorcycle 107 is in the narrow vehicle region 77F. The narrow vehicle region 77F is identical in shape with the narrow vehicle region 75F. The length D in the lane front-rear direction of each of the narrow vehicle regions 75F and 77F is therefore the vehicle length D4 of the passenger vehicle 104. The narrow vehicle regions 75F and 77F have overlapped parts. The motorcycles 105 and 107 are therefore narrow vehicles determined as satisfying the third condition (C). In FIG. 5, the narrow vehicle regions 75F and 77F having overlapped parts are indicated by hatching.

Figure 11:
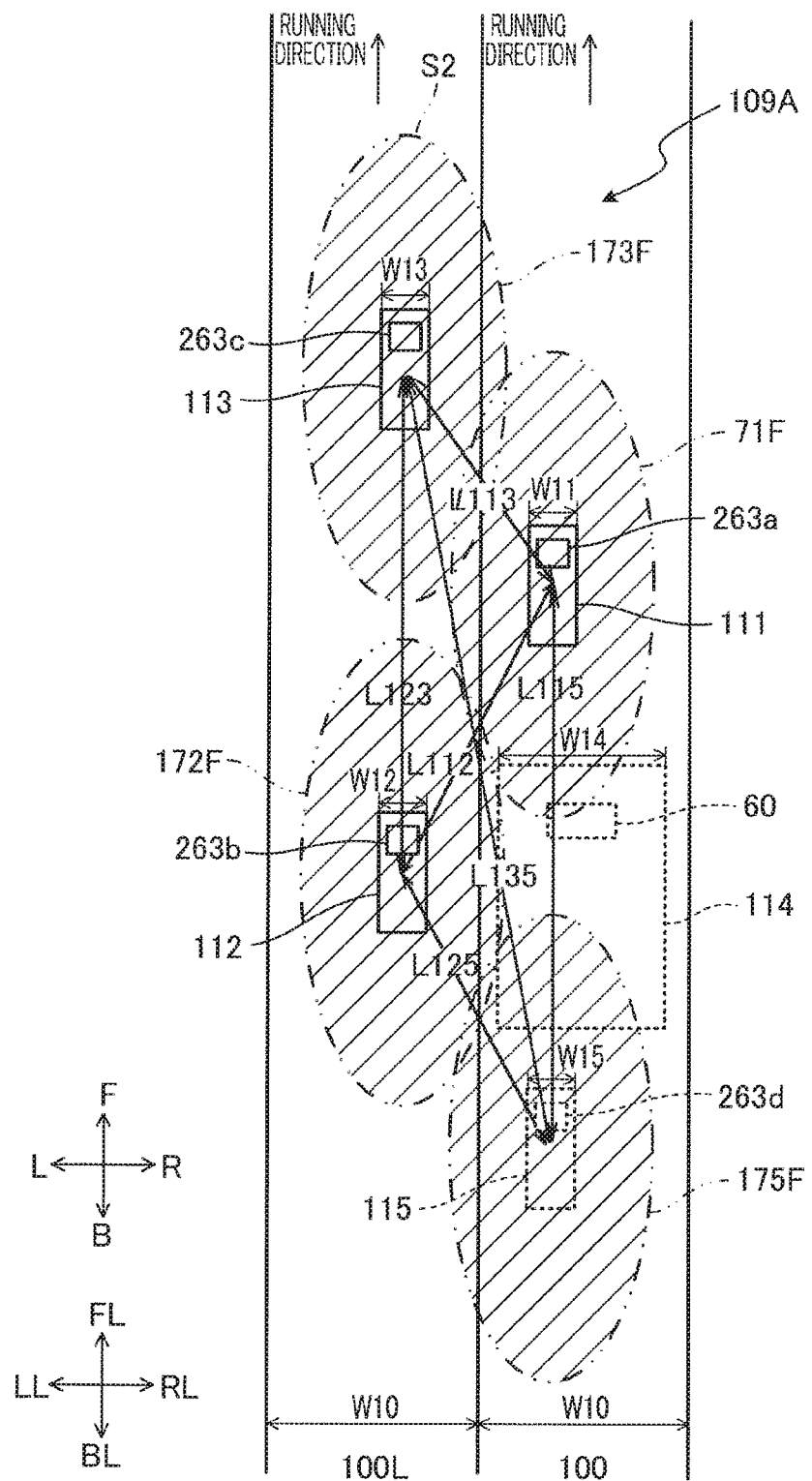
FIG. 11 is a schematic plan view showing another running situation of the vehicle on which the vehicle-to-vehicle communication apparatus of FIG. 3 is mounted.

Because of the above, the provisional information generator 64 regards the motorcycles 105 and 107 determined as satisfying the three conditions (A) to (C) as a single provisional vehicle 109B. To put it differently, narrow vehicles regarded as a single provisional vehicle 109B by the provisional information generator 64 are the motorcycles 105 and 107. Furthermore, as described above, the provisional information generator 64 regards the motorcycles 1, 102, and 103 determined as satisfying the three conditions (A) to (C) as a single provisional vehicle 109. To put it differently, in the running situation shown in FIG. 11, there are the provisional vehicle 109B including the motorcycles 105 and 107 and the provisional vehicle 109 including the motorcycles 1, 102, and 103. To put it differently, the provisional information generator 64 is able to set a plurality of provisional vehicles 109 and 109B. In FIG. 11, the motorcycle 106 and the passenger vehicle 104 which are different from the narrow vehicles included in the single provisional vehicles 109 and 109B are indicated by dotted lines.

[Process (II) in Provisional Information Generator 64]

The provisional information generator 64 then executes a process (II). Based on the running situation shown in FIG. 4, an example of the process (II) executed by the provisional information generator 64 will be described. In the process (II), the provisional information generator 64 generates provisional information of a provisional vehicle from sets of vehicle information of narrow vehicles which are included in the provisional vehicle. Generation of provisional information from sets of vehicle information of narrow vehicles may indicate calculation of provisional information from the sets of vehicle information of the narrow vehicles by a predetermined calculation formula. Generation of provisional information from sets of vehicle information of narrow vehicles may indicate that at least one of the sets of vehicle information of the narrow vehicles is used as the provisional information. Generation of provisional information from sets of vehicle information of narrow vehicles may indicate that new information which is different from the sets of vehicle information of the narrow vehicles is generated. Generation of provisional information from sets of vehicle information of narrow vehicle may be a combination of the above. In the running situation shown in FIG. 4, provisional information of a provisional vehicle 109 is generated from the sets of vehicle information of the motorcycles 1, 102, and 103 which are included in the provisional vehicle 109.

Provisional information includes at least one of the following sets of information. One set of provisional information is identification information for identifying a provisional vehicle. The identification information is information by which, in the running situation shown in FIG. 4, a distinction between a provisional vehicle 109 and other vehicles is possible. One set of provisional information is types of narrow vehicles included in a provisional vehicle. In the running situation shown in FIG. 4, the type of narrow vehicles 1, 102, and 103 which are included in the provisional vehicle is a motorcycle. One set of provisional information is the number of narrow vehicles included in a provisional vehicle. In the running situation shown in FIG. 4, the number of the narrow vehicles 1, 102, and 103 which are included in the provisional vehicle 109 is 3. One set of provisional information is the locations of narrow vehicles included in a provisional vehicle. In the running situation shown in FIG. 4, the provisional information is the locations of the narrow vehicles 1, 102, and 103 which are included in the provisional vehicle 109. In this regard, the locations of the narrow vehicles which are included in the provisional vehicle 109 may not include all locations of the motorcycles 1, 102, and 103. The locations of the narrow vehicles which are included in the provisional vehicle 109 may be the location of the motorcycle 103 which is the frontmost one in the provisional vehicle 109 and the location of the motorcycle 102 which is the rearmost one in the provisional vehicle 109. The locations of the narrow vehicles which are included in the provisional vehicle 109 may be only the location of the motorcycle 103 which is the frontmost one in the provisional vehicle 109. One set of provisional information is the vehicle speed of narrow vehicles included in a provisional vehicle. In the running situation shown in FIG. 4, the provisional information is the vehicle speed of the narrow vehicles 1, 102, and 103 which are included in the provisional vehicle 109. The vehicle speed of the narrow vehicles 1, 102, and 103 included in the provisional vehicle 109 is, for example, the maximum value, the minimum value, or an average value calculated from the vehicle speeds of the motorcycles 1, 102, and 103 obtained from the vehicle information. One set of provisional information is angles in the traveling direction of narrow vehicles included in a provisional vehicle. In the running situation shown in FIG. 4, the provisional information is the angles in the traveling direction of the narrow vehicles 1, 102, and 103 which are included in the provisional vehicle 109. One set of provisional information is the length of all narrow vehicles included in a provisional vehicle in the lane front-rear direction. In the running situation shown in FIG. 4, the provisional information is the length LS1 in the lane front-rear direction of all of the narrow vehicles 1, 102, and 103 which are included in the provisional vehicle 109. In other words, the length in the lane front-rear direction of all narrow vehicles included in the provisional vehicle 109 is the length from the frontmost end to the rearmost end of the narrow vehicles 1, 102, and 103 in the provisional vehicle 109 in the lane front-rear direction. One set of provisional information is the length of all narrow vehicles included in a provisional vehicle in the lane width direction. In the running situation shown in FIG. 4, the provisional information is the length WS1 in the lane width direction of all of the narrow vehicles 1, 102, and 103 which are included in the provisional vehicle 109. In other words, the length in the lane width direction of all narrow vehicles 1, 102, and 103 included in the provisional vehicle 109 is the length from the left end to the right end of the narrow vehicles 1, 102, and 103 in the provisional vehicle 109 in the left-right direction. One set of provisional information is instruction information which is a common instruction to narrow vehicles included in a provisional vehicle. In the running situation shown in FIG. 4, the provisional information is instruction information which is a common instruction to the narrow vehicles 1, 102, and 103 which are included in the provisional vehicle

109. The instruction information is, for example, an instruction to decrease the vehicle speed. The instruction information is, for example, generated from running situations such as plural sets of vehicle information owned by the motorcycle 1.

[Other Processes in Provisional Information Generator 64]

In addition to the above, the provisional information generator 64 selects one representative vehicle from narrow vehicles which are included in a single provisional vehicle. Information regarding a representative vehicle is included in provisional information. A representative vehicle may be a host vehicle or a client vehicle. A representative vehicle may be selected based on a predetermined condition. The predetermined condition is, for example, that the representative vehicle is the narrow vehicle running at the frontmost end of the provisional vehicle. The predetermined condition is, for example, that the representative vehicle is the narrow vehicle running at the rearmost end of the provisional vehicle. The predetermined condition is, for example, that the representative vehicle is the narrow vehicle running at the center of the provisional vehicle. In the running situation shown in FIG. 4, the provisional information generator 64 selects the representative vehicle from the motorcycles 1, 102, and 103 which are included in the provisional vehicle 109. The provisional information generator 64 may select, as the representative vehicle, the motorcycle 103 which is the frontmost one among the motorcycles 1, 102, and 103 which are included in the provisional vehicle 109. The provisional information generator 64 may select, as the representative vehicle, the motorcycle 102 which is the rearmost one among the motorcycles 1, 102, and 103 which are included in the provisional vehicle 109. The provisional information generator 64 may select, as the representative vehicle, the motorcycle 102 which is the central one among the motorcycles 1, 102, and 103 which are included in the provisional vehicle 109.

The representative vehicle transmits provisional information. When the representative vehicle is the motorcycle 1, provisional information output from the later-described output controller 65 to the transmitter 63 is transmitted from the transmitter 63. In this case, the motorcycles 102 and 103 which are not the representative vehicle 1 among the motorcycles 1, 102, and 103 included in the provisional vehicle may not transmit provisional information. When the representative vehicle is not the motorcycle 1, the motorcycle 1 and client vehicles which are not the representative vehicle may not transmit provisional information output from the later-described output controller 65 to the transmitter 63. The details of control by the output controller 65 will be given later.

The provisional information generator 64 is able to change the representative vehicle to another one of the motorcycles 1, 102, and 103 which are included in a single provisional vehicle. To be more specific, the provisional information generator 64 changes the representative vehicle in accordance with the running situation of vehicles including the provisional vehicle. The running situation of the vehicles include road situations at a junction and a branch point. For example, when a junction is approaching, the narrow vehicle running at the frontmost end of the provisional vehicle may be selected as the representative vehicle. When the inter-vehicle distance between a vehicle running behind the provisional vehicle and the narrow vehicle at the trailing end of the provisional vehicle is short and there is a possibility that the following vehicle overtakes that narrow vehicle, the narrow vehicle at the rearmost end of the provisional vehicle may be selected as the representative vehicle. As such, at a junction, a branch point, etc., the representative vehicle is changed to a narrow vehicle which is close to the junction, the branch point, etc. With this arrangement, a client vehicle, which is approaching a junction, a branch point, etc., is able to swiftly receive provisional information from the representative vehicle in a provisional vehicle. When the host vehicle is not included in the provisional vehicle, the running situation of the vehicles includes the positional relation between the host vehicle and the provisional vehicle. When the host vehicle is included in the provisional vehicle, the running situation of the vehicles includes the positional relation between the host vehicle and a narrow vehicle which is among the narrow vehicles included in the provisional vehicle and is different from the host vehicle. In the running situation shown in FIG. 4, the motorcycle 1 is included in the provisional vehicle. On this account, the running situation of the vehicles includes the positional relation between the motorcycle 1 and the motorcycles 102 and 103 among the narrow vehicles included in the provisional vehicle.

Figure 6:
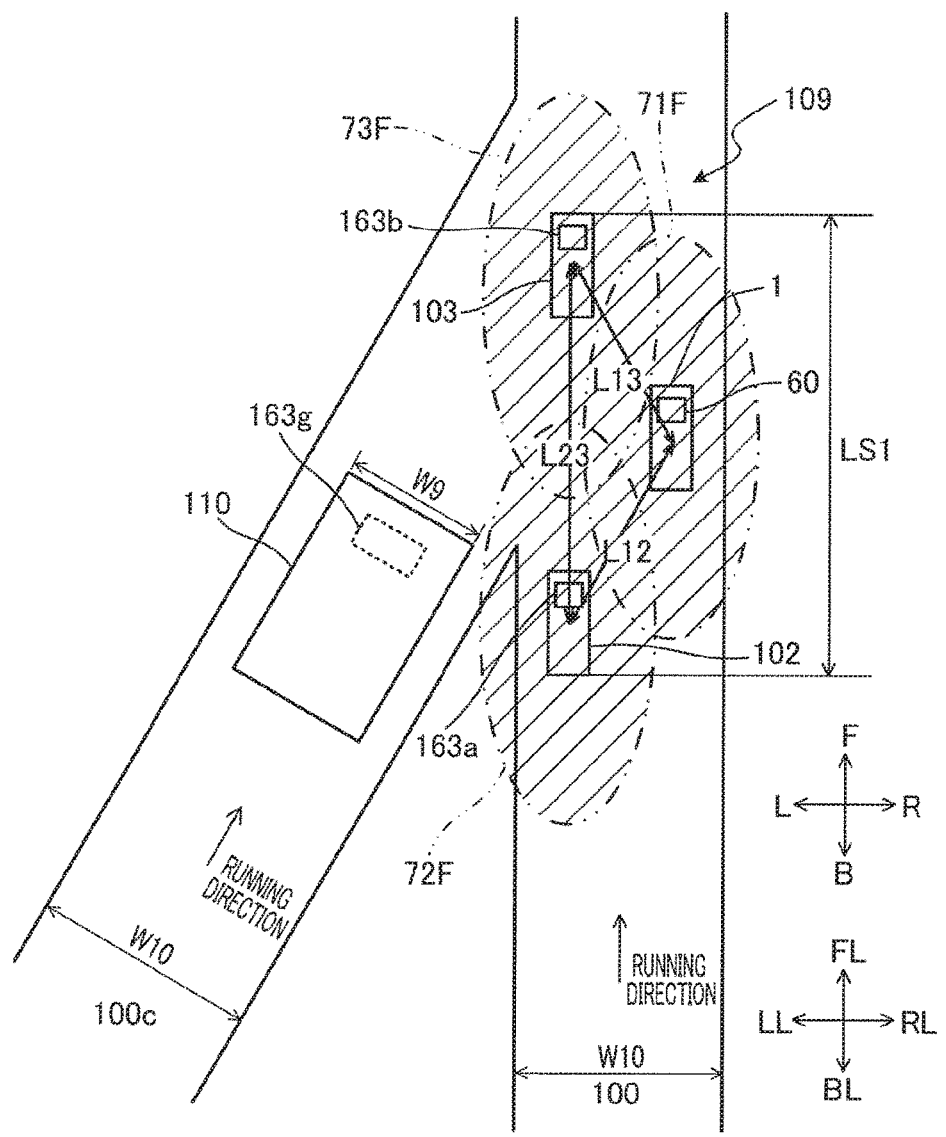
FIG. 6 is a schematic plan view showing a running situation of the vehicle on which the vehicle-to-vehicle communication apparatus of FIG. 3 is mounted.
Figure 7:
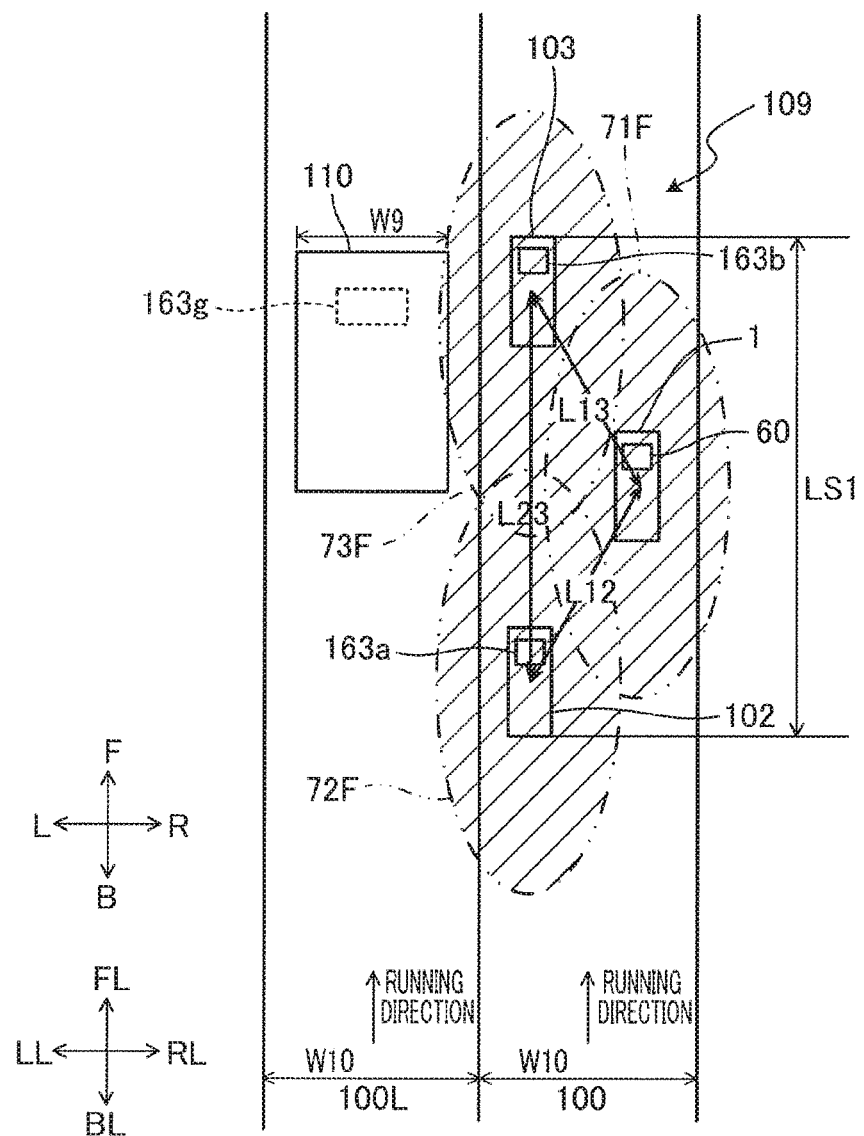
FIG. 7 is a schematic plan view showing a running situation of the vehicle on which the vehicle-to-vehicle communication apparatus of FIG. 3 is mounted.

The following will describe an example of a process executed by the provisional information generator 64 when the running situation of vehicles is either the running situation shown in FIG. 6 or the running situation shown in FIG. 7. In the running situation shown in FIG. 6, the motorcycles 1, 102, and 103 run at around a junction. In the running situation shown in FIG. 6, the motorcycles 1, 102, and 103 run on the lane 100 in the same manner as in the running situation shown in FIG. 4. The lane 100C merges into a lane 100 from the left side of the lane 100. In the lane 100C, lane marks (e.g., white lines) may or may not be provided at the edges. The running direction of the lane 100C is identical with that of the lane 100. A passenger vehicle 110 runs on the lane 100C. The passenger vehicle 110 is a client vehicle. A transmitter 163$g$ is mounted on the passenger vehicle 110. The transmitter 163$g$ is configured to transmit vehicle information of the passenger vehicle 110. The vehicle information of the passenger vehicle 110 transmitted from the transmitter 163$g$ is received by the receiver 62 of the vehicle-to-vehicle communication apparatus 60 mounted on the motorcycle 1. The lane width of the lane 100C is W10. The vehicle width W9 of the passenger vehicle 110 is equal to or more than a half of the lane width W10. The passenger vehicle 110 is a wide vehicle. The vehicle-to-vehicle communication apparatus 60 of the present embodiment or another vehicle-to-vehicle communication apparatus may be mounted on the passenger vehicle 110. In the running situation shown in FIG. 6, the passenger vehicle 110 is trying to enter the lane 100 from the lane 100C. The motorcycles 1, 102, and 103 run at around a junction. In this case, the provisional information generator 64 may select the motorcycle closest to the junction as the representative vehicle, among the motorcycles 1, 102, and 103 included in the provisional vehicle 109. The motorcycle closest to the junction is determined based on the location information, the lane information, etc. The lane information is obtained from road-to-vehicle communication, sensors, etc., for example. In the running situation shown in FIG. 6, the representative vehicle is the motorcycle 102.

The motorcycle 102 which is the representative vehicle transmits provisional information. Upon receiving the provisional information, the passenger vehicle 110 is able to perform cooperative driving with the motorcycles 1, 102, and 103 included in the provisional vehicle 109, by utilizing the provisional information such as the length LS1 of the entire provisional vehicle 109 in the lane front-rear direction. To be more specific, the passenger vehicle 110 having received the provisional information is able to smoothly enter a location behind the motorcycles 1, 102, and 103 which are regarded as a single provisional vehicle 109, instead of a location between the motorcycles 1, 102, and 103.

In the running situation shown in FIG. 7, the motorcycles 1, 102, and 103 run on the lane 100 in the same manner as in the running situation shown in FIG. 4. A left lane 100L is to the left of the lane 100 (in the LL direction). The forward direction, rearward direction, leftward direction, and rightward direction of the left lane 100L are identical with the forward direction, rearward direction, leftward direction, and rightward direction of the lane 100. In the left lane 100L, lane marks (e.g., white lines) may or may not be provided at the edges. A passenger vehicle 110 runs on the left lane 100L. The passenger vehicle 110 is a client vehicle. The passenger vehicle 110 is not explained because it is identical with the passenger vehicle 110 shown in FIG. 6. The lane width of the left lane 100L is W10. The vehicle width W9 of the passenger vehicle 110 is equal to or more than a half of the lane width W10. The passenger vehicle 110 is a wide vehicle. The running direction of the left lane 100L on which the passenger vehicle 110 runs is the lane forward direction (FL direction). The running direction of the lane 100 on which the motorcycles 1, 102, and 103 run is identical with the running direction of the left lane 100L on which the passenger vehicle 110 runs. In the running situation shown in FIG. 7, the passenger vehicle 110 is trying to enter the lane 100 from the left lane 100L. The motorcycles 1, 102, and 103 run in the vicinity of the passenger vehicle 110. In this case, the provisional information generator 64 may select the motorcycle closest to the passenger vehicle 110 as the representative vehicle, among the motorcycles 1, 102, and 103 included in the provisional vehicle 109. The motorcycle closest to the passenger vehicle 110 is determined based on the location information, etc. In the running situation shown in FIG. 7, the representative vehicle is the motorcycle 103.

The motorcycle 103 which is the representative vehicle transmits provisional information. Upon receiving the provisional information, the passenger vehicle 110 is able to perform cooperative driving with the motorcycles 1, 102, and 103 included in the single provisional vehicle 109, by utilizing the provisional information such as the length LS1 of the entire provisional vehicle 109 in the traveling direction. To be more specific, the passenger vehicle 110 having received the provisional information is able to smoothly enter a location in front of or behind the motorcycles 1, 102, and 103 regarded as a single provisional vehicle 109, instead of a location between the motorcycles 1, 102, and 103.

Time intervals of generation of provisional information by the provisional information generator 64 are changeable. To be more specific, time intervals of generation of provisional information by the provisional information generator 64 are changed in accordance with the running situation of vehicles including the motorcycles 1, 102, and 103 included in the provisional vehicle 109. For example, time intervals may be shortened when the acceleration of the motorcycle 1 included in the provisional vehicle 109 is rapidly changed or the motorcycle 1 included in the provisional vehicle 109 enters another lane. This is because the narrow vehicles included in the provisional vehicle 109 are likely to be changed in these cases.

[Output Controller 65]

The output controller 65 is configured to output provisional information. To be more specific, the output controller 65 outputs provisional information to the transmitter 63, the controller 50, and a display 51. The transmitter 63, the controller 50, and the display 51 may be integrated with the vehicle-to-vehicle communication apparatus 60 or may be independent therefrom. When members are provided to be independent from the vehicle-to-vehicle communication apparatus 60, the members are not connected to each other by a structure but are electrically connected in a wireless manner or connected only by a wire.

The following will describe an example of control in which the output controller 65 outputs provisional information. For example, the output controller 65 outputs identification information for identifying a provisional vehicle to the display 51. Furthermore, the output controller 65 controls the display 51 so that the display 51 displays the identification information output from the output controller 65. For example, the output controller 65 may indicate on the display 51 that the host vehicle is a narrow vehicle included in a provisional vehicle, by means of a lamp, etc. This allows the driver watching the display 51 to recognize that the host vehicle is included in the provisional vehicle. In the running situation shown in FIG. 4, the output controller 65 indicates on the display 51 that the motorcycle 1 is a narrow vehicle included in the provisional vehicle 109, by means of a lamp, etc. Alternatively, for example, the output controller 65 may cause the display 51 to display the positional relation between the host vehicle and client vehicles based on the location information of the client vehicles and the location information of the host vehicle, and to display narrow vehicles included in a provisional vehicle and vehicles different therefrom, in different colors. In the running situation shown in FIG. 4, the output controller 65 causes the display 51 to display the positional relation between the motorcycles 1, 102, 103, 105, and 106 and the passenger vehicle 104. The output controller 65 causes the display 51 to display the motorcycles 1, 102, and 103 included in the provisional vehicle 109 and the motorcycles 105 and 106 and the passenger vehicle 104 which are not included in the provisional vehicle 109, in different colors. Alternatively, for example, the output controller 65 may cause the display 51 to display the positional relation between the host vehicle and client vehicles based on the location information of the client vehicles and the location information of the host vehicle, and to display a single sign collectively indicating all narrow vehicles included in a provisional vehicle. In the running situation shown in FIG. 4, the output controller 65 causes the display 51 to display a sign (e.g., an ellipse) surrounding all of the motorcycles 1, 102, and 103 in order to indicate the provisional vehicle 109. Alternatively, for example, the output controller 65 may cause the display 51 to display the number of narrow vehicles included in a provisional vehicle. In the running situation shown in FIG. 4, the output controller 65 causes the display 51 to display that the number of narrow vehicles included in the provisional vehicle 109 is 3 (narrow vehicles 1, 102, and 103). Alternatively, for example, the output controller 65 may cause the display 51 to display the positional relation between the host vehicle and client vehicles based on the location information of the client vehicles and the location information of the host vehicle, and to indicate by color whether each of the client vehicles is a narrow vehicle or a wide vehicle. In the running situation shown in FIG. 4, the output controller 65 causes the display 51 to display the positional relation between the motorcycles 1, 102, 103, 105, and 106 and the passenger vehicle 104. Furthermore, the output controller 65 causes the display 51 to show the motorcycles 1, 102, 103, 105, and 106 which are narrow vehicles and the passenger vehicle 104 which is a wide vehicle, in different colors. Alternatively, for example, the output controller 65 may cause the display 51 to display the positional relation between the host vehicle and client vehicles based on the location information of the client vehicles and the location information of the host vehicle, and to indicate the types of the host vehicle and the client vehicles by color. In the running situation shown in FIG. 4, the output controller 65 causes the display 51 to display the positional relation between the motorcycles 1, 102, 103, 105, and 106 and the passenger vehicle 104. Furthermore, the output controller 65 causes the display 51 to show the motorcycles 1, 102, 103, 105, and 106 and the passenger vehicle 104 in different colors. This allows the driver watching the display 51 to recognize the positional relation between the host vehicle and the client vehicles, etc. As such, the vehicle-to-vehicle communication apparatus 60 of the present embodiment allows the vehicles to perform smooth cooperative driving.

The output controller 65 outputs the vehicle information of the motorcycle 1 and the provisional information to the transmitter 63. Furthermore, the output controller 65 controls the transmitter 63 so as to cause the transmitter 63 to transmit the information output from the output controller 65. When the motorcycle 1 is the representative vehicle, the output controller 65 transmits the provisional information from the transmitter 63. For example, the provisional information output from the output controller 65 to the transmitter 63 may be identification information by which narrow vehicles included in a provisional information are identified and instruction information by which an instruction is commonly given to the narrow vehicles included in the provisional vehicle. The instruction information is, for example, an instruction to decrease the vehicle speed. A client vehicle having received the provisional information reads the identification information by the controller and determines whether the client vehicle is included in the provisional vehicle. When the client vehicle is included in the provisional vehicle, the client vehicle is able to output the instruction information to the controller and perform automatic driving. When the client vehicle is included in the provisional vehicle, the client vehicle is able to output the instruction information to the display to give a notification to the driver. Meanwhile, when the client vehicle is not included in the provisional vehicle, the client vehicle does not use the instruction information for the control.

The output controller 65 controls transmission power of the transmitter 63. In accordance with information related to the representative vehicle, the output controller 65 changes the transmission power of the transmitter 63. The output controller 65 changes the maximum region in which vehicle-to-vehicle communication is possible, by changing the transmission power of the transmitter 63. The output controller 65 changes the transmission power of the transmitter 63 based on whether the motorcycle 1 is the representative vehicle. To be more specific, the transmission power of the transmitter 63 when the motorcycle 1 is the representative vehicle is increased as compared to cases where the host vehicle is not the representative vehicle. Furthermore, the output controller 65 changes the transmission power of the transmitter 63 based on the running location of the motorcycle 1. In the running situation shown in FIG. 4, the motorcycle 1 is neither the frontmost one nor the rearmost one of the motorcycles 1, 102, and 103 which are included in the provisional vehicle 109. When the motorcycle 1 is the representative vehicle, the output controller 65 therefore controls the transmitter 63 so that the transmission power in the forward direction from the motorcycle 1 is identical with the transmission power in the rearward direction from the motorcycle 1. In this case, two transmitters 63 may be provided at a front portion and a rear portion of the motorcycle 1, respectively. When the motorcycle 1 is the representative vehicle running at the frontmost end of the provisional vehicle, the output controller 65 arranges the transmission power of the transmitter 63 in the forward direction from the motorcycle 1 to be higher than the transmission power of the transmitter 63 in the rearward direction from the motorcycle 1. When the motorcycle 1 is the representative vehicle running at the rearmost end of the provisional vehicle, the output controller 65 arranges the transmission power of the transmitter 63 in the rearward direction from the motorcycle 1 to be higher than the transmission power of the transmitter 63 in the forward direction from the motorcycle 1. When the motorcycle 1 is the representative vehicle and the vehicle information is transmitted to a client vehicle included in the provisional vehicle, the output controller 65 decreases the transmission power of the transmitter 63. This decreased transmission power is termed first power. When the motorcycle 1 is the representative vehicle and the vehicle information is transmitted to a client vehicle not included in the provisional vehicle, the output controller 65 causes the transmission power of the transmitter 63 to be higher than the first power.

Meanwhile, when the motorcycle 1 is not the representative vehicle, the output controller 65 controls the transmitter 63 not to transmit provisional information. When the motorcycle 1 is not the representative vehicle, the output controller 65 decreases the transmission power of the transmitter 63 or arranges the transmission power of the transmitter 63 to be zero for a predetermined time. To be more specific, when the motorcycle 1 is not the representative vehicle, the output controller 65 is able to decrease the transmission power of the transmitter 63 to a level with which vehicle-to-vehicle communication with a client vehicle included in the provisional vehicle is still possible.

The output controller 65 is able to change time intervals of transmission of provisional information from the transmitter 63 to a client vehicle. Time intervals of transmission of vehicle information from the transmitter 63 may be different from time intervals of transmission of provisional information from the transmitter 63. To be more specific, when the motorcycle 1 is the representative vehicle, the output controller 65 changes time intervals of transmission of provisional information to a client vehicle from the transmitter 63 in accordance with the running situation of narrow vehicles included in a provisional vehicle. For example, time intervals may be shortened when the narrow vehicles included in the provisional vehicle are running around a junction. Whether the narrow vehicles are running around a junction is determined by the output controller 65 based on location information included in the provisional information, lane information of the lane on which the provisional vehicles run, etc. The lane information is obtained from road-to-vehicle communication, sensors, etc., for example. With this arrangement, a client vehicle trying to merge at a junction is able to frequently receive the provisional information of the provisional vehicle. The client vehicle is able to merge by utilizing the latest provisional information of the provisional vehicle.

The output controller 65 is able to change time intervals of transmission of vehicle information from the transmitter 63 to a client vehicle. When the host vehicle is included in the provisional vehicle, the output controller 65 controls time intervals of transmission of vehicle information from the transmitter 63 to the client vehicle to be longer than the time intervals when the host vehicle is not included in the provisional vehicle. To put it differently, the output controller 65 is able to change time intervals of transmission of vehicle information from the transmitter 63 to a client vehicle, in accordance with whether the host vehicle is included in the provisional vehicle. In the motorcycle 1 included in the provisional vehicle, time intervals of transmission of vehicle information to other vehicles included in the provisional vehicle are arranged to be longer than the time intervals in cases where the motorcycle 1 is not included in the provisional vehicle. This makes it possible to reduce an amount of information transmitted between a plurality of narrow vehicles included in the provisional vehicle.

The output controller 65 is configured to output provisional information to the controller 50. The controller 50 uses the provisional information for controlling running of the motorcycle 1. For example, in the running situation shown in FIG. 4, the output controller 65 outputs the vehicle speed of the motorcycles 1, 102, and 103 included in the provisional vehicle 109 to the controller 50. The vehicle speed of the motorcycles 1, 102, and 103 included in the provisional vehicle 109 is the maximum value, the minimum value, or an average value calculated from the vehicle speeds of the motorcycles 1, 102, and 103 obtained from the vehicle information. The controller 50 then changes the vehicle speed based on the vehicle speed of the motorcycles 1, 102, and 103 included in the provisional vehicle 109, which has been output.

<Control Procedure of Vehicle-To-Vehicle Communication Apparatus 60>

An example of control procedure of the vehicle-to-vehicle communication apparatus 60 of the present embodiment will be described with reference to flowcharts shown in FIG. 8 and FIG. 9. The example of control procedure of the vehicle-to-vehicle communication apparatus 60 described below is control procedure in the running situation of vehicles shown in FIG. 4. The vehicle-to-vehicle communication apparatus 60 of the present embodiment is mounted on the motorcycle 1. The vehicle-to-vehicle communication apparatus 60 of the present embodiment executes steps S1 to S11 shown in FIG. 8 at predetermined time intervals. The predetermined time intervals are suitably changeable.

Figure 8:
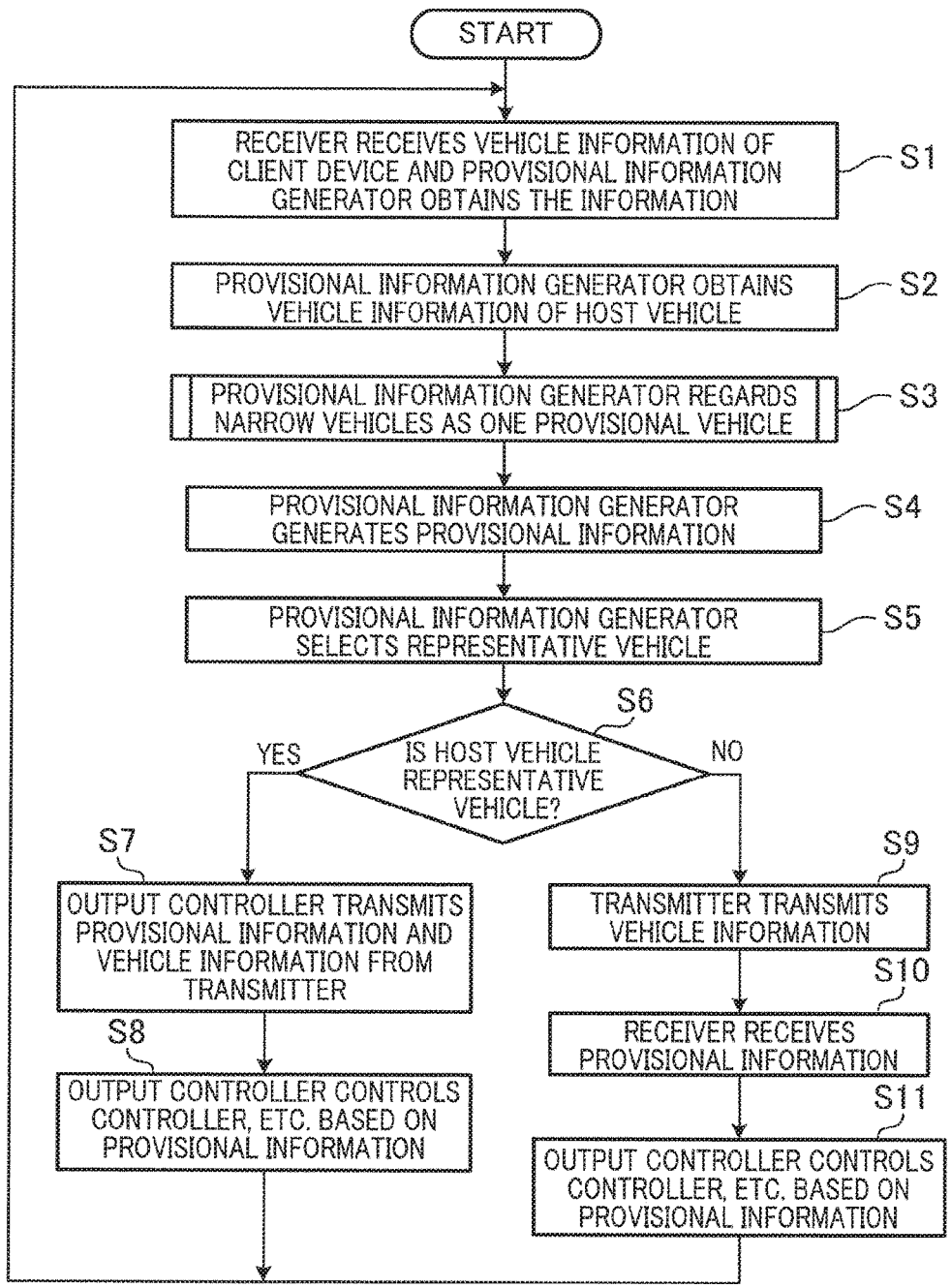
FIG. 8 is a flowchart showing an example of control procedure of the vehicle-to-vehicle communication apparatus of the embodiment of the present teaching.

As shown in FIG. 8, to begin with, the receiver 62 receives signals transmitted from transmitters of the motorcycles 102, 103, and 105 and the passenger vehicle 104 by vehicle-to-vehicle communication (step S1). The receiver 62 receives vehicle information of each of the motorcycles 102, 103, and 105 and the passenger vehicle 104, which includes vehicle width information and location information. In other words, based on the received signals, the receiver 62 obtains vehicle information of each of the motorcycles 102, 103, and 105 and the passenger vehicle 104, which includes vehicle width information and location information. The provisional information generator 64 then obtains the vehicle information of each of the motorcycles 102, 103, and 105 and the passenger vehicle 104, having been received by the receiver 62 (step S1).

Furthermore, the provisional information generator 64 obtains vehicle information of the motorcycle 1, which includes the vehicle width information and the location information of the motorcycle 1 (step S2).

Furthermore, the provisional information generator 64 regards a plurality of narrow vehicles as a single provisional vehicle (step S3). The step S3 will be detailed with reference to the flowchart shown in FIG. 9. FIG. 9 is a flowchart showing an example of steps by which the provisional information generator 64 regards a plurality of narrow vehicles as a single provisional vehicle.

Figure 9:
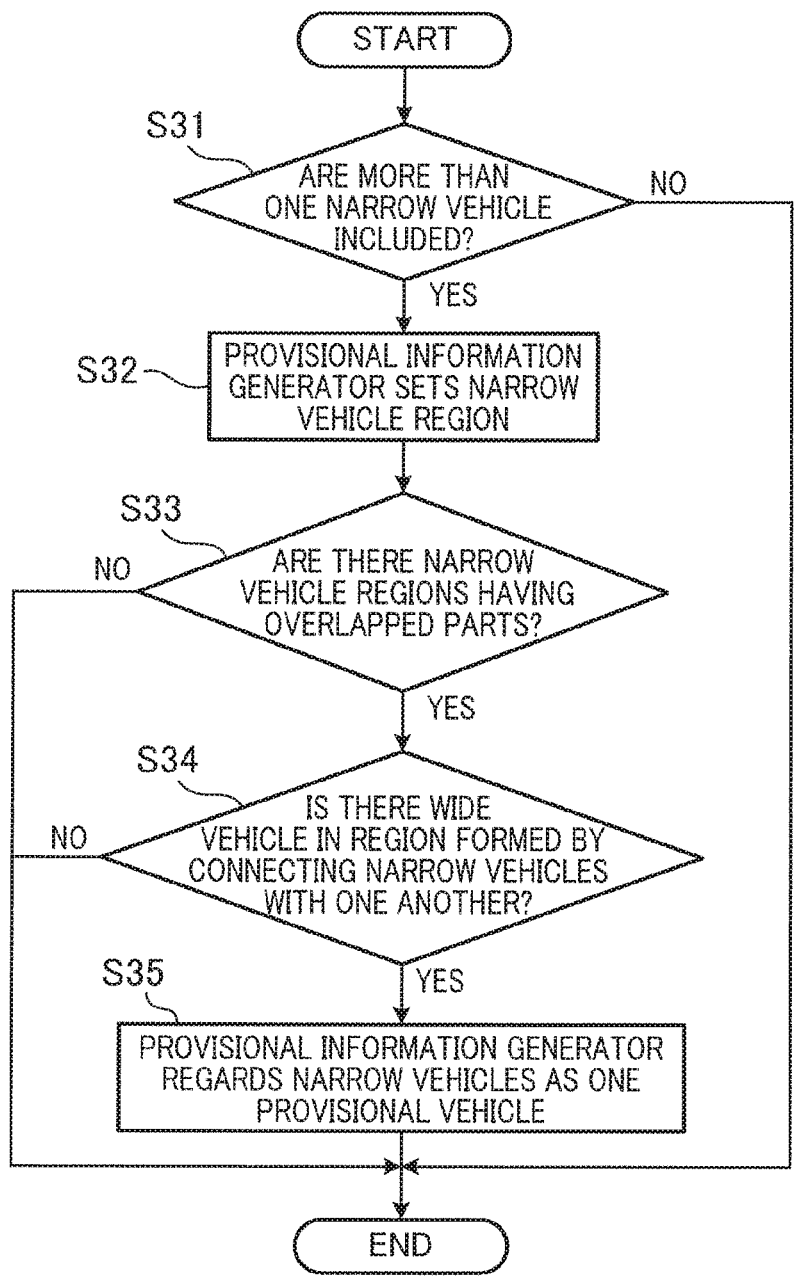
FIG. 9 is a flowchart showing an example of control procedure of the vehicle-to-vehicle communication apparatus of the embodiment of the present teaching.

As shown in FIG. 9, the provisional information generator 64 determines whether client vehicles running on a lane of the same running direction as the host vehicle and the host vehicle include narrow vehicles (step S31). In other words, in the step S31, determination on the first condition (A) is performed to allow the provisional information generator 64 to regard a plurality of narrow vehicles as a single provisional vehicle. The motorcycles 102, 103, and 105 and the passenger vehicle 104 run on the same lane 100 as the motorcycle 1. The running direction of the lane 100 on which the motorcycle 1 runs is not identical with the running direction of the right lane 100R on which the motorcycle 106 runs. The provisional information generator 64 therefore determines that the narrow vehicles running on the lane 100 of the same running direction as the motorcycle 1 include motorcycles 1, 102, 103, and 105.

Subsequently, the provisional information generator 64 sets narrow vehicle regions for the narrow vehicles running on the lane of the same running direction as the host vehicle, based on the vehicle information of the client vehicles running on the lane of the same running direction as the host vehicle and the vehicle information of the host vehicle (step S32). In other words, in the step S32 and a later-described step S33, determination on the third condition (C) is performed to allow the provisional information generator 64 to regard a plurality of narrow vehicles as a single provisional vehicle. The provisional information generator 64 sets narrow vehicle regions for the respective motorcycles 1, 102, 103, and 105 which are narrow vehicles running on the lane of the same running direction as the motorcycle 1. The narrow vehicle region of the motorcycle 1 is a narrow vehicle region 71F. The narrow vehicle region of the motorcycle 102 is a narrow vehicle region 72F. The narrow vehicle region of the motorcycle 103 is a narrow vehicle region 73F. The narrow vehicle region of the motorcycle 105 is a narrow vehicle region 75F.

Subsequently, the provisional information generator 64 determines whether there are narrow vehicle regions having overlapped parts (step S33). The narrow vehicle regions having overlapped parts are the narrow vehicle regions 71F, 72F, and 73F.

Subsequently, the provisional information generator 64 determines whether a wide vehicle is in a region formed by connecting the narrow vehicles with one another (step S34). In other words, in the step S34, determination on the second condition (B) is performed to allow the provisional information generator 64 to regard a plurality of narrow vehicles as a single provisional vehicle. A line segment connecting the motorcycle 1 with the motorcycle 102 will be referred to as a line segment L12. A line segment connecting the motorcycle 1 with the motorcycle 103 will be referred to as a line segment L13. A line segment connecting the motorcycle 102 with the motorcycle 103 will be referred to as a line segment L23. The passenger vehicle 104 is not in the region formed by the line segments L12, L13, and L23.

In the steps S31 to S34, the provisional information generator 64 regards a plurality of narrow vehicles determined as satisfying the above-described three conditions (A) to (C) as a single provisional vehicle (step S35). To put it differently, the motorcycles 1, 102, and 103 are regarded as a single provisional vehicle 109.

Subsequently, as shown in FIG. 8, the provisional information generator 64 generates provisional information of the provisional vehicle (step S4). The provisional information is, for example, generated from the sets of vehicle information of the motorcycles 1, 102, and 103 which are included in the provisional vehicle 109.

Subsequently, the provisional information generator 64 selects a representative vehicle from the narrow vehicles which are included in the provisional vehicle (step S5). Information regarding a representative vehicle is included in provisional information. A representative vehicle may be a host vehicle or a client vehicle. A representative vehicle is selected from the motorcycles 1, 102, and 103 included in the provisional vehicle 109, based on a predetermined condition.

Subsequently, the output controller 65 determines whether the host vehicle is the representative vehicle (step S6). When the motorcycle 1 is the representative vehicle (YES in step S6), the output controller 65 transmits the provisional information and the vehicle information of the motorcycle 1 which is host vehicle from the transmitter 63 (step S7). The output controller 65 then controls the controller 50 and the display 51 based on the generated provisional information (step S8).

Meanwhile, when the motorcycle 1 is not the representative vehicle (NO in step S6), the output controller 65 transmits the vehicle information of the motorcycle 1 from the transmitter 63 (step S7). In other words, the output controller 65 does not transmit the provisional information from the transmitter 63. The receiver 62 then receives the provisional information transmitted from the representative vehicle (step S10). The output controller 65 then controls the controller 50 and the display 51 based on the provisional information (step S11).

The vehicle-to-vehicle communication apparatus 60 of the present embodiment has the following characteristics.

The vehicle-to-vehicle communication apparatus 60 includes the host vehicle information storage unit 68, the receiver 62, the provisional information generator 64, and the output controller 65. The host vehicle information storage unit 68 is configured to store vehicle information of the motorcycle 1, which includes vehicle width information related to the vehicle width of the motorcycle 1 and location information related to the location of the motorcycle 1. The receiver 62 receives vehicle information of a client vehicle including vehicle width information related to vehicle width of the client vehicle and location information related to the location of the client vehicle, from the transmitter of the client vehicle. The transmitter of the client vehicle is configured to be able to perform vehicle-to-vehicle communication. Based on sets of vehicle information, the provisional information generator 64 regards a plurality of narrow vehicles determined as satisfying the following two conditions (A) and (B) as a single provisional vehicle. The first condition (A) is that client vehicles and the host vehicle running on the lane of the same running direction as the host vehicle include more than one narrow vehicle. For example, in the running situation shown in FIG. 4, the motorcycle 106 which does not run on the lane of the same running direction as the motorcycle 1 may not be regarded as a single provisional vehicle 109. The second condition (B) is that no wide vehicle is in a region formed by line segments connecting the narrow vehicles with one another. For example, in the running situation shown in FIG. 4, when the passenger vehicle 104 is in a region formed by line segments connecting the centers of the motorcycles 1, 102, 103, and 105 with one another, the narrow vehicles 1, 102, 103, and 105 cannot run in a concentrated manner, and hence cooperative driving is difficult. On this account, in the running situation shown in FIG. 4, because the passenger vehicle 104 is in a region formed by line segments connecting the centers of the motorcycle 1 and the motorcycle 105 with each other, the centers of the motorcycle 102 and the motorcycle 105 with each other, and the centers of the motorcycle 103 and the motorcycle 105 with each other, the motorcycle 105 is not included in the single provisional vehicle 109. For this reason, in the running situation shown in FIG. 4, the motorcycles 1, 102, and 103 regarded as one provisional vehicle 109 are narrow vehicles running in a concentrated manner. The provisional information generator 64 generates provisional information of the one provisional vehicle from the sets of vehicle information of the narrow vehicles 1, 102, 103, and 105 which are regarded as the provisional vehicle. The output controller 65 outputs the provisional information. To be more specific, the output controller 65 outputs the provisional information to the transmitter 63, the controller 50, the display 51, etc. With the arrangement above, based on the provisional information of the provisional vehicle, the motorcycles 1, 102, 103, and 105 running in a concentrated manner are able to perform cooperative driving with another vehicle. To put it differently, because the motorcycles 1, 102, 103, and 105 running in a concentrated manner are regarded as a single vehicle, the narrow vehicles are able to perform cooperative driving with another vehicle. As such, the vehicle-to-vehicle communication apparatus 60 of the present embodiment allows the vehicles to perform smooth cooperative driving.

In addition to the above, based on sets of vehicle information, the provisional information generator 64 regards a plurality of narrow vehicles determined as satisfying the following condition (C) as a single provisional vehicle. The third condition (C) is that the narrow vehicles are in narrow vehicle regions having overlapping parts. The provisional information generator 64 sets the narrow vehicle regions based on sets of vehicle information of narrow vehicles included in at least one client vehicle running on the lane of the same running direction as the motorcycle 1 and the motorcycle 1. In the running situation shown in FIG. 4, narrow vehicle regions 71F, 72F, 73F, and 75F are set for the respective motorcycles 1, 102, 103, and 105 running on the lane of the same running direction as the motorcycle 1. The vehicle information includes at least location information. The narrow vehicle region includes a narrow vehicle. The narrow vehicle regions 71F, 72F, 73F, and 75F are set based on the sets of location information of the motorcycles 1, 102, 103, and 105 included in the narrow vehicle regions. Subsequently, the provisional information generator 64 performs determination for narrow vehicle regions 71F, 72F, and 73F having overlapped parts. The narrow vehicle region 75F does not overlap any other narrow vehicle regions. On this account, the motorcycle 105 which runs at a location remote from the motorcycles 1, 102, and 103 is not included in the one provisional vehicle. To put it differently, the motorcycles 1, 102, and 103 running in a concentrated manner are regarded as a single vehicle. As such, the vehicle-to-vehicle communication apparatus 60 of the present embodiment allows the vehicles to perform smooth cooperative driving.

In addition to the above, the provisional information generator 64 is able to set the length in the lane front-rear direction of the narrow vehicle region in accordance with the vehicle length of a wide vehicle included in the vehicle information of the motorcycle 1 or the vehicle information of a client vehicle received by the motorcycle 1. In the running situation shown in FIG. 4, the length D of each of the narrow vehicle regions 71F, 72F, 73F, and 75F in the lane front-rear direction can be set in accordance with the vehicle length D4 of the passenger vehicle 104 which is a wide vehicle. The narrow vehicle regions having overlapped parts are the narrow vehicle regions 71F, 72F, and 73F. The length D in the lane front-rear direction of each of the narrow vehicle regions 71F, 72F, 73F, and 75F is set in accordance with the vehicle length of the wide vehicle whose vehicle information is received by the motorcycle 1. For example, each of the lengths in the lane front-rear direction of the narrow vehicle regions 71F, 72F, 73F, and 75F is set as the vehicle length of the wide vehicle whose vehicle information is received by the motorcycle 1, i.e., the vehicle length D4 of the passenger vehicle 104. In this case, the distance between the motorcycle 1 and the motorcycle 102 in the lane front-rear direction, the distance between the motorcycle 1 and the motorcycle 103 in the lane front-rear direction, and the distance between the motorcycle 102 and the motorcycle 103 are each shorter than the vehicle length D4 of the passenger vehicle 104. On this account, the passenger vehicle 104 having the vehicle length D4 cannot enter between the motorcycles 1, 102, and 103 included in the one provisional vehicle 109. On this account, the passenger vehicle 104 is able to smoothly perform cooperative driving with the motorcycles 1, 102, and 103 included in the single provisional vehicle 109. As such, the vehicle-to-vehicle communication apparatus 60 of the present embodiment allows the vehicles to perform further smooth cooperative driving.

Provisional information includes at least one of the following sets of information. One set of provisional information is identification information for identifying a provisional vehicle. The identification information is information by which a distinction between a provisional vehicle and other vehicles is possible. One set of provisional information is a type of narrow vehicles included in a provisional vehicle. In the running situation shown in FIG. 4, the type of narrow vehicles which are included in the provisional vehicle is a motorcycle. One set of provisional information is the number of narrow vehicles included in a provisional vehicle. In the running situation shown in FIG. 4, the number of the narrow vehicles which are included in the provisional vehicle is 3. One set of provisional information is the locations of narrow vehicles included in a provisional vehicle. In the running situation shown in FIG. 4, the provisional information is the locations of the narrow motorcycles 1, 102, and 103 which are included in the provisional vehicle. The locations of the narrow vehicles which are included in the provisional vehicle may be at least one of the location of the narrow vehicle which is the frontmost one in the provisional vehicle or the location of the narrow vehicle which is the rearmost one in the provisional vehicle. One set of provisional information is the vehicle speed of narrow vehicles included in a provisional vehicle. In the running situation shown in FIG. 4, the vehicle speed of the narrow vehicles included in the provisional vehicle is the vehicle speed of the motorcycles 1, 102, and 103. One set of provisional information is angles in the traveling direction of narrow vehicles included in a provisional vehicle. In the running situation shown in FIG. 4, the angles in the traveling direction of the narrow vehicles included in the provisional vehicle are the angles in the traveling direction of the motorcycles 1, 102, and 103. One set of provisional information is the length of the entire provisional vehicle in the lane front-rear direction. In the running situation shown in FIG. 4, the length in the lane front-rear direction of the entire provisional vehicle 109 is the length in the lane front-rear direction of all of the motorcycles 1, 102, and 103. One set of provisional information is the length of the entire provisional vehicle in the lane width direction. In the running situation shown in FIG. 4, the length in the lane width direction of the entire provisional vehicle 109 is the length in the lane width direction of all of the motorcycles 1, 102, and 103. One set of provisional information is instruction information which is a common instruction to narrow vehicles included in a provisional vehicle. In the running situation shown in FIG. 4, the provisional information is instruction information which is a common instruction to the motorcycles 1, 102, and 103. The vehicle-to-vehicle communication apparatus 60 of the present embodiment is able to utilize such provisional information output from the output controller 65 in the motorcycle 1 on which the vehicle-to-vehicle communication apparatus 60 of the present embodiment is mounted. As such, the vehicle-to-vehicle communication apparatus 60 of the present embodiment allows the vehicles to perform smooth cooperative driving.

The vehicle-to-vehicle communication apparatus 60 of the present embodiment further includes the transmitter 63 which is configured to transmit, to a client vehicle, the provisional information output from the output controller 65 and the vehicle information of the motorcycle 1. The client vehicle having received the provisional information and the vehicle information is able to use the provisional information and the vehicle information for cooperative driving. As such, the vehicle-to-vehicle communication apparatus 60 of the present embodiment allows vehicles to perform smooth cooperative driving.

In addition to the above, the provisional information generator 64 is able to select one representative vehicle from narrow vehicles which are included in a single provisional vehicle. In the running situation shown in FIG. 4, one representative vehicle can be selected from the motorcycles 1, 102, and 103 included in the provisional vehicle. The representative vehicle transmits provisional information. The representative vehicle may be selected based on a predetermined condition. The representative vehicle transmits provisional information. Meanwhile, narrow vehicles in the provisional vehicle, which are not the representative vehicle, may not transmit the provisional information. Because the narrow vehicles other than the representative vehicle do not transmit the provisional information, an amount of information transmitted from the provisional vehicle is reduced. As such, the vehicle-to-vehicle communication apparatus 60 of the present embodiment allows vehicles to perform smooth cooperative driving.

In addition to the above, the provisional information generator 64 is able to change the representative vehicle to another one of narrow vehicles which are included in a single provisional vehicle. To be more specific, the provisional information generator changes the one representative vehicle in accordance with the running situation of the narrow vehicles included in the one provisional vehicle. The running situation of the narrow vehicles included in the one provisional vehicle is, for example, road situations at a junction and a branch point. When the host vehicle is not included in the one provisional vehicle, the running situation of the narrow vehicles included in the one provisional vehicle includes the positional relation between the host vehicle and the provisional vehicle. When the host vehicle is included in the one provisional vehicle, the running situation of the narrow vehicles included in the one provisional vehicle includes the positional relation between the host vehicle and the client vehicles which are the narrow vehicles included in the provisional vehicle and are different from the host vehicle. Because the representative vehicle is changeable, it is possible to allow the vehicles to perform smooth cooperative driving.

When the motorcycle 1 is included in the provisional vehicle 109, in accordance with information related to the representative vehicle, the output controller 65 changes the transmission power of the transmitter 63. To put it differently, the output controller 65 changes a region in which vehicle-to-vehicle communication is possible, by changing the transmission power of the transmitter 63. To be more specific, the output controller 65 increases the transmission power when the motorcycle 1 is the representative vehicle, as compared to cases where the motorcycle 1 is not the representative vehicle. When the motorcycle 1 is the representative vehicle and the provisional information is transmitted to a client vehicle included in the provisional vehicle, the output controller 65 decreases the transmission power of the transmitter 63. When the motorcycle 1 is the representative vehicle and the provisional information is transmitted to a client vehicle which is not included in the provisional vehicle, the output controller 65 increases the transmission power of the transmitter 63. As such, because the transmission power of the transmitter 63 is changed when the motorcycle 1 is the representative vehicle, vehicle-to-vehicle communication between the motorcycle 1 which is the representative vehicle and a client vehicle can be certainly done. As such the vehicle-to-vehicle communication apparatus 60 of the present embodiment allows vehicles to perform smooth cooperative driving. When the motorcycle 1 is not the representative vehicle, the output controller 65 decreases the transmission power of the transmitter 63 or arranges the transmission power of the transmitter 63 to be zero for a predetermined time. This makes it possible to reduce an amount of information transmitted from the provisional vehicle. As such, the vehicle-to-vehicle communication apparatus 60 of the present embodiment allows vehicles to perform smooth cooperative driving.

In addition to the above, the output controller 65 is able to change time intervals of transmission of provisional information from the transmitter 63 to a client vehicle. To be more specific, in accordance with the running situation of narrow vehicles included in a provisional vehicle, the output controller 65 preferably changes time intervals of transmission of provisional information to a client vehicle from the transmitter 63. For example, in the running situation shown in FIG. 4, time intervals may be shortened when the motorcycles 1, 102, and 103 included in the one provisional vehicle 109 are running at around a junction. With this arrangement, a client vehicle trying to enter the lane on which the motorcycles 1, 102, and 103 included in the provisional vehicle 109 is able to frequently receive the provisional information of the provisional vehicle 109. The client vehicle is able to merge by utilizing the latest provisional information of the provisional vehicle 109. As such the vehicle-to-vehicle communication apparatus 60 of the present embodiment allows vehicles to perform smooth cooperative driving.

The output controller 65 is able to change time intervals of transmission of vehicle information from the transmitter 63 to a client vehicle. Time intervals of transmission of vehicle information from the transmitter 63 may be different from time intervals of transmission of provisional information from the transmitter 63. When the motorcycle 1 is included in the provisional vehicle, the output controller 65 controls time intervals of transmission of vehicle information from the transmitter 63 to the client vehicle to be longer than the time intervals when the motorcycle 1 is not included in the provisional vehicle. To put it differently, in the running situation shown in FIG. 4, the output controller 65 changes time intervals of transmission of vehicle information from the transmitter 63 to a client vehicle, in accordance with whether the motorcycle 1 is included in the provisional vehicle 109. This makes it possible to reduce an amount of information transmitted between the motorcycles 1, 102, and 103 included in the provisional vehicle 109. As such, the vehicle-to-vehicle communication apparatus 60 of the present embodiment allows vehicles to perform smooth cooperative driving.

In addition to the above, time intervals of generation of provisional information by the provisional information generator 64 are changeable. To be more specific, time intervals of generation of provisional information by the provisional information generator 64 are changed in accordance with the running situation of narrow vehicles included in a provisional vehicle. Assume that the motorcycle 1 is included in the provisional vehicle. For example, time intervals may be shortened when the acceleration of the motorcycle 1 is rapidly changed or the motorcycle 1 enters another lane. When the acceleration of the motorcycle 1 is rapidly changed or the motorcycle 1 enters another lane, the inter-vehicle distance may be changed. In such cases, the provisional information generator 64 regards a plurality of narrow vehicles as a single provisional vehicle, swiftly in response to the change of the inter-vehicle distance. In other words, the provisional information generator is able to change the narrow vehicles included in the provisional vehicle swiftly in response to a change of the inter-vehicle distance. As such, the vehicle-to-vehicle communication apparatus 60 of the present embodiment allows vehicles to perform smooth cooperative driving.

The vehicle-to-vehicle communication apparatus 60 of the present embodiment further includes the front sensing unit 66 which is configured to sense an object in front of the motorcycle 1. The front sensing unit 66 is able to sense an object in front of the motorcycle 1. The front sensing unit 66 measures the distance between the motorcycle 1 on which the vehicle-to-vehicle communication apparatus 60 of the present embodiment is mounted and a client vehicle. Based on the measured distance, the location information of the motorcycle 1 and the client vehicle or the vehicle length of the motorcycle 1 can be corrected. The location information of the motorcycle 1 and the client vehicle or the vehicle length of the host vehicle, which has been corrected, is output to the provisional information generator. This improves the accuracy of the location information of the motorcycle 1 and the client vehicle. As such, the vehicle-to-vehicle communication apparatus 60 of the present embodiment allows vehicles to perform smooth cooperative driving.

Preferred embodiments of the present teaching have been described above. However, the present teaching is not limited to the above-described embodiments, and various changes can be made within the scope of the claims. Further, modifications described below may be used in combination as needed.

In regard to the vehicle-to-vehicle communication apparatus of the present teaching, narrow vehicles which are regarded as a single provisional vehicle by the provisional information generator may include a narrow vehicle which runs on a plurality of lanes. The following will describe an example of a process (I) executed by the provisional information generator 64 when the running situation of vehicles is the running situation shown in FIG. 10. In the running situation shown in FIG. 10, a left lane 100L is added to the running situation shown in FIG. 4.

The left lane 100L is to the left of the lane 100 (in the LL direction). The left lane 100L is structurally identical with the left lane 100L shown in FIG. 7 and is not explained again. A motorcycle 108 runs on the left lane 100L. The motorcycle 108 is a client vehicle. A transmitter 163*h* is mounted on the motorcycle 108. The transmitter 163*h* is configured to transmit vehicle information of the motorcycle 108. The vehicle information of the motorcycle 108 transmitted from the transmitter 163*h* is received by the receiver 62 mounted on the motorcycle 1. The vehicle-to-vehicle communication apparatus 60 of the present embodiment or another vehicle-to-vehicle communication apparatus may be mounted on the motorcycle 108. The running direction of the left lane 100L on which the motorcycle 108 runs is the lane forward direction (FL direction). To put it differently, the running direction of the left lane 100L on which the motorcycle 108 runs is identical with the running direction of the lane 100 on which the motorcycles 1, 102, 103, 105, 108 and the passenger vehicle 104 run. In the running situation shown in FIG. 10, the provisional information generator 64 regards the motorcycles 1, 102, 103, and 108 determined as satisfying the above-described three conditions (A) to (C) as a single provisional vehicle.

Narrow vehicles which are determined as satisfying the first condition (A) will be described. Vehicles running on the lane of the same running direction as the motorcycle 1 are the motorcycles 1, 102, 103, and 108 and the passenger vehicle 104. The motorcycle 106 runs in the direction opposite to the motorcycle 1. The vehicle width W8 of the motorcycle 108 is less than a half of the lane width W10 of the left lane 100L. The motorcycle 108 is a narrow vehicle. As described above, the motorcycles 1, 102, and 103 are narrow vehicles. The passenger vehicle 104 is a wide vehicle. Narrow vehicles running on the lane of the same running direction as the motorcycle 1 are the motorcycles 1, 102, 103, and 108. The narrow vehicles determined as satisfying the first condition (A) are the motorcycles 1, 102, 103, and 108.

Figure 10:
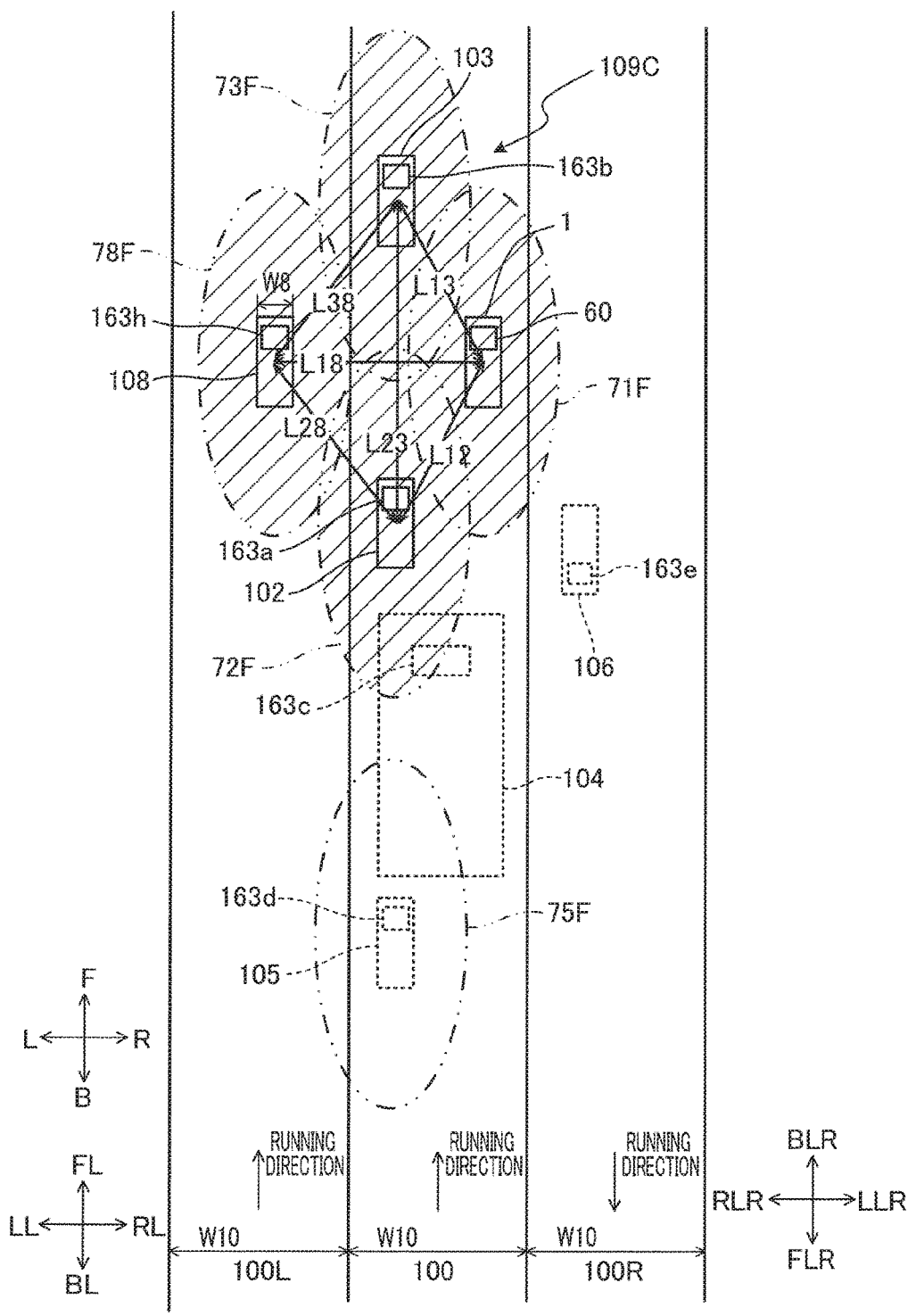
FIG. 10 is a schematic plan view showing another running situation of the vehicle on which the vehicle-to-vehicle communication apparatus of FIG. 3 is mounted.

Narrow vehicles which are determined as satisfying the second condition (B) will be described. As shown in FIG. 10, a line segment connecting the center of the motorcycle 1 with the center of the motorcycle 102 will be referred to as a line segment L12. A line segment connecting the center of the motorcycle 1 with the center of the motorcycle 103 will be referred to as a line segment L13. A line segment connecting the center of the motorcycle 1 with the center of the motorcycle 108 will be referred to as a line segment L18. A line segment connecting the center of the motorcycle 102 with the center of the motorcycle 103 will be referred to as a line segment L23. A line segment connecting the center of the motorcycle 102 with the center of the motorcycle 108 will be referred to as a line segment L28. A line segment connecting the center of the motorcycle 103 with the center of the motorcycle 108 will be referred to as a line segment L38. The passenger vehicle 104 is not in the region formed by the line segments L12, L13, L18, L23, L28, and L38. The narrow vehicles determined as satisfying the second condition (B) are therefore the motorcycles 1, 102, 103, and 108.

Narrow vehicles which are determined as satisfying the third condition (C) will be described. As shown in FIG. 10, the provisional information generator 64 sets narrow vehicle regions for the motorcycles 1, 102, 103, 105, and 108. The narrow vehicle regions are set based on the sets of vehicle information received from the motorcycles 102, 103, 105, and 108 by the receiver 62 and the vehicle information of the motorcycle 1. The narrow vehicle region of the motorcycle 1 is a narrow vehicle region 71F. The narrow vehicle region of the motorcycle 102 is a narrow vehicle region 72F. The narrow vehicle region of the motorcycle 103 is a narrow vehicle region 73F. The narrow vehicle region of the motorcycle 105 is a narrow vehicle region 75F. The narrow vehicle region of the motorcycle 108 is a narrow vehicle region 78F. The narrow vehicle regions 71F 72F 73F 75F and 78F are identical in size. According to FIG. 10, the narrow vehicle regions having overlapped parts are the narrow vehicle regions 71F 72F 73F and 78F. The narrow vehicles determined as satisfying the third condition (C) are therefore the motorcycles 1, 102, 103, and 108. In FIG. 10, the narrow vehicle regions 71F 72F 73F and 78F having overlapped parts are indicated by hatching. The narrow vehicles in the narrow vehicle regions 71F 72F 73F and 78F having overlapped parts are the motorcycles 1, 102, 103, and 108.

Because of the above, the provisional information generator 64 regards the motorcycles 1, 102, 103, and 108 determined as satisfying the three conditions (A) to (C) as a single provisional vehicle 109C. To put it differently, narrow vehicles regarded as a single provisional vehicle 109C by the provisional information generator 64 are the motorcycles 1, 102, 103, and 108. In FIG. 10, the motorcycles 105 and 106 and the passenger vehicle 104 which are not included in the single provisional vehicle 109C are indicated by dotted lines.

As in the running situation shown in FIG. 10, the motorcycles 1, 102, and 103 running on the lane 100 and the motorcycle 108 running on the left lane 100L neighboring the lane 100 may run in a concentrated manner. Even in such a case, the provisional information generator 64 is able to regard the motorcycles 1, 102, 103, and 108 running on the lanes 100 and 100L as a single provisional vehicle 109C. As such, the vehicle-to-vehicle communication apparatus of the present teaching allows the vehicles to perform smooth cooperative driving.

In regard to the vehicle-to-vehicle communication apparatus of the present teaching, the provisional information generator may regard narrow vehicles as a single provisional vehicle based on sets of vehicle information received from at least two client vehicles. In other words, based on sets of vehicle information not including the vehicle information of the host vehicle, the provisional information generator may regard a plurality of narrow vehicles as a single provisional vehicle. The provisional information generator regards narrow vehicles as a single provisional vehicle based on sets of vehicle information received from at least two client vehicles, when, for example, the host vehicle is a wide vehicle. This is because, when the host vehicle is a wide vehicle, the host vehicle is not included in narrow vehicles regarded as a single provisional vehicle. Narrow vehicles are regarded as a single provisional vehicle when, for example, the host vehicle is a narrow vehicle and is remote from narrow vehicles running in a concentrated manner.

A process (I) executed by the provisional information generator 64 when a provisional vehicle does not include a host vehicle will be described with reference to FIG. 11. The explanation will be given based on the running situation shown in FIG. 11. In the example shown in FIG. 11, there are two lanes, i.e., a lane 100 and a left lane 100L. The lane 100 and the left lane 100L are identical with the lanes shown in FIG. 7 and are not explained again. Motorcycles 111 and 115 and a passenger vehicle 114 run on the lane 100. Motorcycles 112 and 113 run on the left lane 100L. The lane width of the lane 100 is W10. The lane width of the left lane 100L is W10. The vehicle-to-vehicle communication apparatus 60 of the present embodiment is mounted on the passenger vehicle 114. A transmitter 263*a* is mounted on the motorcycle 111. The transmitter 263*a* is configured to transmit vehicle information of the motorcycle 111. The vehicle information of the motorcycle 111 transmitted from the transmitter 263a is received by a receiver 62 mounted on the passenger vehicle 114. A transmitter 263b is mounted on the motorcycle 112. The transmitter 263b is configured to transmit vehicle information of the motorcycle 112. The vehicle information of the motorcycle 112 transmitted from the transmitter 263b is received by the receiver 62 mounted on the passenger vehicle 114. A transmitter 263c is mounted on the motorcycle 113. The transmitter 263c is configured to transmit vehicle information of the motorcycle 113. The vehicle information of the motorcycle 113 transmitted from the transmitter 263c is received by the receiver 62 mounted on the passenger vehicle 114. A transmitter 263d is mounted on the motorcycle 115. The transmitter 263d is configured to transmit vehicle information of the motorcycle 115. The vehicle information of the motorcycle 115 transmitted from the transmitter 263d is received by the receiver 62 mounted on the passenger vehicle 114. The vehicle-to-vehicle communication apparatus 60 of the present embodiment or another vehicle-to-vehicle communication apparatus may be mounted on each of the motorcycles 111, 112, 113, and 115. The passenger vehicle 114 is therefore the host vehicle. The motorcycles 111, 112, 113, and 115 are client vehicles. The motorcycle 113 runs in front of the motorcycle 111 (F direction) in the front-rear direction (FB direction) of the motorcycle 111. The motorcycles 112 and 115 run behind the motorcycle 111 (B direction) in the front-rear direction (FB direction) of the motorcycle 111. The motorcycle 112 runs on a different lane from the passenger vehicle 114. The motorcycle 112 overlaps the passenger vehicle 114 when viewed in the lane width direction. In other words, the motorcycle 112 and the passenger vehicle 114 run side by side on different lanes. The motorcycle 115 runs behind the passenger vehicle 114 (B direction) in the front-rear direction (FB direction) of the passenger vehicle 114. The running direction of the lane 100 and 100L on which the motorcycles 111, 112, 113, and 115 and the passenger vehicle 114 run is the lane forward direction (FL direction).

In the running situation shown in FIG. 11, the provisional information generator 64 regards the motorcycles 111, 112, and 113 determined as satisfying the above-described three conditions (A) to (C) as a single provisional vehicle 109A.

The first condition (A) will be described. Vehicles running on the lane of the same running direction as the motorcycle 1 are the motorcycles 1, 112, 113, and 115 and the passenger vehicle 114. The lane width of each of the lanes 100 an 100L is W10. The vehicle width W14 of the passenger vehicle 114 is equal to or more than a half of the lane width W10. The passenger vehicle 114 is a wide vehicle. The vehicle width W1 of the motorcycle 111 is less than a half of the lane width W10. The vehicle width W12 of the motorcycle 112 is less than a half of the lane width W10. The vehicle width W13 of the motorcycle 113 is less than a half of the lane width W10. The vehicle width W15 of the motorcycle 115 is less than a half of the lane width W10. The motorcycles 111, 112, 113, and 115 are narrow vehicles. On this account, two narrow vehicles can stop side by side in the lane width direction in a single lane 100 or 100L. Meanwhile, two wide vehicles cannot stop side by side in the lane width direction in the single lane 100 or 100L. Narrow vehicles running on the lane of the same running direction as the motorcycle 111 are the motorcycles 111, 112, 113, and 115. The narrow vehicles determined as satisfying the first condition (A) are the motorcycles 111, 112, 113, and 115.

The second condition (B) will be described. As shown in FIG. 11, a line segment connecting the center of the motorcycle 111 with the center of the motorcycle 112 will be referred to as a line segment L112. A line segment connecting the center of the motorcycle 111 with the center of the motorcycle 113 will be referred to as a line segment L113. A line segment connecting the center of the motorcycle 111 with the center of the motorcycle 115 will be referred to as a line segment L115. A line segment connecting the center of the motorcycle 112 with the center of the motorcycle 113 will be referred to as a line segment L123. A line segment connecting the center of the motorcycle 112 with the center of the motorcycle 115 will be referred to as a line segment L125. A line segment connecting the center of the motorcycle 113 with the center of the motorcycle 115 will be referred to as a line segment L135. The passenger vehicle 114 is not in the region formed by the line segments L112, L113, L123, and L125. Meanwhile, the passenger vehicle 114 is on the line segments L115 and L135. The narrow vehicles determined as satisfying the second condition (B) are therefore the motorcycles 111, 112, and 113.

The third condition (C) will be described. As shown in FIG. 11, the provisional information generator 64 sets narrow vehicle regions for the respective motorcycles 111, 112, 113, and 115 which are narrow vehicles running on the lane of the same running direction as the motorcycle 1. The narrow vehicle regions are set based on the sets of vehicle information received from the motorcycles 112, 113, and 115 by the receiver 62 and the vehicle information of the motorcycle 111. The narrow vehicle region of the motorcycle 111 is a narrow vehicle region 171F. The narrow vehicle region of the motorcycle 112 is a narrow vehicle region 172F. The narrow vehicle region of the motorcycle 113 is a narrow vehicle region 173F. The narrow vehicle region of the motorcycle 115 is a narrow vehicle region 175F. The size of each of the narrow vehicle regions of the motorcycles 111, 112, 113, and 115 is identical with the size of each of the narrow vehicle regions of the motorcycles 111, 112, 113, and 115 shown in FIG. 4. According to FIG. 11, the narrow vehicle regions having overlapped parts are the narrow vehicle regions 171F, 172F, 173F, and 175F. In FIG. 11, the narrow vehicle regions 171F, 172F, 173F, and 175F having overlapped parts are indicated by hatching. The narrow vehicles in the narrow vehicle regions 171F, 172F, 173F, and 175F having overlapped parts are the motorcycles 111, 112, 113, and 115. The narrow vehicles determined as satisfying the third condition (C) are therefore the motorcycles 111, 112, 113, and 115.

Because of the above, the provisional information generator 64 regards the motorcycles 111, 112, and 113 determined as satisfying the three conditions (A) to (C) as a single provisional vehicle 109A. To put it differently, narrow vehicles regarded as a single provisional vehicle 109A by the provisional information generator 64 are the motorcycles 111, 112, and 113. In FIG. 11, the motorcycle 115 and the passenger vehicle 114 which are not included in the single provisional vehicle 109A are indicated by dotted lines. In the running situation shown in FIG. 11, the vehicle-to-vehicle communication apparatus 60 regards the narrow vehicles 111, 112, and 113 running on the lanes 100 and 100L as a single provisional vehicle 109A. The passenger vehicle 114 is able to smoothly enter a location in front of or behind the motorcycles 111, 112, and 113 running in a concentrated manner, by using the provisional information generated by the provisional information generator 64. As such, the vehicle-to-vehicle communication apparatus 60 of the present teaching allows the vehicles to perform smooth cooperative driving.

In addition to the above, in the running situations shown in FIG. 6 and FIG. 7, the vehicle-to-vehicle communication apparatus 60 of the present teaching may be mounted on the passenger vehicle 110. In these cases, the passenger vehicle passenger vehicle 110 is able to smoothly enter a location in front of or behind the motorcycles 1, 102, and 103 running in a concentrated manner, by using the provisional information generated by the provisional information generator 64. In other words, in the running situation shown in FIG. 6, the passenger vehicle 110 is able to smoothly enter the lane 100 from the lane 100c. Meanwhile, in the running situation shown in FIG. 7, the passenger vehicle 110 is able to smoothly enter the lane 100 from the lane 100L.

In regard to the vehicle-to-vehicle communication apparatus of the present teaching, the provisional information generator regards a plurality of narrow vehicles determined as satisfying the above-described three conditions (A) to (C) as a single provisional vehicle. Alternatively, the provisional information generator may regard a plurality of narrow vehicles determined as satisfying the above-described two conditions (A) and (B) as a single provisional vehicle. In the running situation shown in FIG. 4, for example, the narrow vehicles determined as satisfying the above-described two conditions (A) and (B) are identical with the narrow vehicles determined as satisfying above-described three conditions (A) to (C).

Figure 12:
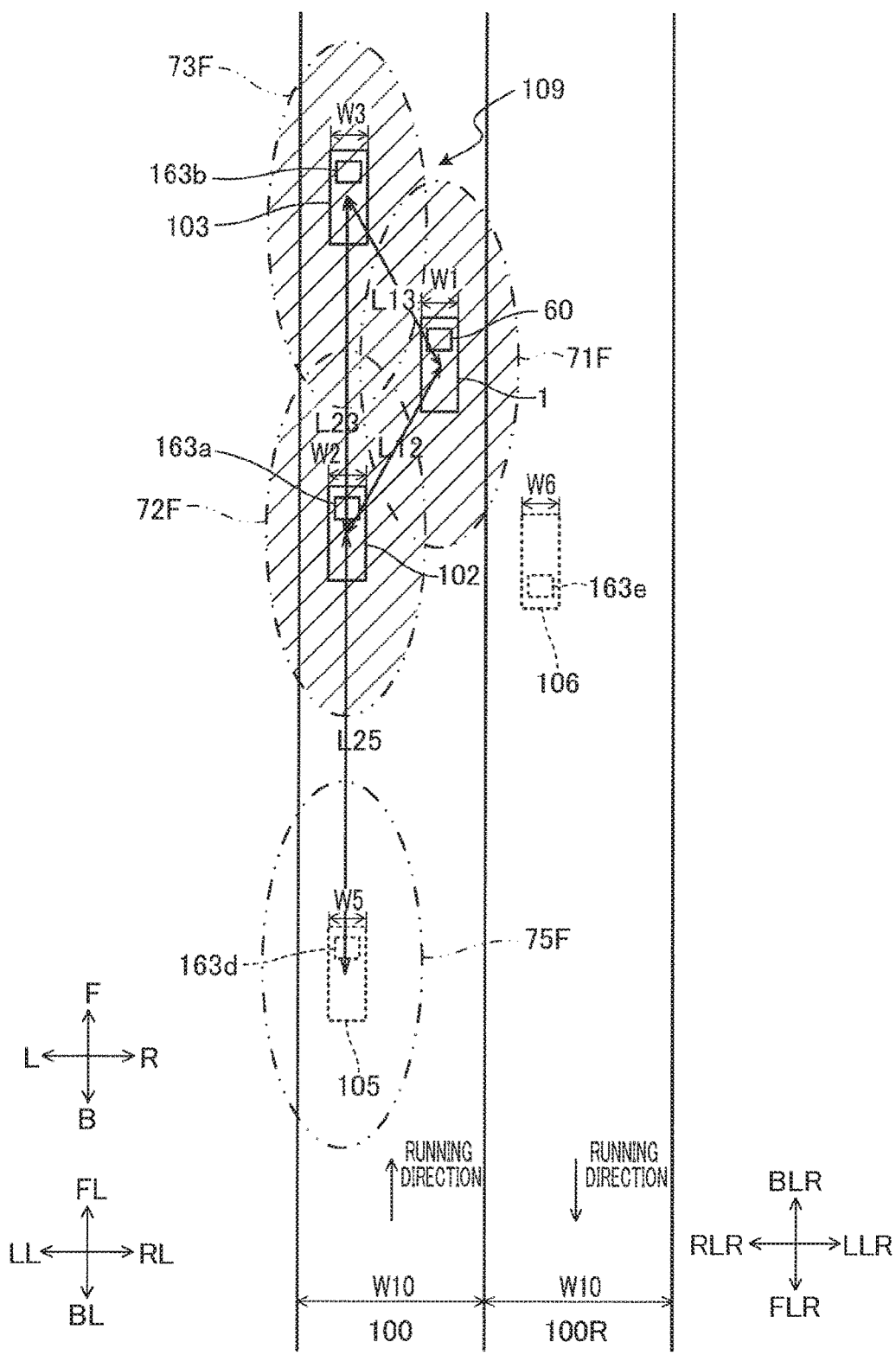
FIG. 12 is a schematic plan view showing another running situation of the vehicle on which the vehicle-to-vehicle communication apparatus of FIG. 3 is mounted.

The running situation of FIG. 12 will be examined below, for example. The running situation shown in FIG. 12 is identical with the running situation shown in FIG. 4 except that the passenger vehicle 104 does not exist. In other words, the passenger vehicle 104 does not exist on the line segment L25 connecting the motorcycle 102 with the motorcycle 105. For this reason, in the running situation shown in FIG. 12, narrow vehicles determined by the provisional information generator as satisfying the conditions (A) and (B) are the motorcycles 1, 102, 103, and 105. Meanwhile, the narrow vehicle region 75F of the motorcycle 105 does not overlap another narrow vehicle region. The narrow vehicles determined as satisfying the third condition (C) according to the provisional information generator are therefore the motorcycles 1, 102, and 103. In the running situation of FIG. 12, the motorcycle 105 which is a narrow vehicle in a narrow vehicle region not overlapping any other narrow vehicle regions is not included in a single provisional vehicle. On this account, the motorcycle 105 which is a narrow vehicle running at a location remote from other narrow vehicles is not included in the single provisional vehicle. To put it differently, the narrow vehicles running in a concentrated manner are regarded as a single provisional vehicle. As such, the vehicle-to-vehicle communication apparatus of the present teaching allows the vehicles to perform smooth cooperative driving.

The vehicle-to-vehicle communication apparatus 60 of the present embodiment may not include the front sensing unit 66 and the correction unit 67. The vehicle-to-vehicle communication apparatus of the present teaching is required to include only at least one of a front sensing unit, a rear sensing unit, or a side sensing unit. The front sensing unit, the rear sensing unit, and the side sensing unit may be integrated or independent members. The rear sensing unit is configured to sense an object behind the host vehicle on which the vehicle-to-vehicle communication apparatus is mounted. The rear sensing unit is able to sense a client vehicle running behind the host vehicle. The side sensing unit is configured to sense an object which is rightward of, or leftward of the host vehicle on which the vehicle-to-vehicle communication apparatus is mounted. The side sensing unit is able to sense a client vehicle running rightward of, or leftward of the host vehicle. To be more specific, each of the rear sensing unit and the side sensing unit measures the distance between the host vehicle on which the vehicle-to-vehicle communication apparatus is mounted and a client vehicle. Being similar to the front sensing unit, each of the rear sensing unit and the side sensing unit outputs the measured distance to the correction unit. The correction unit calculates the distance between the host vehicle and the client vehicle based on the location information of the host vehicle owned by the host vehicle and the location information of the client vehicle. When the calculated distance between the host vehicle and the client vehicle is different from the distance between the host vehicle and the client vehicle measured by the rear sensing unit or the side sensing unit, the correction unit corrects the location information of the host vehicle owned by the host vehicle and the location information of the client vehicle received by the receiver. The location information of the host vehicle and the location information of the client vehicle, which have been corrected by the correction unit, are output to the provisional information generator. Each of the rear sensing unit and the side sensing unit includes, for example, at least one of a camera, a millimeter wave radar, a micrometer wave radar, a laser radar, an ultrasonic sensor, an acoustic sensor, an infrared sensor, a radio wave/electric field sensor, a magnetic sensor, and a range image sensor. Such radars and sensors are configured to radiate millimeter waves or the like rearward or sideward from the host vehicle and receive reflected waves reflected on an object and returning. The camera may be a monocular camera or a set of dual cameras. This improves the accuracy of the location information of the host vehicle and the client vehicle. As such, the vehicle-to-vehicle communication apparatus of the present teaching allows the vehicles to perform smooth cooperative driving.

The vehicle-to-vehicle communication apparatus of the present teaching may calculate the vehicle length of the host vehicle by using the front sensing unit and the rear sensing unit. To be more specific, the front sensing unit measures the distance between the host vehicle and a client vehicle running in front of the host vehicle. The rear sensing unit measures the distance between the host vehicle and a client vehicle running behind the host vehicle. The correction unit calculates the vehicle length of the host vehicle based on the distances between the host vehicle and the client vehicles measured by the front sensing unit and the rear sensing unit, the location information of the host vehicle, and sets of location information of the client vehicles received by the receiver. When the calculated vehicle length of the host vehicle is different from the vehicle length included in the vehicle information of the host vehicle, the vehicle length in the vehicle information owned by the host vehicle is corrected. The location information of the host vehicle and the location information of the client vehicle, which have been corrected by the correction unit, are output to the provisional information generator. This improves the accuracy of the vehicle length of the host vehicle. As such, the vehicle-to-vehicle communication apparatus of the present teaching allows the vehicles to perform smooth cooperative driving.

The wireless communication apparatus of the present teaching may be arranged to be able to perform road-to-vehicle communication. The road-to-vehicle communication is communication performed between a road-side communication apparatus mounted on a road and an on-board communication apparatus. The on-board communication apparatus is a wireless communication apparatus. The on-board communication apparatus is configured to transmit information such as the speed of the host vehicle to a road-side communication apparatus or to an on-board communication apparatus of a client vehicle. The road-side communication apparatus is configured to transmit, to another on-board communication apparatus, information received from an on-board communication apparatus, road information (e.g., signal information and traffic regulation information), etc. The information transmitted from a road-side communication apparatus may include the existence of a vehicle and the speed of a vehicle.

In regard to the vehicle-to-vehicle communication apparatus of the present teaching, the provisional information generator may change the length in the lane front-rear direction of a narrow vehicle region in accordance with vehicle speed of a narrow vehicle. To be more specific, when the vehicle speeds of motorcycles 1, 102, 103, 105, and 106 in narrow vehicle regions 71F, 72F, 73F, 75F, and 76F increase, the lengths in the lane front-rear direction of the narrow vehicle regions 71F, 72F, 73F, 75F, and 76F are increased. Meanwhile, when the vehicle speeds of motorcycles 1, 102, 103, 105, and 106 in narrow vehicle regions 71F, 72F, 73F, 75F, and 76F decrease, the lengths in the lane front-rear direction of the narrow vehicle regions 71F, 72F, 73F, 75F, and 76F are decreased. In the present teaching and the embodiment above, the shape of a narrow vehicle region may be circular, rectangular, etc. In the present teaching and the embodiment above, the shape of each of the narrow vehicle regions 71F, 72F, 73F, 75F, and 76F may be different from the above. This makes it possible to set narrow vehicle regions for narrow vehicles included in a provisional vehicle at will.

In regard to the vehicle-to-vehicle communication apparatus of the present teaching, the provisional information generator may set the length in the lane front-rear direction of a narrow vehicle region in accordance with the vehicle length of narrow vehicle. To be more specific, the length in the lane front-rear direction of a narrow vehicle region is set in accordance of the type of a vehicle. For example, when the narrow vehicle is a large motorcycle, the length in the lane front-rear direction of the narrow vehicle region is arranged to be long. Meanwhile, when the narrow vehicle is a small motorcycle, the length in the lane front-rear direction of the narrow vehicle region is arranged to be short. In this way, the degree of concentration of narrow vehicles which are regarded as a single provisional vehicle is adjustable.

In addition to the above, in regard to the vehicle-to-vehicle communication apparatus of the present teaching, the provisional information generator may change the length in the lane front-rear direction of a narrow vehicle region in accordance with the vehicle speed of a narrow vehicle. To be more specific, when the vehicle speed of a narrow vehicle increases, the length in the lane front-rear direction of the narrow vehicle region of that narrow vehicle is increased. Meanwhile, when the vehicle speed of a narrow vehicle decreases, the length in the lane front-rear direction of the narrow vehicle region of that narrow vehicle is decreased. An inter-vehicle distance typically increases as a vehicle speed increases. On this account, by changing the length in the lane front-rear direction of the narrow vehicle region in accordance with the vehicle speed of the narrow vehicle, it is possible to prevent two narrow vehicles, which are more distanced from each other than a required inter-vehicle distance, from being regarded as a single provisional vehicle when the vehicle speed is low. Because the length in the lane front-rear direction of the narrow vehicle region is changed in accordance with the running situation of the narrow vehicle, cooperative driving of vehicles is smoothly done.

In the present teaching and the embodiment above, the output controller may output provisional information to a notification unit or the like, in addition to the controller 50 and the display 51.

In the present teaching, a region formed by connecting at least parts of narrow vehicles with one another is defined as follows. The at least part of the vehicle may be not the center of the vehicle but a leading end or a trailing end. The at least part of the vehicle may be not a part of the vehicle different from the center but the entire vehicle. Furthermore, a region formed by connecting at least parts of narrow vehicles with one another may be a region formed by line segments, or may be a region formed by planes.

In the present teaching, the provisional information generator may not select a representative vehicle from narrow vehicles which are included in a provisional vehicle.

In the present teaching, the provisional information generator executes a process of generating provisional information with the assumption that a plurality of narrow vehicles form a single provisional vehicle. This process may not be executed by the provisional information generator at predetermined time intervals. The provisional information generator may execute the process in accordance with the running situation of a host vehicle. To put it differently, the provisional information generator may determine whether to execute the process, in accordance with the running situation of a host vehicle. To be more specific, the provisional information generator regards a plurality of narrow vehicles as a single provisional vehicle and executes a process of generating provisional information, in a running situation in which the host vehicle runs around a junction, a running situation in which the host vehicle is trying to enter another lane, or in a running situation in which the inter-vehicle distance between the host vehicle and a client vehicle running behind the host vehicle is short, for example.

1 motorcycle (host vehicle, narrow vehicle)
50 controller (control unit)
51 display (display unit)
60 vehicle-to-vehicle communication apparatus
62 receiver
63 transmitter
64 provisional information generator
65 output controller
66 front sensing unit (sensing unit)
68 host vehicle information storage unit
71F, 72F, 73F, 75F, 78F, 172F, 173F, 175F narrow vehicle region
100, 100, 100L, 100R, 100C lane
102, 103, 105, 106, 107, 108, 111, 112, 113, 115 motorcycle (client vehicle, narrow vehicle)
104, 110, 114 passenger vehicle (client vehicle, wide vehicle)
109, 109A. 109B, 109C provisional vehicle
114 passenger vehicle (host vehicle, wide vehicle)
163*a*, 163*b*, 163*c*, 163*d*, 163*e*, 163*f*, 163*g*, 163*h*, 263*a*, 263*b*, 263*c*, 263*d* transmitter.

What is claimed is:

1. A vehicle-to-vehicle communication apparatus mounted on a host vehicle, comprising:
   a host vehicle information storage unit configured to store vehicle information of the host vehicle including vehicle width information related to vehicle width of the host vehicle and location information related to a location of the host vehicle;
   a receiver performing vehicle-to-vehicle communication and configured to receive vehicle information from a transmitter of at least one client vehicle performing vehicle-to-vehicle communication, the vehicle information of the at least one client vehicle including vehicle width information related to vehicle width of the at least one client vehicle and location information related to location information of the at least one client vehicle;

a provisional information generator configured to, in response to a determination that
- (A) the at least one client vehicle and the host vehicle, while running on a lane of a same running direction, include narrow vehicles, each narrow vehicle being narrower in vehicle width than a wide vehicle having a wide vehicle width, and
- (B) a region formed by connecting the narrow vehicles with one another does not include the wide vehicle, the determination being based on sets of vehicle information including
  - (a) the vehicle information of the at least one client vehicle received from the at least one client vehicle and the vehicle information of the host vehicle, or
  - (b) the vehicle information of the at least one client vehicle and vehicle information received from at least one other client vehicle,
- (I) regard the narrow vehicles as a single provisional vehicle, and
- (II) generate provisional information of the provisional vehicle from the sets of the vehicle information of the narrow vehicles regarded as the provisional vehicle; and an output controller configured to output the provisional information.

2. The vehicle-to-vehicle communication apparatus according to claim 1, wherein in response to a determination, based on the sets of vehicle information, that
- (C) narrow vehicle regions, set respectively for the narrow vehicles included in the at least one client vehicle and the host vehicle running on the lane of the same running direction, have overlapped parts, the provisional information generator regards the narrow vehicles in the narrow vehicle regions as the single provisional vehicle.

3. The vehicle-to-vehicle communication apparatus according to claim 2, wherein
the vehicle information of the at least one client vehicle and the vehicle information of the host vehicle includes vehicle length information related to vehicle length, and
when the host vehicle or the at least one client vehicle include the wide vehicle, the provisional information generator sets a length in a lane front-rear direction of each of the narrow vehicle regions in accordance with a vehicle length of the wide vehicle included in either the vehicle information of the host vehicle or the vehicle information of the at least one client vehicle received by the host vehicle.

4. The vehicle-to-vehicle communication apparatus according to claim 3, wherein the provisional information generator sets the length in the lane front-rear direction of each of the narrow vehicle regions in accordance with vehicle speed of the narrow vehicles.

5. The vehicle-to-vehicle communication apparatus according to claim 2, wherein
the vehicle information includes vehicle length information related to vehicle length, and
the provisional information generator sets a length in a lane front-rear direction of each of the narrow vehicle regions in accordance with a vehicle length of each of the narrow vehicles.

6. The vehicle-to-vehicle communication apparatus according to claim 1, wherein the provisional information includes at least one of:
identification information for identifying the provisional vehicle,
a type of the narrow vehicles included in the provisional vehicle,
a number of the narrow vehicles included in the provisional vehicle,
locations of the narrow vehicles included in the provisional vehicle,
vehicle speed of the narrow vehicles included in the provisional vehicle,
angles in a traveling direction of the narrow vehicles included in the provisional vehicle,
a total length in a lane front-rear direction of all of the narrow vehicles included in the provisional vehicle,
a total length in a lane width direction of all of the narrow vehicles included in the provisional vehicle, or
instruction information which is a common instruction to the narrow vehicles included in the provisional vehicle.

7. The vehicle-to-vehicle communication apparatus according to claim 1, further comprising a host transmitter performing vehicle-to-vehicle communication and configured to transmit, to the at least one client vehicle, the provisional information output from the output controller and the vehicle information of the host vehicle.

8. The vehicle-to-vehicle communication apparatus according to claim 7, wherein the provisional information generator selects a narrow vehicle from the narrow vehicles included in the provisional vehicle to be a representative vehicle, and transmits the provisional information from the host transmitter to the representative vehicle, the provisional information including information related to the representative vehicle.

9. The vehicle-to-vehicle communication apparatus according to claim 8, wherein the provisional information generator changes the representative vehicle to a different one of the narrow vehicles included in the provisional vehicle from the selected narrow vehicle.

10. The vehicle-to-vehicle communication apparatus according to claim 8, wherein when the host vehicle is included in the provisional vehicle, the output controller changes output transmission power of the host transmitter based on the information related to the representative vehicle.

11. The vehicle-to-vehicle communication apparatus according to claim 7, wherein the output controller changes time intervals of transmission of the provisional information from the host transmitter to the at least one client vehicle.

12. The vehicle-to-vehicle communication apparatus according to claim 11, wherein when the host vehicle is included in the provisional vehicle, the output controller controls time intervals of transmission of the vehicle information from the host transmitter to the at least one client vehicle to be longer than time intervals when the host vehicle is not included in the provisional vehicle.

13. The vehicle-to-vehicle communication apparatus according to claim 1, wherein time intervals of generation of the provisional information by the provisional information generator are changeable.

14. The vehicle-to-vehicle communication apparatus according to claim 1, wherein the provisional vehicle includes narrow vehicles running on a plurality of lanes.

15. The vehicle-to-vehicle communication apparatus according to claim 1, further comprising a sensing unit which is configured to sense an object which is at least in front of, behind, rightward of, or leftward of the host vehicle.

* * * * *